(12) United States Patent
Oikawa et al.

(10) Patent No.: US 6,999,648 B2
(45) Date of Patent: Feb. 14, 2006

(54) OPTICAL CROSS-CONNECT APPARATUS

(75) Inventors: Yoichi Oikawa, Yokohama (JP); Makoto Murakami, Sapporo (JP); Takehisa Ishikawa, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 10/786,082

(22) Filed: Feb. 26, 2004

(65) Prior Publication Data

US 2004/0165816 A1    Aug. 26, 2004

(30) Foreign Application Priority Data

Feb. 26, 2003 (JP) ............................. 2003-049485

(51) Int. Cl.
*G02B 6/35* (2006.01)
*G02B 6/28* (2006.01)
*H04J 14/02* (2006.01)

(52) U.S. Cl. ..................... 385/17; 385/24; 359/326; 398/79

(58) Field of Classification Search ..................... None
See application file for complete search history.

(56) References Cited

U.S. PATENT DOCUMENTS

| 6,288,808 | B1 | 9/2001 | Lee et al. | |
| 6,477,300 | B1 * | 11/2002 | Watanabe et al. | 385/42 |
| 6,741,811 | B1 * | 5/2004 | Nishi et al. | 398/50 |

OTHER PUBLICATIONS

Patent Abstracts of Japan, Pub. No. 2000-134649.
Search Report from the United Kingdom Patent Office on a corresponding Patent Application No. GB 0403843.6, dated Jul. 26, 2004.
Further Search Report from the United Kingdom Patent Office on a corresponding Patent Application No. GB 0403843.6, dated Oct. 19, 2004.

* cited by examiner

*Primary Examiner*—John D. Lee
*Assistant Examiner*—Jerry T. Rahll
(74) *Attorney, Agent, or Firm*—Staas & Halsey LLP

(57) ABSTRACT

An optical cross-connect apparatus that realizes high throughput in optical cross-connection by performing large-scale switching. An input optical signal processing section converts wavelengths contained in each input WDM signal into wavelengths the number of which is equal to the number of WDM signals, compresses the pulse widths of the WDM signals by dividing the pulse widths by the number of the wavelengths contained in each input WDM signal, and performs a phase shift so that the phases of a plurality of compressed signal will not be the same. A wavelength switching section includes passive optical devices and distributes the optical signals processed by the input optical signal processing section according to wavelengths. An output optical signal processing section converts wavelengths contained in the optical signals distributed by the wavelength switching section into wavelengths recognized from the phases of the optical signals, expands the pulse widths of the optical signals, and outputs WDM signals.

13 Claims, 38 Drawing Sheets

| BAND NAME | MEANING | WAVELENGTH RANGE |
|---|---|---|
| O BAND | Original | 1260 nm to 1360 nm |
| E BAND | Extended | 1360 nm to 1460 nm |
| S BAND | Short wavelength | 1460 nm to 1530 nm |
| C BAND | Conventional | 1530 nm to 1565 nm |
| L BAND | Long wavelength | 1565 nm to 1625 nm |
| U BAND | Uitralong wavelength | 1625 nm to 1675 nm |

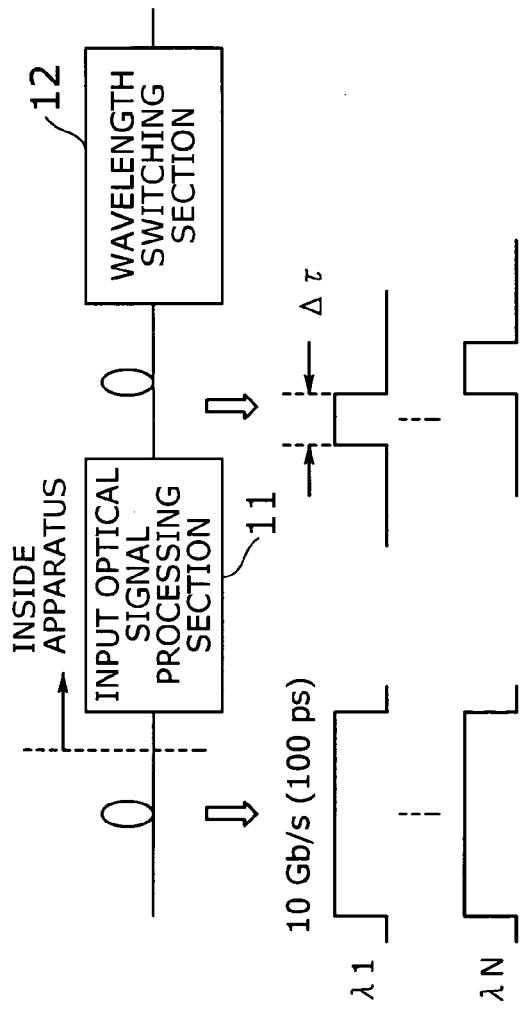

(THROUGHPUT OF INTRA-APPARATUS OPTICAL FIBER TRANSMISSION)

$$\text{THROUGHPUT} = \begin{array}{c}\text{NUMBER OF}\\\text{COMPRESSED PULSES}\end{array} \times \begin{array}{c}\text{BIT RATE OF ONE}\\\text{COMPRESSED PULSE}\end{array}$$

$$= \frac{50\ \text{THz}}{2 \times \left(\dfrac{1}{\Delta\tau}\right)} \times \underbrace{\frac{100\ \text{ps}}{\Delta\tau}}_{\text{TIME DIVISION NUMBER}} \cdot 10\ \text{Gb/s} = 25\ \text{Tb/s}$$

$$= \frac{BW_{fiber}}{2}$$

THE THROUGHPUT OF THE INTRA-APPARATUS OPTICAL FIBER TRANSMISSION MAY BE CALCULATED BY MULTIPLYING (OPTICAL FIBER BAND) AND (1/2) TOGETHER.

UNLIKE THE OPTICAL FIBER TRANSMISSION BETWEEN STATIONS, THE INTRA-APPARATUS OPTICAL FIBER TRANSMISSION IS SHORT DISTANCE TRANSMISSION, SO THE NONLINEAR EFFECTS HAVE NO INFLUENCE. THEREFORE, A THROUGHPUT OF 25 TBITS/S, BEING A THEORETICAL UPPER LIMIT, CAN BE ACHIEVED.

OPTICAL CROSS-CONNECT APPARATUS

BACKGROUND OF THE INVENTION (1) Field of the Invention

This invention relates to an optical cross-connect apparatus and, more particularly, to an optical cross-connect apparatus for performing optical cross-connection of wavelength division multiplex (WDM) signals.

(2) Description of the Related Art

Optical communication networks form the nuclei of telecommunication networks and are expected to provide more advanced services in a wider area. In particular, WDM which is central to optical transmission systems has advanced swiftly. WDM multiplexes a plurality of optical signals with different wavelengths into a single optical fiber.

On the other hand, to build immense photonic networks, WDM systems are connected to one another to form ring networks where each node is connected in a circle, mesh networks where nodes connected form the shape of a mesh, and the like. One of key technologies for building such networks is optical cross-connect (OXC) apparatus.

OXC apparatus are installed in nodes on networks for performing switching to output an optical signal inputted to an input port to a target output port or for adding or dropping an optical signal. Usually large-scale spatial optical matrix switches including microelectro-mechanical systems (MEMSes) are used in the switching sections of OXC apparatus. Development of OXC apparatus which can switch about 1,000 channels is proceeding.

With conventional OXC apparatus, wavelength conversion is performed by a wavelength converter (transponder). In this case, a WDM optical signal transmitted is separated by an optical demultiplexer. Then obtained optical signals are converted to electrical signals and are converted to optical signals again. That is to say, optical-electrical-optical (OEO) conversion is performed. These optical signals are inputted to an optical matrix switch and are switched. Then the optical signals are wavelength-converted again by a transponder, are combined by an optical multiplexer, and are transmitted to the next stage as a WDM signal (see, for example, Japanese Unexamined Patent Publication No. 2000-134649, paragraph nos. [0020]–[0037] and FIG. 1).

With the conventional OXC apparatus, however, optical switching is realized by an optical matrix switch made up of switch cells in which micro electromechanical parts, such as MEMSes, are used, so the maximum number of channels handled is about 1,000 due to difficulty in fabricating highly integrated optical switching elements, the complexity of control, etc. A 1000.times.1000 channel switch has a throughput of 10 Tbits/s at most.

Accordingly, the conventional OXC apparatus cannot perform the switching of more than 1,000 channels, so the development of next-generation multimedia networks cannot be expected.

SUMMARY OF THE INVENTION

The present invention was made under the background circumstances described above. An object of the present invention is to provide an optical cross-connect apparatus which realizes high throughput by performing large-scale switching.

In order to achieve the above object, an optical cross-connect apparatus for performing optical cross-connection of optical signals is provided. This optical cross-connect apparatus comprises an input optical signal processing section for converting wavelengths contained in each input WDM signal into wavelengths the number of which is equal to that of WDM signals, for compressing the pulse widths of the WDM signals by dividing the pulse widths by the number of the wavelengths contained in each input WDM signal, and for performing a phase shift so that the phases of a plurality of compressed signal will not be the same, a wavelength switching section including passive optical devices for distributing the optical signals processed by the input optical signal processing section according to wavelengths, and an output optical signal processing section for converting wavelengths contained in the optical signals distributed by the wavelength switching section into wavelengths recognized from the phases of the optical signals, for expanding the pulse width of the optical signals, and for outputting WDM signals.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows wavelength regions used in optical transmission by an SMF.

FIG. 8 is a view for describing how to calculate the throughput of intra-apparatus optical fiber transmission.

DESCRIPTION OF THE PREFERRED EMBODIMENTS

Figure 1:
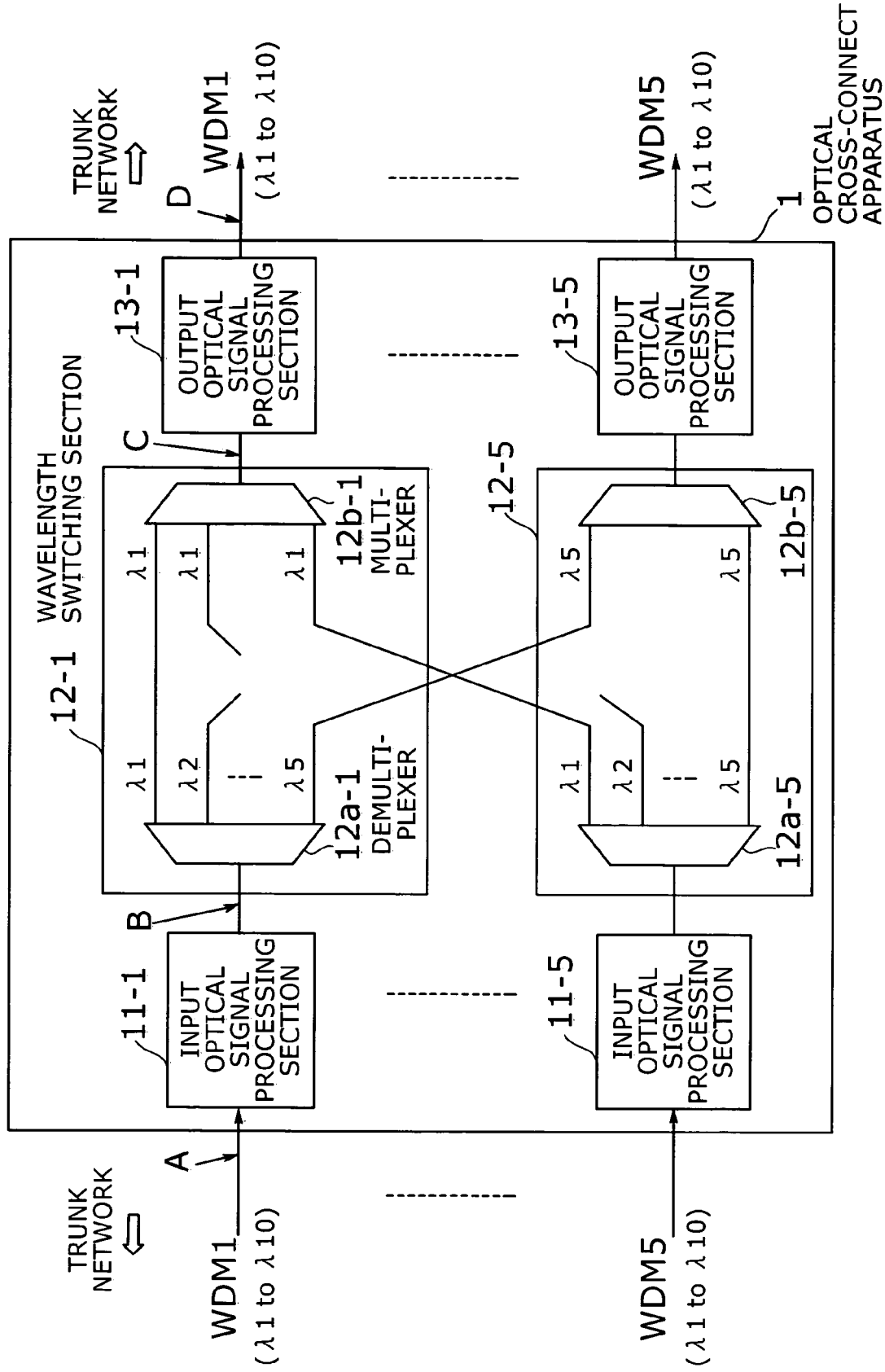
FIG. 1 is a view for describing the principles underlying an optical cross-connect apparatus according to the present invention.

Embodiments of the present invention will now be described with reference to the drawings. FIG. 1 is a view for describing the principles underlying an optical cross-connect apparatus according to the present invention. An optical cross-connect apparatus 1 performs optical cross-connection of optical signals and comprises input optical signal processing sections 11-1 through 11-5, wavelength switching sections 12-1 through 12-5, and output optical signal processing sections 13-1 through 13-5. When components of the same type are mentioned in block in the following description, the figures after the hyphens will be omitted (for example, the input optical signal processing sections 11-1 through 11-5 will be referred to as the input optical signal processing section 11).

The input optical signal processing sections 11-1 through 11-5 perform a wavelength conversion, pulse width compression, and a phase shift on WDM signals inputted via a trunk network and output them. The wavelength switching sections 12-1 through 12-5 include demultiplexers (arrayed waveguide gratings abbreviated as AWGs) 12a-1 through 12a-5 and multiplexers (optical couplers) 12b-1 through 12b-5 respectively. These demultiplexers and multiplexers are passive optical devices. The wavelength switching sections 12-1 through 12-5 distribute the optical signals processed by the input optical signal processing sections 11-1 through 11-5 according to wavelengths. The output optical signal processing sections 13-1 through 13-5 perform wavelength conversions and pulse width expansion on the optical signals distributed by the wavelength switching sections 12-1 through 12-5, generate WDM signals, and output them to the trunk network.

Figure 2:
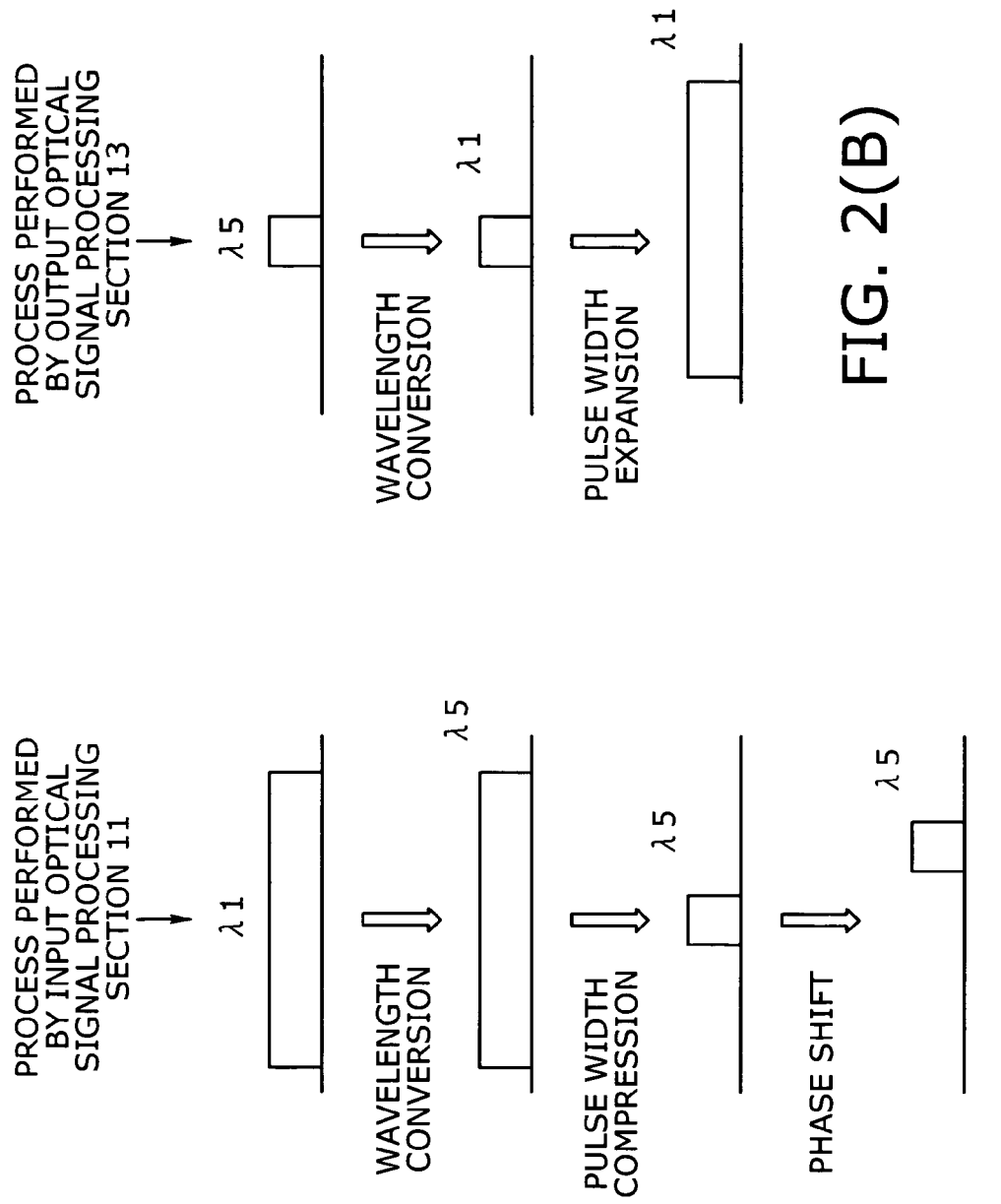
FIGS. 2(A) and 2(B) give an outline of processes performed by an input optical signal processing section and an output optical signal processing section respectively.

FIGS. 2(A) and 2(B) give an outline of processes performed by the input optical signal processing section 11 and the output optical signal processing section 13 respectively. Each pulse waveform indicates an optical signal. The input optical signal processing section 11 performs a wavelength conversion, pulse width compression, and a phase shift on an input optical signal. For example, the input optical signal processing section 11 converts wavelength λ1 which the input optical signal contains, into λ5. As shown in FIG. 2(A), the input optical signal processing section 11 narrows the pulse width of the optical signal containing the wavelength λ5 by performing compression and performs a phase shift on the compressed signal to shift its time location.

On the other hand, the output optical signal processing section 13 performs a wavelength conversion and pulse width expansion on an optical signal switched by the wavelength switching section 12. For example, the output optical signal processing section 13 converts the wavelength λ5 contained in the compressed optical signal into λ1 and then expands its pulse width as shown in FIG. 2(B).

With the optical cross-connect apparatus 1 according to the present invention, the number of wavelengths in the apparatus (that is to say, the number of wavelengths after wavelength conversions) is equal to n (the number of WDM input optical signals) and a time division number for pulse width compression is equal to m (the number of different wavelengths contained in each WDM input optical signal). By setting switch size n.times.m to a value smaller than or equal to (optical fiber band).times.(pulse width of input optical signal).times.(0.5), large-capacity optical cross-connection is realized without restrictions being placed on a frequency band (without causing cross talk). The details will be described later.

Figure 3:
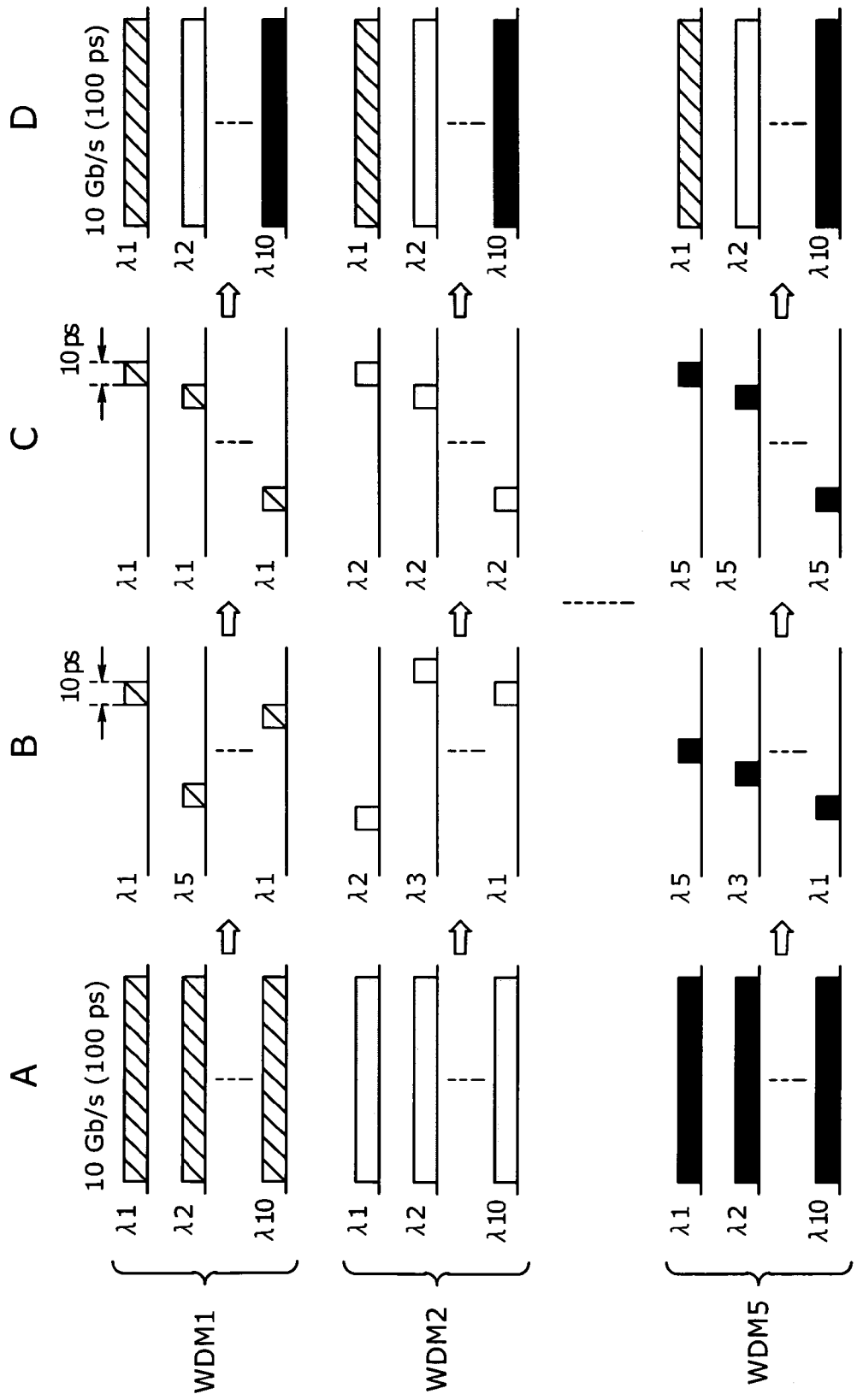
FIG. 3 shows the flow of signals.

The operation of the optical cross-connect apparatus 1 (hereinafter the optical cross-connect apparatus according to the present invention will also be referred to as a λ-XC apparatus) will now be described. FIG. 3 shows the flow of signals. A through D in FIG. 3 indicate points A through D, respectively, shown in FIG. 1. At the point A, WDM1 shown in FIG. 1 is transmitted at a bit rate of 10-Gbit/s (has a pulse width of 100 ps) and contains ten different wavelengths λ1 through λ10 (ten channels). Similarly, each of WDM2 through WDM5 is transmitted at a bit rate of 10-Gbit/s (has a pulse width of 100 ps) and contains ten different wavelengths λ1 through λ10 (ten channels).

At the point B, wavelength conversions, pulse width compression, and phase shifts have been performed on the WDM signals by the input optical signal processing sections 11-1 through 11-5. The number of wavelengths in the apparatus is equal to n (the number of WDM input optical signals, that is to say, the number of input optical fibers). In the case of FIG. 1, WDM1 through WDM5 are inputted, so n=5. A time division number for pulse width compression is equal to m (the number of different wavelengths contained in each WDM input optical signal). In the case of FIG. 1, the ten different wavelengths λ1 through λ10 are contained in each WDM signal, so m=10.

The number of wavelengths in the apparatus is five. Therefore, in the λ-XC apparatus 1, λ1 through λ5, for example, are assigned and each of the wavelengths λ1 through λ10 contained in each WDM signal is converted into one of the wavelengths λ1 through λ5. Moreover, a time division number is ten. Therefore, a pulse width of 100 ps each of the wavelength-converted signals has at input time is compressed into 10 ps by dividing 100 ps by 10.

At the point B, each of the wavelengths λ1 through λ10 contained in the WDM1 signal has been converted into one of the wavelengths λ1 through λ5. That is to say, the wavelength conversions of λ1→λ1 (not wavelength-converted), λ2→λ5, λ10→λ1, and so on have been performed. In addition, as a result of the pulse width compression, a pulse width of 100 ps each wavelength-converted signal had has been compressed into 10 ps (100 ps/10=10 ps) (in this case, the amount of the information each wavelength-converted signal had remains 10-Gbit/s). The phase shift has been performed on these compressed signals so that two or more of them will not be at the same time position.

Accordingly, at the point B each of the different wavelengths λ1 through λ10 contained in the WDM1 signal at the point A has been converted into one of the wavelengths λ1 through λ5. The pulse width of each of the wavelength-converted signals has been compressed into 10 ps. In addition, the phases of these ten compressed signals have been shifted so that two or more of them will not be at the same position on a time axis (that is to say, so that the center frequencies of two or more of them will not be at the same position on a time axis). The same process has been performed on the WDM2 through WDM5 signals.

At the point C, the signals have been switched by the wavelength switching sections 12-1 through 12-5 and signals with the same wavelength have been combined. That is to say, the signals at the point B are separated by the demultiplexers 12a-1 through 12a-5 according to wavelengths and are combined by the multiplexers 12b-1 through 12b-5 according to wavelengths For example, the multiplexer 12b-1 combines ten signals with the wavelength λ1.

At the point D, a wavelength conversion and pulse width expansion have been performed by the output optical signal processing sections 13-1 through 13-5 and WDM signals have been obtained. When the output optical signal processing sections 13-1 through 13-5 perform the wavelength conversion process, they recognize in advance wavelengths according to the phases of input signals into which the input signals are wavelength-converted (these wavelengths are set in advance or are informed of by an upper layer). Moreover, the output optical signal processing sections 13-1 through 13-5 expand the pulse width of the input signals to the original value by the pulse width expansion process.

For example, the output optical signal processing section 13-1 recognizes in advance wavelengths according to phases into which the ten signals with the wavelength λ1 contained in the WDM1 signal at the point C is wavelength-converted and converts the ten wavelengths λ1 into λ1 through λ10 on the basis of the phase of each signal. In addition, the output optical signal processing section 13-1 expands the pulse width of each signal from 10 ps to 100 ps, being the original pulse width. An optical cross-connection is performed in this way and a WDM signal is outputted.

The throughput of the λ-XC apparatus 1 will now be described in detail by comparison with conventional optical cross-connect apparatus. The throughput of optical fiber transmission between stations and the throughput of intra-apparatus optical fiber transmission in the λ-XC apparatus 1 (not the throughput of optical cross-connection by the wavelength switching section 12 but the throughput of transmission by an optical fiber located in the λ-XC apparatus 1) will be described first.

Figure 4:
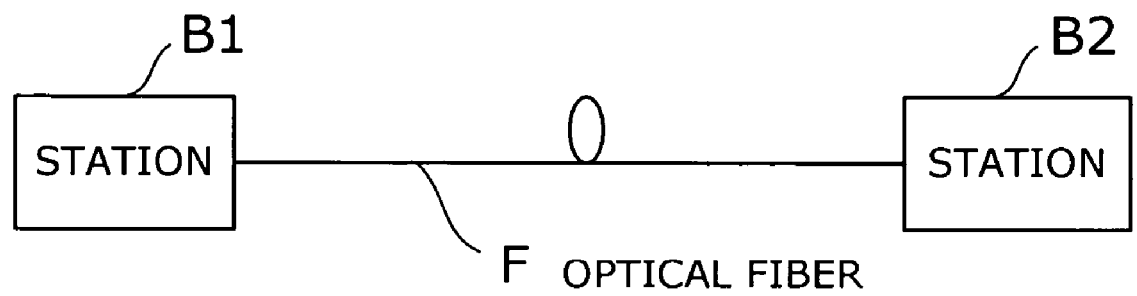
FIG. 4 shows optical fiber transmission between stations.

FIG. 4 shows optical fiber transmission between stations. Stations B1 and B2 (repeating station spacing is about 100 km) are connected via an optical fiber (single mode fiber abbreviated as SMF) F to perform optical transmission. The throughput of optical fiber transmission in such a system will be discussed.

Figure 5:
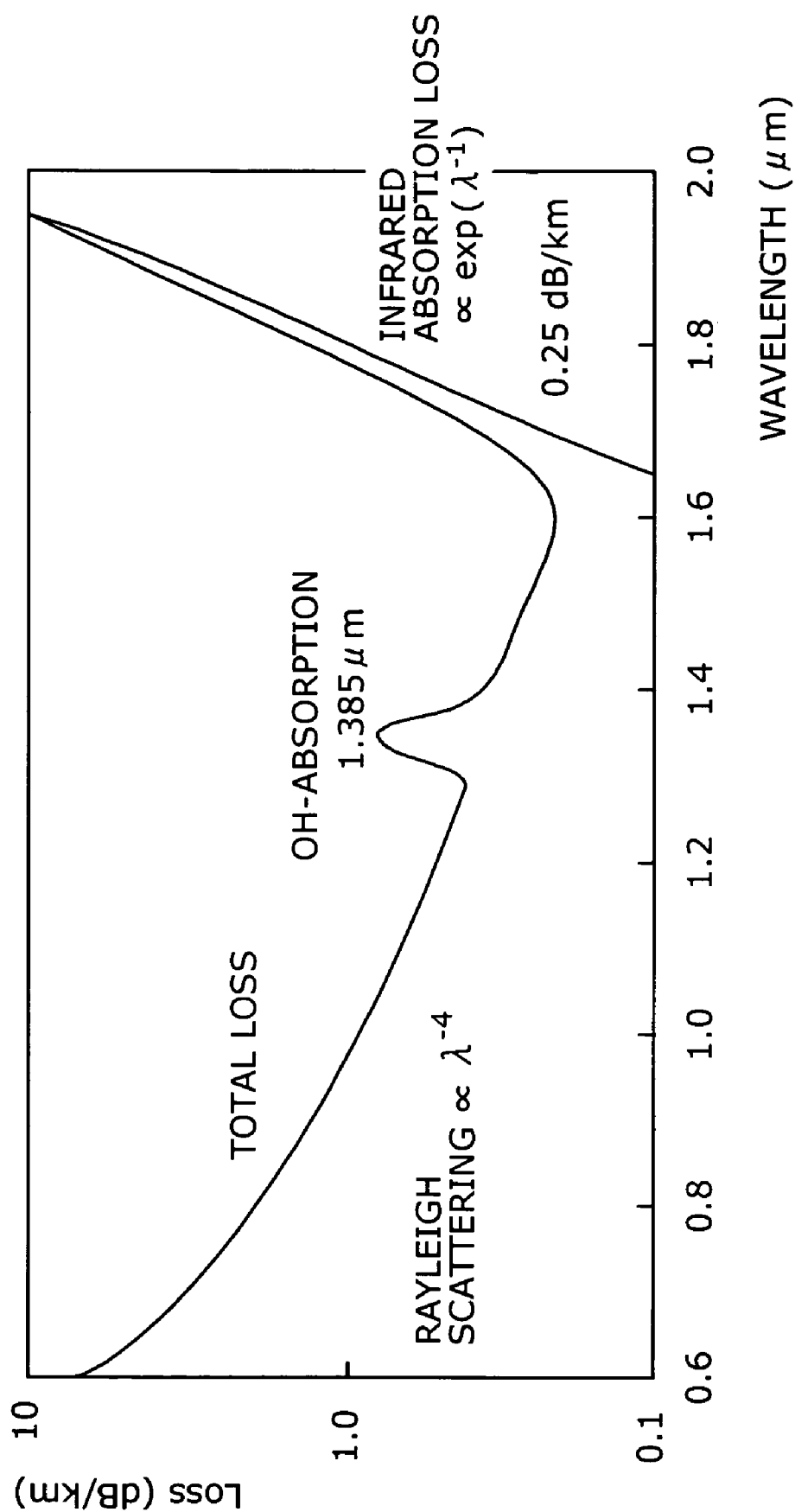
FIG. 5 shows the characteristics of an optical fiber.

FIG. 5 shows the characteristics of an optical fiber. The loss characteristics of an SMF are shown. Vertical and horizontal axes indicate loss (dB/km) and wavelengths ($\mu$m) respectively. When optical transmission is performed, a wavelength region where optical loss is small should be used. Therefore, as shown in FIG. 5, the wavelength region from about 1,200 to 1,600 nm where optical loss is comparatively small will be used in optical transmission by an SMF. Actually, the ITU-T has standardized the wavelength region ranging from the O band to the U band.

FIG. 6 shows wavelength regions used in optical transmission by an SMF. FIG. 6 is a table showing a wavelength region ranging from the O band (1,260 to 1,360 nm) to the U band (1,625 to 1,675 nm). This wavelength region has been standardized by the ITU-T. As can be seen from FIG. 6, a wavelength band which can be used in optical transmission ranges from 1,260 nm in the O band to 1,675 nm in the U band. That is to say, there is a bandwidth of about 400 nm, which is converted into a frequency of about 50 THz. Therefore, an optical fiber band used in optical transmission is 50 THz. The following descriptions will be given mainly with a case in which an optical fiber band is 50 THz and in which the bit rate of an input optical signal is 10 Gbits/s as an example.

Figure 7:
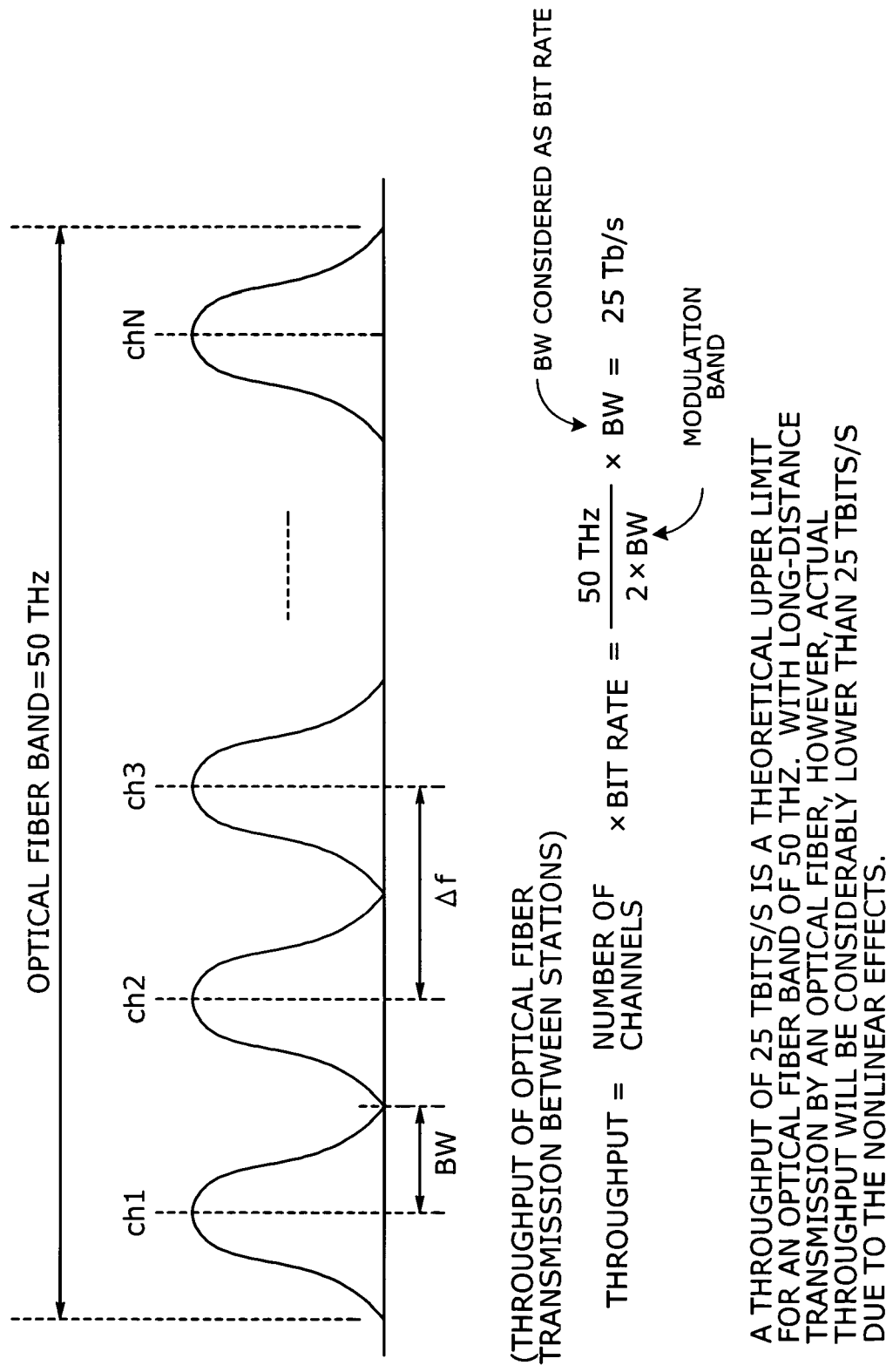
FIG. 7 is a view for describing how to calculate the throughput of optical fiber transmission between stations.

FIG. 7 is a view for describing how to calculate the throughput of optical fiber transmission between stations. In this example, N wavelengths (N channels) are multiplexed into an optical fiber band. BW and Δf in FIG. 7 express a modulation band and spacing between adjacent frequencies (spacing between adjacent channels) respectively. The value of the modulation band BW is approximately equal to that of a bit rate. For example, an optical signal the bit rate of which is 10 Gbits/s has an approximately 10-GHz frequency component.

The throughput of optical fiber transmission in the system shown in FIG. 4 will now be calculated. If an optical fiber band is 50 THz, the number of channels is (50 THz/(2×BW)). The value of a bit rate can be considered as that of BW. Throughput is given by (number of channels)×(bit rate). In this case, throughput=(50 THz/(2×BW))×BW=25 Tbits/s. If the bit rate of an optical signal is 10 Gbits/s, spacing Δf between adjacent channels is 20 GHz. Therefore, 2,500 (=50 THz/(2×10 GHz)) wavelength channels can be multiplexed.

A throughput of 25 Tbits/s calculated in this way is a theoretical upper limit for an optical fiber band of 50 THz. However, long-distance transmission by an optical fiber will cause nonlinear effects, such as wavelength dispersion, so actual throughput will be considerably lower than 25 Tbits/s.

The throughput of optical fiber transmission (intra-apparatus optical fiber transmission) in the λ-XC apparatus 1 will now be described. FIG. 8 is a view for describing how to calculate the throughput of intra-apparatus optical fiber transmission. The bit rate of a pulse which has passed through the input optical signal processing section 11 in the λ-XC apparatus 1 does not change (10 Gbits/s), but its duty becomes shorter. If the width of the pulse which has width-compressed is expressed as Δτ, a signal band for the compressed pulse is 1/Δτ.

The throughput of the intra-apparatus optical fiber transmission will now be calculated. If an optical fiber band is 50 THz, the number of compressed pulses (the number of channels) is (50 THz/(2×1/Δτ)). The bit rate of one compressed pulse is ((100 ps/Δτ)×10 Gbits/s). Throughput is given by (number of compressed pulses)×(bit rate of one compressed pulse). In this case, throughput is 25 Tbits/s. If a band for an optical fiber used in the λ-XC apparatus 1 is expressed as BWfiber, then intra-apparatus throughput can be calculated by the simplified formula:

$$BWfiber/2$$

A throughput of 25 Tbits/s calculated in this way is a theoretical upper limit for an optical fiber band of 50 THz. The intra-apparatus optical fiber transmission is short distance transmission, so the influence of the nonlinear effects is not great. Therefore, with the λ-XC apparatus 1, an intra-apparatus throughput of 25 Tbits/s, being a theoretical upper limit, may be regarded as feasible.

The throughput of an optical matrix switch in a conventional optical cross-connect apparatus (hereinafter referred to as the OXC apparatus) and the throughput of optical cross-connection by the λ-XC apparatus 1 will now be described. The structure of a conventional OXC apparatus will be described first.

Figure 9:
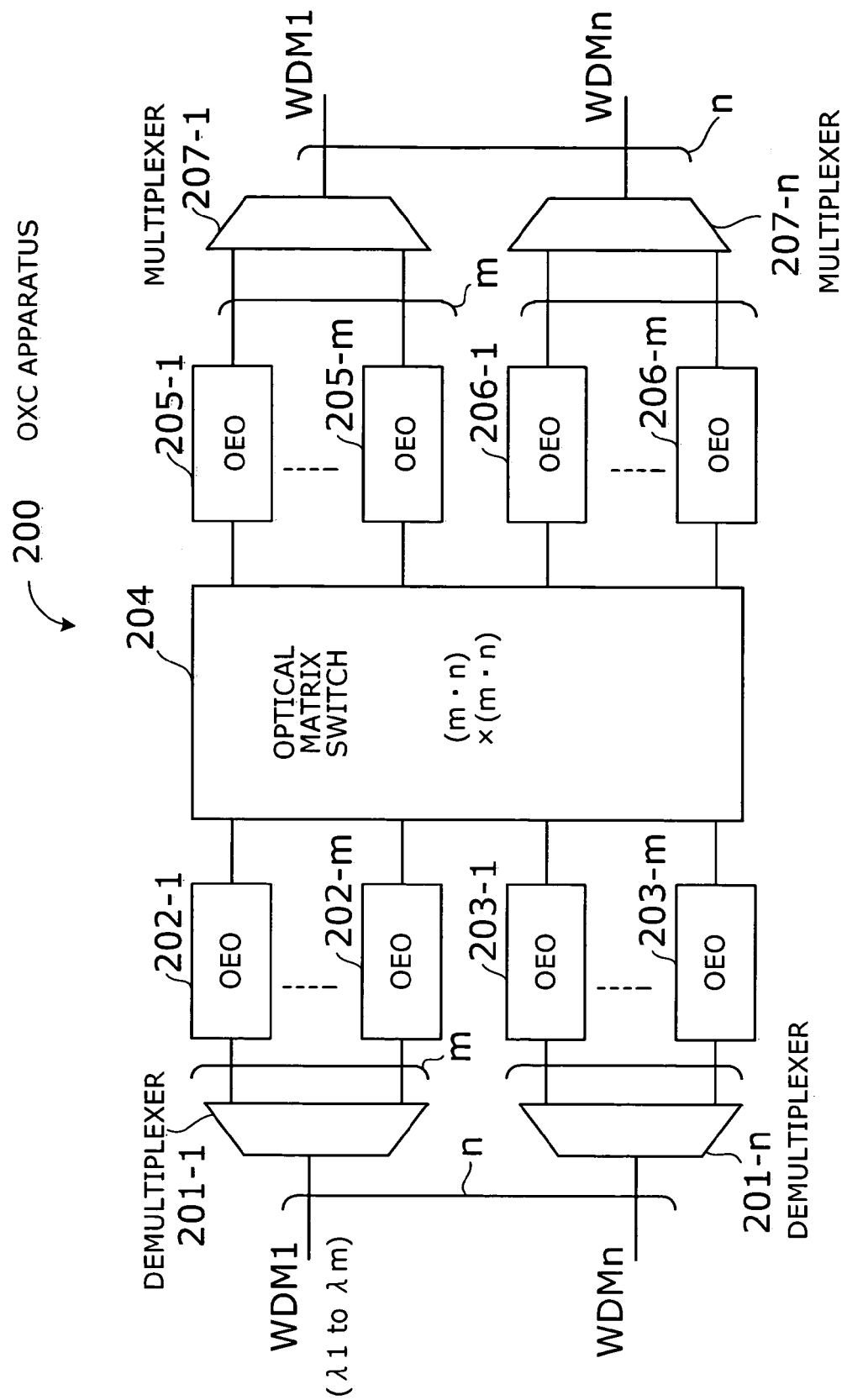
FIG. 9 shows the an outline of the structure of an OXC apparatus.

FIG. 9 shows an outline of the structure of an OXC apparatus. A conventional OXC apparatus 200 comprises demultiplexers 201-1 through 201-n, OEOs 202-1 through 202-m and 203-1 through 203-m, an optical matrix switch 204, OEOs 205-1 through 205-m and 206-1 through 206-m, and multiplexers 207-1 through 207-n.

The demultiplexers 201-1 through 201-n separate WDM signals into different wavelengths. The OEOs 202-1 through 202-m and 203-1 through 203-m perform optical-electrical-optical conversions to convert these wavelengths. The optical matrix switch 204 performs switching at the optical level. The OEOs 205-1 through 205-m and 206-1 through 206-m perform optical-electrical-optical conversions on the switched optical signals to convert the converted wavelengths again. The multiplexers 207-1 through 207-n combine the optical signals and output WDM signals. In FIG. 9, the number of WDM input optical signals is n and the number of different wavelengths contained in each WDM input optical signal is m. Therefore, the optical matrix switch 204 is an (m.times.n).times.(m.times.n) switch.

It is assumed that the optical matrix switch 204 is a three-dimensional MEMS switch. 1,000.times.1,000 channel MEMS switches have been developed now. For example, to handle 10 WDM input optical signals each containing 100 different wavelengths, a 1,000.times.1,000 channel switch is required.

If a bit rate is 10 Gbits/s, then the throughput of the 1,000.times.1,000 channel optical matrix switch 204 is 10 Tbits/s (=100 (number of different wavelengths)×10 (number of WDM input optical signals)×10 Gbits/s).

To achieve a throughput of 100 Tbits/s by performing larger capacity switching, the 10,000.times.10,000 channel optical matrix switch 204 must be used. For example, in a case where a bit rate is 10 Gbits/s, the number of WDM input optical signals is 100, and the number of different wavelengths contained in each WDM input optical signal is 100, a 10,000.times.10,000 channel switch will be required.

However, taking into consideration the current fabrication techniques, it will be very difficult to form such a 10,000.times.10,000 channel switch by using optical elements, such as MEMSes. Moreover, switching control will be very complex. Accordingly, the conventional OXC apparatus 200 which performs optical cross-connection by using the above active optical matrix switch 204 will not be able to accommodate large capacity networks which will appear in the future.

The throughput of optical cross-connection by the λ-XC apparatus 1 will now be described. Conditions concerning switch size under which cross talk will not occur in the λ-XC apparatus 1 will be described first. In the above description, the width of a compressed pulse which has passed through the input optical signal processing section 11 in the λ-XC apparatus 1 is expressed as Δτ. However, if a time division number for the pulse width compression is equal to m (the number of different wavelengths contained in each WDM input optical signal), then Δτ equals 100 ps/m (it is assumed that a bit rate is 10 Gbits/s). A signal band BW for a compressed pulse is given by (1/pulse width), so BW=m/100 ps (=1/(100 ps/m)).

It is assumed that the number of wavelengths in the apparatus is equal to n (the number of WDM input optical signals). If an optical fiber band is 50 THz, the following condition must be met to prevent cross talk from occurring in the apparatus.

$$2 \times BW \times n \leq 50 \text{ THz } (n \leq 50 \text{ THz}/(2 \times BW))$$

Figure 10A:
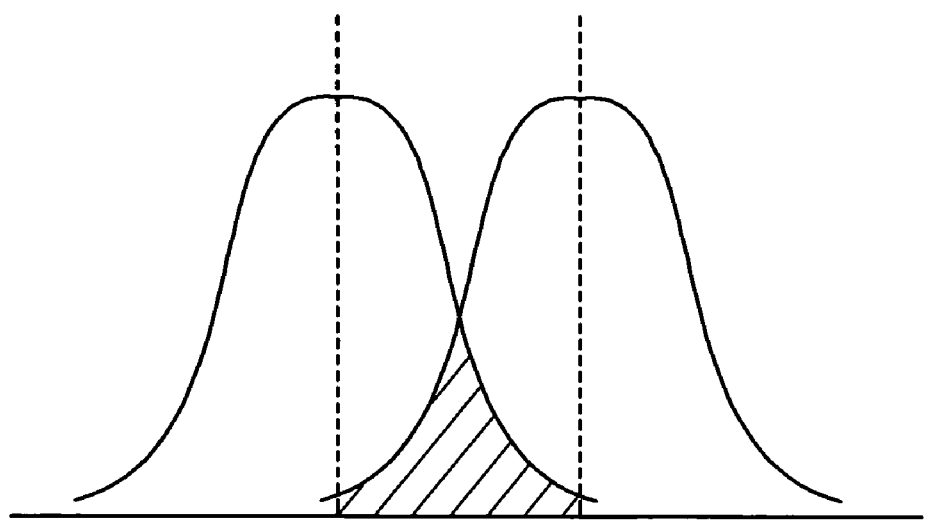
FIGS. 10(A) and 10(B) are views for describing cross talk, FIG. 10(A) being a view showing a state in which cross talk has occurred, FIG. 10(B) being a view showing a state in which cross talk does not occur.
Figure 10B:
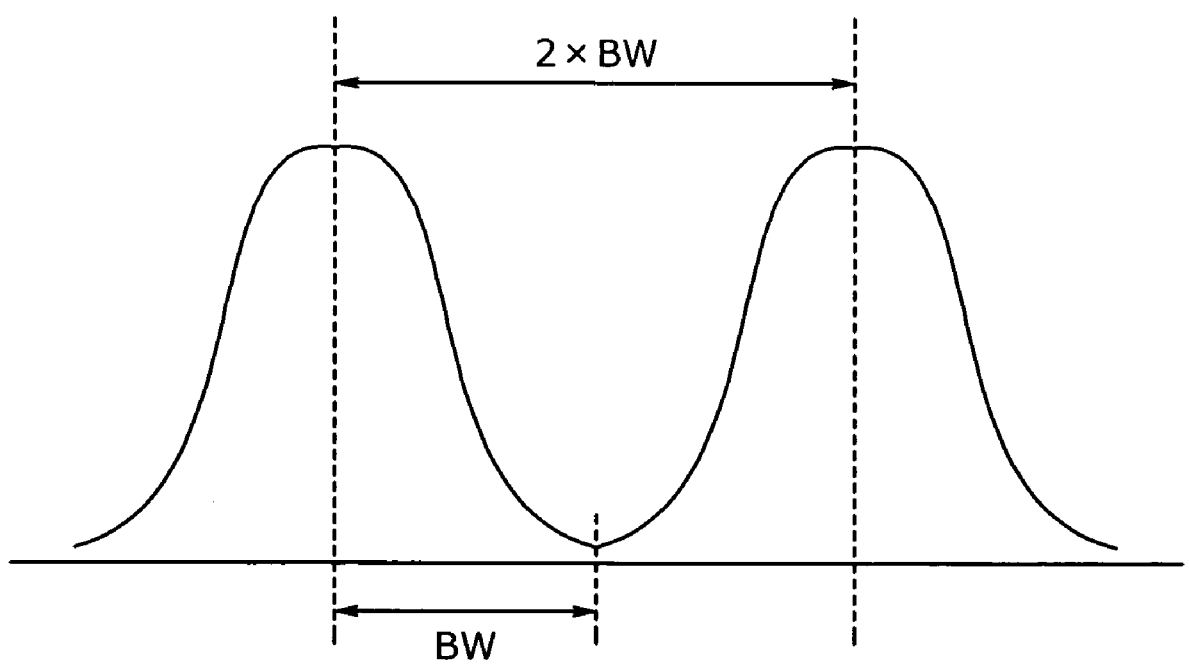

FIGS. 10(A) and 10(B) are views for describing cross talk. FIG. 10(A) shows a state in which cross talk has occurred. FIG. 10(B) shows a state in which cross talk does not occur. If there is an overlap (crosshatched area in FIG. 10 (A)) between signals in adjacent channels, frequency components in one channel will leak into the other, resulting in the occurrence of cross talk.

On the other hand, if signals in adjacent channels are separated in frequency as shown in FIG. 10(B), then cross talk will not occur. As can be seen from FIG. 10(B), cross talk will not occur (restrictions will not be imposed on the band) if there is a separation of at least (2×BW) between center frequencies in adjacent channels. Therefore, by ensuring a separation of at least (2×BW) between center frequencies in adjacent channels, the occurrence of cross talk can be avoided in an optical fiber band of 50 THz.

$$\text{Switch size } n.\text{times}.m = (50 \text{ THz}/(2 \times BW)) \times (BW \times 100 \text{ ps}) = 2,500$$

Accordingly, if the optical fiber band is 50 THz and input is provided at a rate of 10 Gbits/s, n and m should be set so that they will meet the inequality $$n \times m \leq 2500$$

By doing so, signals in adjacent channels will not overlap. As a result, the λ-XC apparatus 1 can perform optical cross-connection without causing cross talk. A general inequality indicative of conditions under which cross talk will not occur can be written as:

$$n \times m \leq BWfiber \times \Delta T \times 1/2$$

where ΔT (100 ps, in this example) is the pulse width of an input optical signal.

The conditions concerning switch size under which cross talk will not occur in the λ-XC apparatus 1 have been obtained now. Next, the throughput of optical cross-connection by the λ-XC apparatus 1 will be calculated. Throughput is given by (switch size)×(bit rate), that is to say, n×m×(bit rate). In this case, the throughput is 25 Tbits/s (=2,500×10 Gbits/s). That is to say, if the bit rate is 10 Gbits/s, a maximum throughput of 25 Tbits/s will be obtained when the λ-XC apparatus 1 performs optical cross-connection without causing cross talk. Therefore, the same throughput value that is obtained by the intra-apparatus optical fiber transmission described with reference to FIG. 8 can be achieved.

As described above, the λ-XC apparatus 1 according to the present invention comprises the input optical signal processing section 11, the wavelength switching section 12 including the passive optical devices, and the output optical signal processing section 13. A throughput value obtained when this λ-XC apparatus 1 performs optical cross-connection is the same as that obtained at intra-apparatus optical fiber transmission time. Therefore, the λ-XC apparatus 1 can perform far more large-capacity and high-throughput operation than the conventional OXC apparatus 200.

Figure 11:
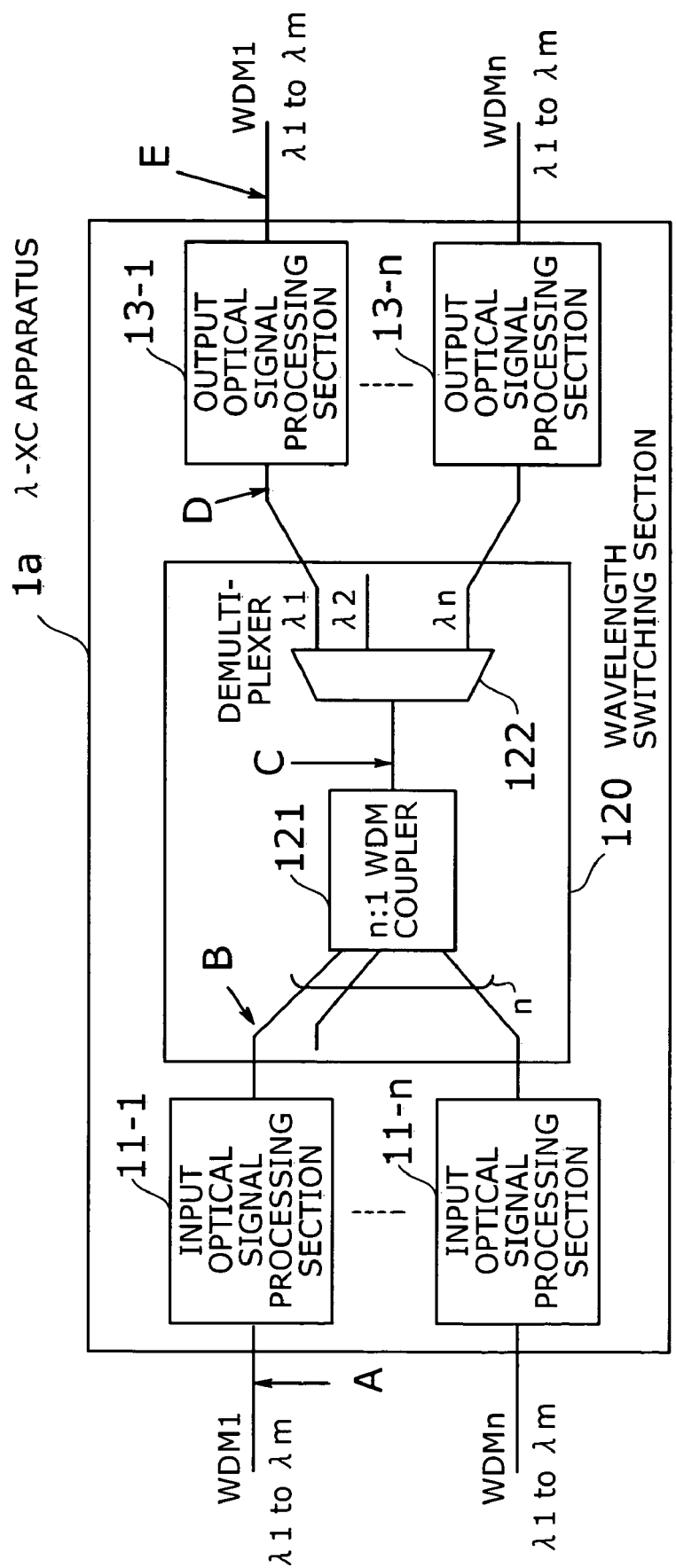
FIG. 11 shows the structure of a λ-XC apparatus including a modification of the wavelength switching section.
Figure 12:
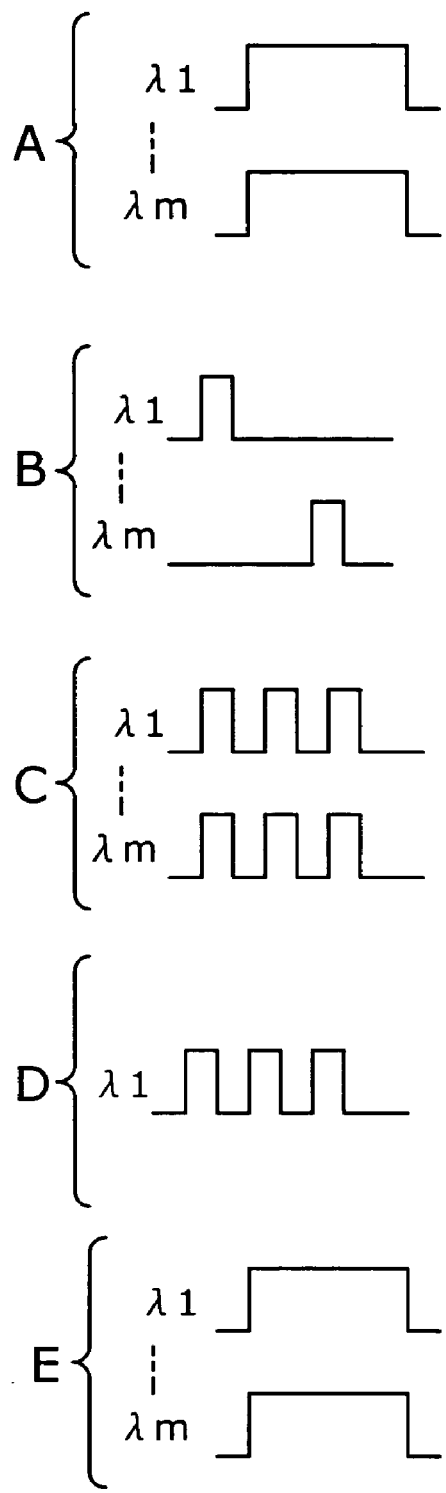
FIG. 12 shows signals at the points A through E shown in FIG. 11.

A modification of the wavelength switching section 12 will now be described. FIG. 11 shows the structure of a λ-XC apparatus including a modification of the wavelength switching section. FIG. 12 shows signals at the points A through E shown in FIG. 11.

A λ-XC apparatus 1a comprises input optical signal processing sections 11-1 through 11-n, a wavelength switching section 120, and output optical signal processing sections 13-1 through 13-n. The input optical signal processing sections 11-1 through 11-n and the output optical signal processing sections 13-1 through 13-n are the same as the input optical signal processing sections 11-1 through 11-5 and the output optical signal processing sections 13-1 through 13-5, respectively, shown in FIG. 1, so the following description will center about the wavelength switching section 120.

The wavelength switching section 120 includes an n:1 WDM coupler 121 and a demultiplexer 122. The n:1 WDM coupler 121 concentrates n output lines from the input optical signal processing sections 11-1 through 11-n and combines signals compressed by the input optical signal processing sections 11-1 through 11-n to generate a composite signal. The demultiplexer 122 separates the composite signal into different wavelengths.

A signal at the point A is a WDM signal containing wavelengths λ1 through λm each having a pulse width of 100 ps. At the point B, a wavelength conversion, pulse width compression, and a phase shift have been performed on the WDM signal. At the point C, compressed pulses with the wavelengths λ1 through λm outputted from the input optical signal processing sections 11-1 through 11-n have been combined. At the point D, a plurality of compressed pulses with the wavelength λ1 have been combined. A signal at the point E is a WDM signal containing the wavelengths λ1 through λm each having a pulse width of 100 ps. Compared with the wavelength switching section 12 shown in FIG. 1, the structure of the wavelength switching section 120 enables a reduction in the number of parts included therein.

Figure 13:
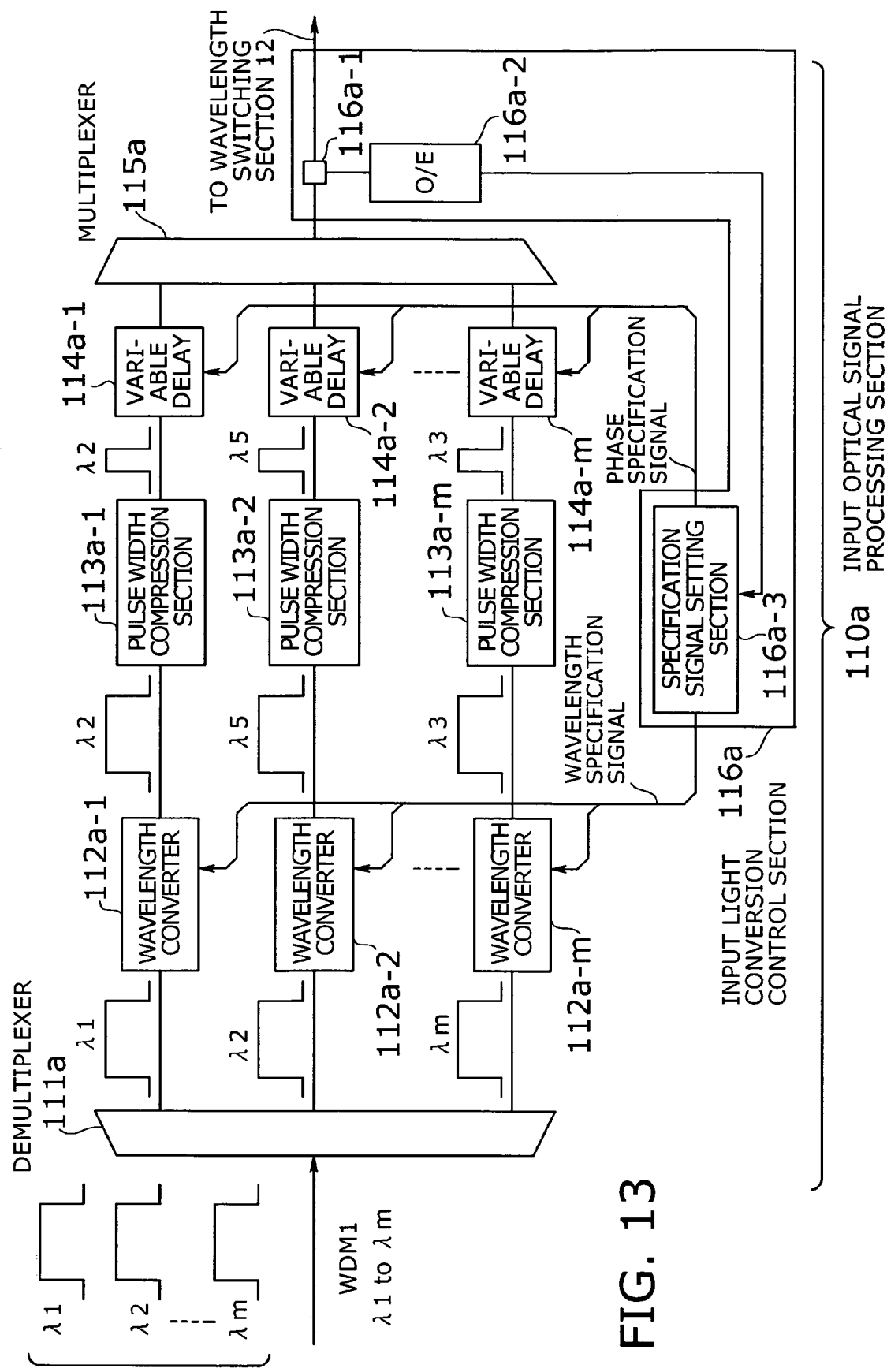
FIG. 13 shows the structure of an input optical signal processing section according to a first embodiment.

The structure and operation of the input optical signal processing section 11 will now be described. FIG. 13 shows the structure of an input optical signal processing section according to a first embodiment. An input optical signal processing section 110a according to a first embodiment includes a demultiplexer 111a, wavelength converters 112a-1 through 112a-m, pulse width compression sections 113a-1 through 113a-m, variable delays 114a-1 through 114a-m, a multiplexer 115a, and an input light conversion control section 116a.

The input light conversion control section 116a includes a drop section 116a-1, an O/E 116a-2, and a specification signal setting section 116a-3. If the number of WDM input optical signals is n, then an input section in the λ-XC apparatus 1 will include n input optical signal processing sections 110a each having such structure.

The demultiplexer 111a separates a WDM input signal containing wavelengths λ1 through λm into different wavelengths. The wavelength converters 112a-1 through 112a-m convert the different wavelengths on the basis of wavelength specification signals. In this example, the wavelength converter 112a-1 converts λ1 into λ2, the wavelength converter 112a-2 converts λ2 into λ5, and the wavelength converter 112a-m converts λm into λ3.

The pulse width compression sections 113a-1 through 113a-m compress the pulse width of the signals wavelength-converted. The variable delays 114a-1 through 114a-m shift (delay) the phase of the compressed pulses on the basis of phase specification signals. The multiplexer 115a combines the compressed pulses phase-shifted and sends a composite signal to the wavelength switching section 12 at the next stage.

The O/E 116a-2 converts an output optical pulse from the multiplexer 115a dropped by the drop section 116a-1 into an electrical signal. The specification signal setting section 116a-3 generates values (phase specification signals) by which the variable delays 114a-1 through 114a-m should delay the phase of the compressed pulses on the basis of the electrical signal and sends them to the variable delays 114a-1 through 114a-m. In addition, the specification signal setting section 116a-3 generates the wavelength specification signals for instructing the wavelength converters 112a-1 through 112a-m which wavelengths they should convert the different wavelengths into and sends the wavelength specification signals to the wavelength converters 112a-1 through 112a-m.

Figure 14:
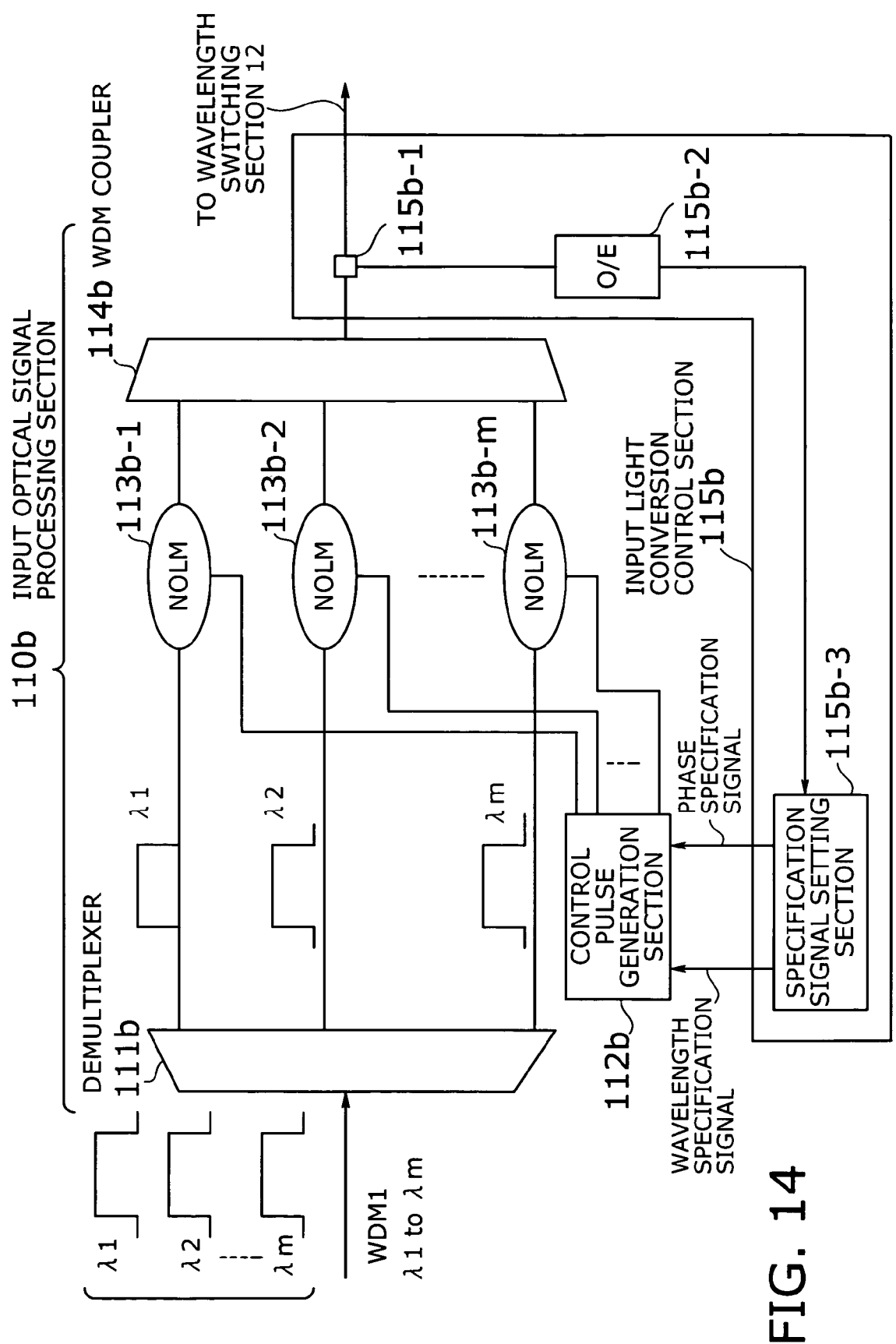
FIG. 14 shows the structure of an input optical signal processing section according to a second embodiment.

FIG. 14 shows the structure of an input optical signal processing section according to a second embodiment. An input optical signal processing section 110b according to a second embodiment includes a demultiplexer 111b, a control pulse generation section 112b, nonlinear loop mirrors (NOLMs) 113b-1 through 113b-m, a WDM coupler 114b, and an input light conversion control section 115b.

The input light conversion control section 115b includes a drop section 115b-1, an O/E 115b-2, and a specification signal setting section 115b-3 (the input light conversion control section 115b has the same function as the input light conversion control section 116a described in FIG. 13, so descriptions of its operation will be omitted). If the number of WDM input optical signals is n, then the input section in the λ-XC apparatus 1 will include n input optical signal processing sections 110b each having such structure.

The demultiplexer 111b separates a WDM input signal containing wavelengths λ1 through λm into different wavelengths. The control pulse generation section 112b generates a short control pulse with a variable wavelength on the basis of a wavelength specification signal and outputs this control pulse in a phase based on a phase specification signal.

The optical signals demultiplexed by the demultiplexer 111b and control pulses are inputted to the NOLMs 113b-1 through 113b-m. The NOLMs 113b-1 through 113b-m output overlap portions of these optical signals with the control pulses (described later with reference to FIG. 15). The WDM coupler 114b combines output from the NOLMs 113b-1 through 113b-m and sends a composite signal to the wavelength switching section 12 at the next stage.

Figure 15:
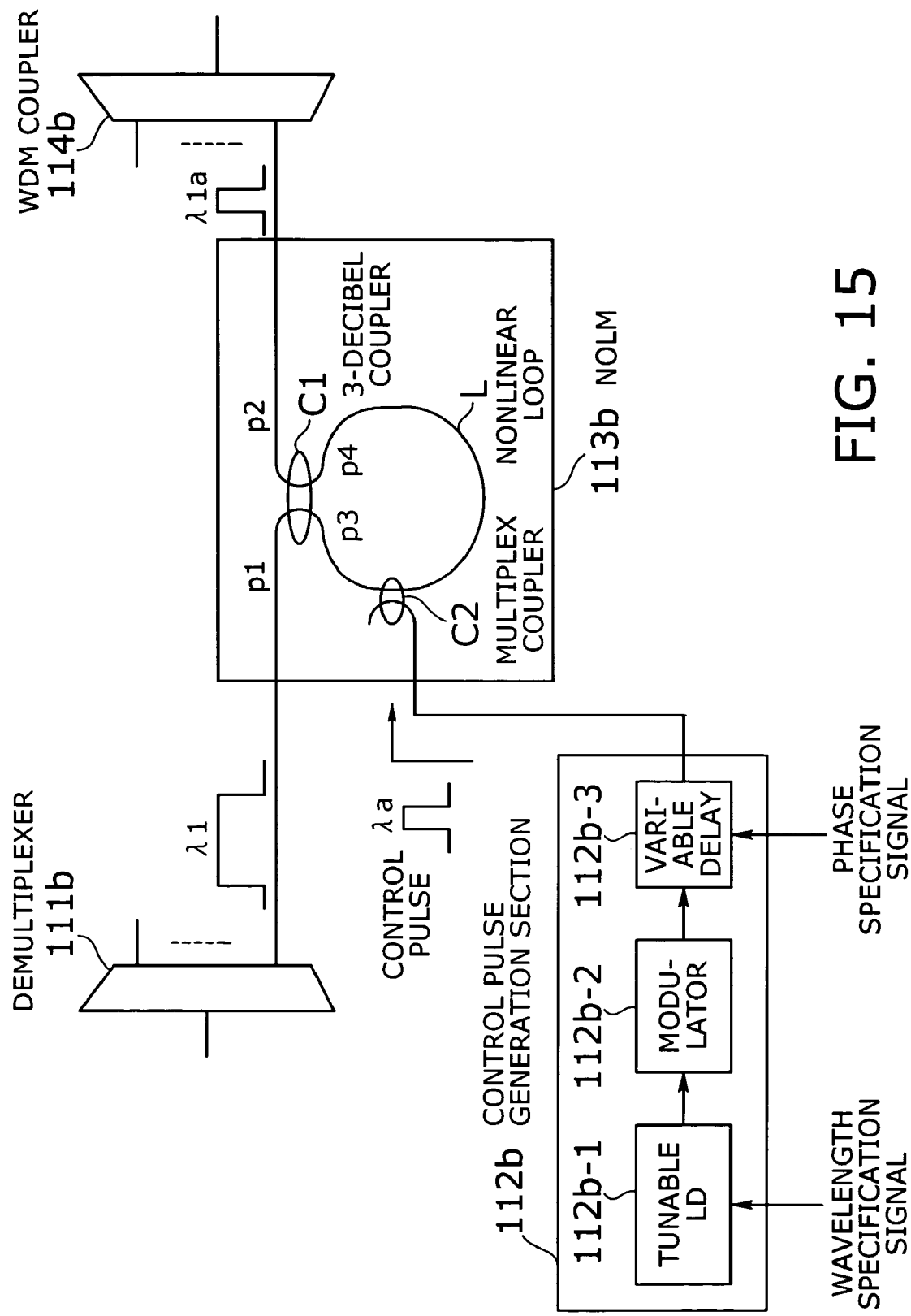
FIG. 15 is a view for describing the operation of a NOLM and a control pulse generation section.

FIG. 15 is a view for describing the operation of the NOLM 113b and the control pulse generation section 112b. The control pulse generation section 112b includes a tunable laser diode (LD) 112b-1, a modulator 112b-2, and a variable delay 112b-3. The NOLM 113b includes a 3-decibel coupler C1, a multiplex coupler (which performs the same wavelength multiplexing as the WDM coupler) C2, and a nonlinear loop L.

An output terminal of the variable delay 112b-3 is connected to one end of the multiplex coupler C2. One output terminal of the demultiplexer 111b is connected to a port p1 of the 3-decibel coupler C1 and a port p2 of the 3-decibel coupler C1 is connected to one input terminal of the WDM coupler 114b.

The operation of the control pulse generation section 112b is as follows. The tunable LD 112b-1 is a light source which emits light with a wavelength based on a wavelength specification signal. The modulator 112b-2 modulates the light outputted from the tunable LD 112b-1 and generates short pulse light. The variable delay 112b-3 delays the short pulse light on the basis of a phase specification signal and inputs it to the multiplex coupler C2 in the NOLM 113b as a control pulse λa.

The operation of the NOLM 113b will now be described in detail. The 3-decibel coupler C1 with a one-to-one coupling ratio separates an optical signal λ1 demultiplexed by the demultiplexer 111b and inputted from the port p1 at a ratio of fifty to fifty. The multiplex coupler C2 combines one of the two optical signals λ1 into which the 3-decibel coupler C1 separates the original optical signal λ1 and the control pulse λa.

If the control pulse λa is not inputted, the optical signal λ1 inputted from the port p1 of the 3-decibel coupler C1 is distributed to ports p3 and p4 of the 3-decibel coupler C1. An optical signal inputted from the port p3 propagates counterclockwise through the nonlinear loop (optical fiber loop) L and an optical signal inputted from the port p4 propagates clockwise through the nonlinear loop L. Then these two optical signals are inputted again to the 3-decibel coupler C1 concurrently with each other.

In this case, the optical signal λ1 is not outputted to the port p2 of the 3-decibel coupler C1. The optical signal λ1 is outputted only to the port p1 as a result of interference between the two optical signals which propagates counterclockwise and clockwise, respectively, through the nonlinear loop L. That is to say, from the input side of the optical signal λ1, the optical signal λ1 is reflected by a loop mirror made up of the 3-decibel coupler C1 and the nonlinear loop L (therefore referred to as a nonlinear optical loop mirror).

On the other hand, if the control pulse λa is inputted, the optical signal λv1 propagating counterclockwise from the port p1 of the 3-decibel coupler C1 through the nonlinear loop L will overlap with the control pulse λa. While the optical signal λ1 is propagating through the nonlinear loop L, a change in the phase of the overlap portion of the optical signal λ1 will occur in proportion to the intensity of the control pulse λa due to a cross phase modulation effect, being one of the nonlinear optical effects.

When this optical signal is inputted again to the 3-decibel coupler C1, only the portion the phase of which has changed will be outputted from the port p2 as a result of interference in the 3-decibel coupler C1. That is to say, an optical gate function by which only the overlap portion (λ1a) of the optical signal λ1 with the control pulse λa is outputted from the port p2 will be realized. A wavelength conversion, pulse width compression, and a phase shift can be performed on demultiplexed optical signals by the control pulse generation section 112b and the NOLM 113b in this way.

Figure 16:
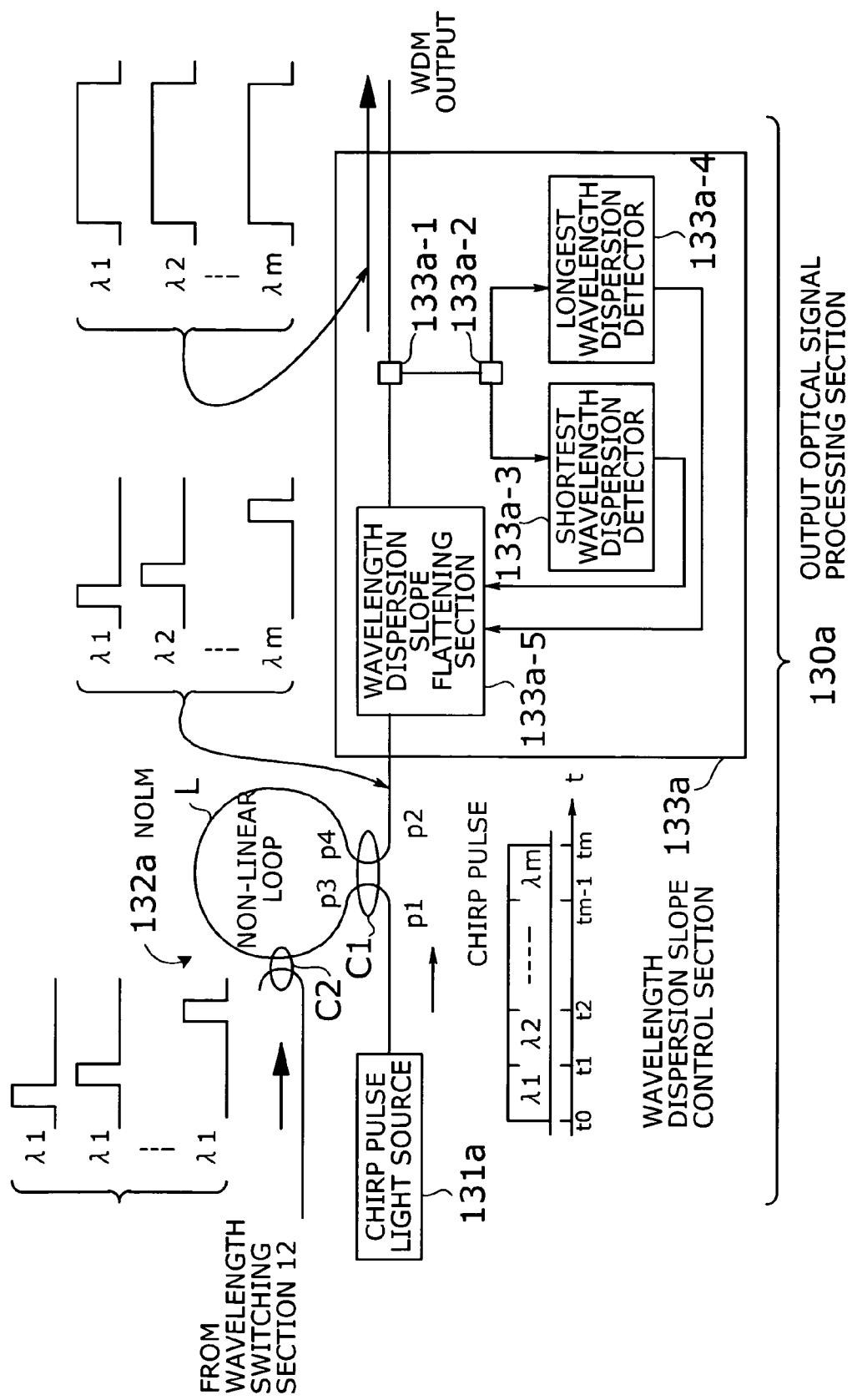
FIG. 16 shows the structure of an output optical signal processing section according to a first embodiment.

The structure and operation of the output optical signal processing section 13 will now be described. FIG. 16 shows the structure of an output optical signal processing section according to a first embodiment. An output optical signal processing section 130a according to a first embodiment includes a chirp pulse light source 131a, a NOLM 132a, and a wavelength dispersion slope control section 133a. The wavelength dispersion slope control section 133a includes drop sections 133a-1 and 133a-2, a shortest wavelength dispersion detector 133a-3, a longest wavelength dispersion detector 133a-4, and a wavelength dispersion slope flattening section 133a-5. The NOLM 132a includes a 3-decibel coupler C1, a multiplex coupler C2, and a nonlinear loop L.

If the number of WDM input optical signals is n, then an output section in the λ-XC apparatus 1 will include n output optical signal processing sections 130a each having such structure.

An output terminal of the wavelength switching section 12 is connected to one end of the multiplex coupler C2. An output terminal of the chirp pulse light source 131a is connected to a port p1 of the 3-decibel coupler C1 and a port p2 of the 3-decibel coupler C1 is connected to an input terminal of the wavelength dispersion slope flattening section 133a-5.

The chirp pulse light source 131a is a light source which emits a chirp pulse, being a pulse the wavelength (frequency) of which changes continuously with time. For example, the wavelength of a chirp pulse is λ1 from time t0 to t1, λ2 from time t1 to t2, . . . , and λm from time tm−1 to tm (the width of an input optical signal is 100 ps, so the width of the chirp pulse is also 100 ps).

An optical signal (switched pulse) outputted from the wavelength switching section 12 is inputted from the multiplex coupler C2 in the NOLM 132a and the chirp pulse is inputted from the 3-decibel coupler C1. The 3-decibel coupler C1 separates the chirp pulse inputted from the port p1 at a ratio of fifty to fifty. The multiplex coupler C2 combines one of the two chirp pulses into which the 3-decibel coupler C1 separates the original chirp pulse and the switched pulse.

The chirp pulse propagating clockwise from the port p1 of the 3-decibel coupler C1 through the nonlinear loop L will overlap with the switched pulse. While the chirp pulse is propagating through the nonlinear loop L, a change in the phase of the overlap portion of the chirp pulse will occur in proportion to the intensity of the switched pulse due to a cross phase modulation effect, being one of the nonlinear optical effects.

When this chirp pulse is inputted again to the 3-decibel coupler C1, only the portion the phase of which has changed will be outputted from the port p2 as a result of interference in the 3-decibel coupler C1. That is to say, an optical gate function by which only the overlap portion of the chirp pulse with the switched pulse is outputted from the port p2 will be realized. A plurality of signals outputted from the wavelength switching section 12 have the same wavelength (λ1, in this example) and different phases. As a result of such control by the NOLM 132a, the wavelengths λ1 of these signals are converted into λ1 through λm.

The wavelength-converted signals pass through the wavelength dispersion slope flattening section 133a-5 and are dropped by the drop sections 133a-1 and 133a-2. The dropped signals are inputted to the shortest wavelength dispersion detector 133a-3 and the longest wavelength dispersion detector 133a-4. The shortest wavelength dispersion detector 133a-3 selects a signal which has the shortest wavelength λ1 among λ1 through λm and detects the wavelength dispersion value of the λ1 signal. The longest wavelength dispersion detector 133a-4 selects a signal which has the longest wavelength λm among λ1 through λm and detects the wavelength dispersion value of the λm signal.

The wavelength dispersion slope flattening section 133a-5 (a device which has a great dispersion value and which can change a wavelength dispersion value and a wavelength dispersion slope is used) flattens a slope obtained from the detected wavelength dispersion values of the λ1 and λm signals to equally expand the pulse widths of the λ1 through λm signals.

Figure 17:
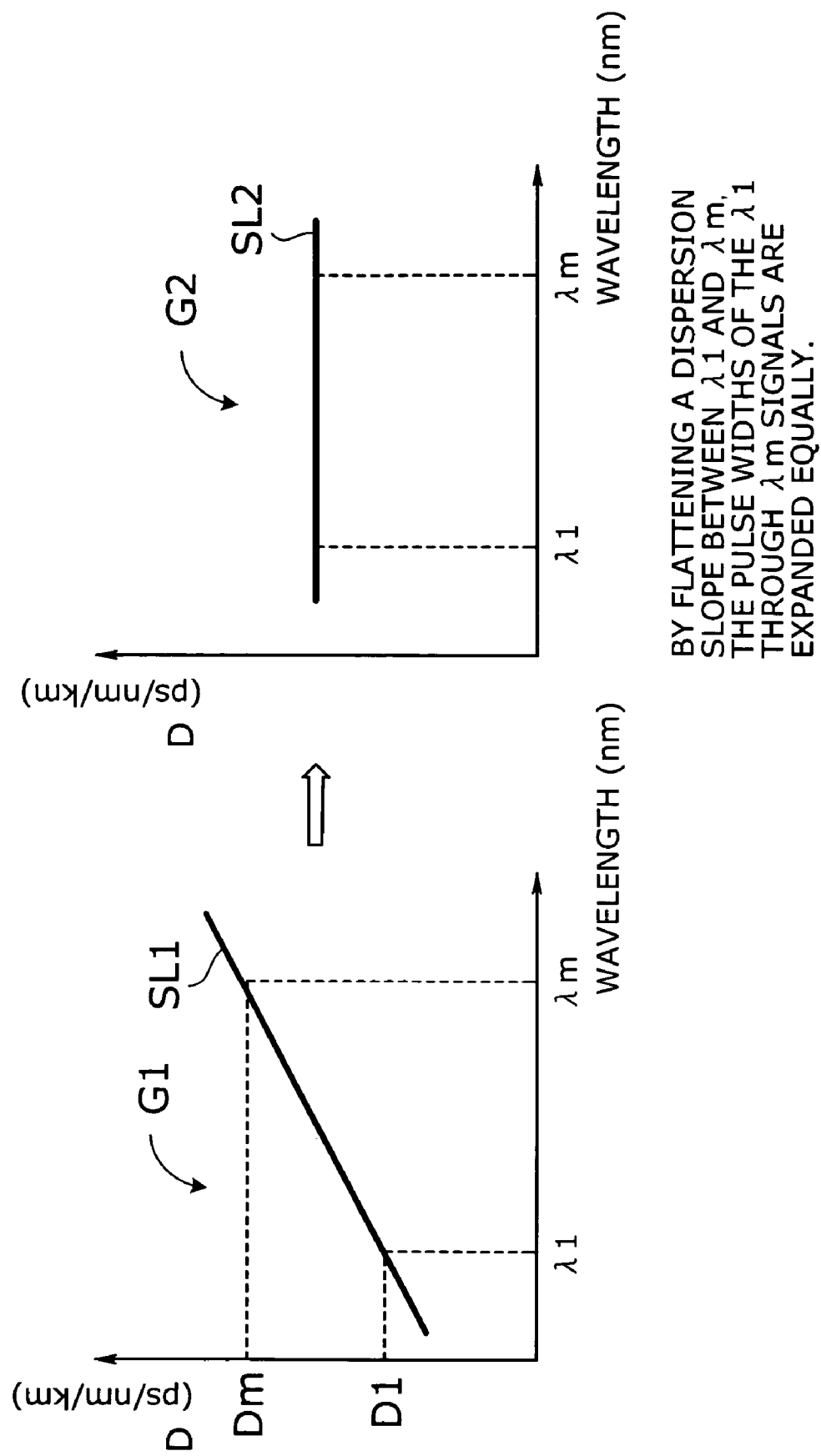
FIG. 17 is a view for describing flattening control of a wavelength dispersion slope.

FIG. 17 is a view for describing flattening control of a wavelength dispersion slope. On graphs G1 and G2, vertical axes indicate a wavelength dispersion value D (ps/km/nm) and horizontal axes indicate a wavelength (nm). The graph G1 shows a slope before flattening. The graph G2 shows the slope after flattening.

On the graph G1, the shortest wavelength dispersion detector 133a-3 detects a wavelength dispersion value D1 of the λ1 signal and the longest wavelength dispersion detector 133a-4 detects a wavelength dispersion value Dm of the λm signal. In this case, a wavelength dispersion slope SL1 is caused by the λ1 through λm signals.

On the graph G2, the wavelength dispersion slope flattening section 133a-5 has controlled the wavelength dispersion value of each signal to change the wavelength dispersion slope SL1 to a flat wavelength dispersion slope SL2.

That is to say, when the wavelength dispersion slope flattening section 133a-5 realizes that the wavelength dispersion values of the signals with the shortest wavelength λ1 and the longest wavelength λm are D1 and Dm respectively, it finds the average of the wavelength dispersion values D1 and Dm and exercises control to make the wavelength dispersion values of all the λ1 through λm signals equal to this average. By exercising such control, the wavelength dispersion slope will become flat and the pulse widths of the λ1 through λm signals can be expanded equally.

Figure 18:
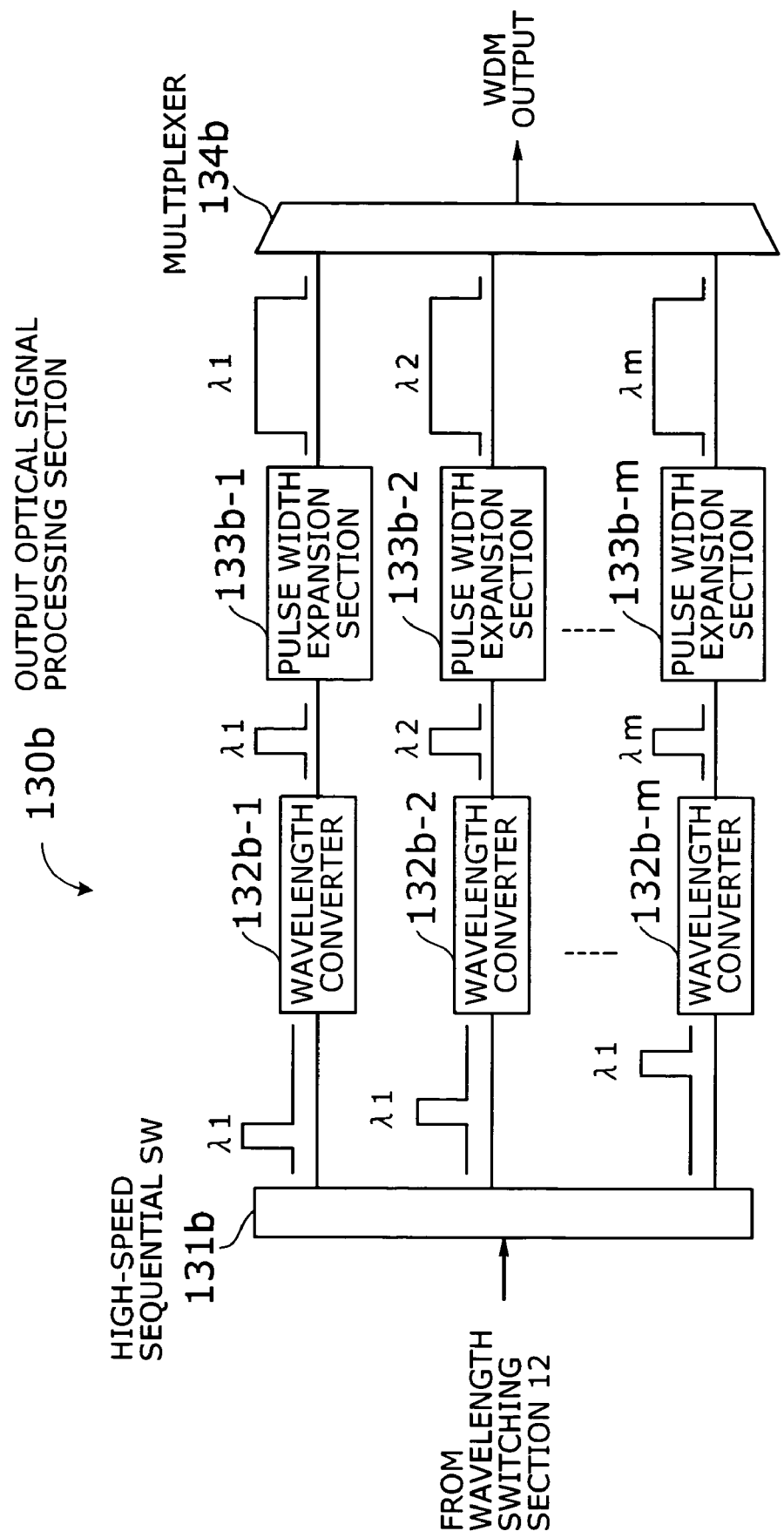
FIG. 18 shows the structure of an output optical signal processing section according to a second embodiment.

FIG. 18 shows the structure of an output optical signal processing section according to a second embodiment. An output optical signal processing section 130b according to a second embodiment includes a high-speed sequential switch 131b, wavelength converters 132b-1 through 132b-m, pulse width expansion sections 133b-1 through 133b-m, and a multiplexer 134b. If the number of WDM input optical signals is n, then the output section in the λ-XC apparatus 1 will include n output optical signal processing sections 130b each having such structure.

The high-speed sequential switch 131b sequentially switches and outputs compressed pulses switched by the wavelength switching section 12. The wavelength converters 132b-1 through 132b-m convert the wavelengths of the input pulses into predetermined wavelengths (an upper layer may inform the wavelength converters 132b-1 through 132b-m of these wavelengths) and output the wavelength-converted pulses at the same time (at the same phase). In this example, the wavelength converter 132b-1 converts λ1 into λ1, the wavelength converter 132b-2 converts λ1 into λ2, and the wavelength converter 132b-m converts λ1 into λm. These pulses are outputted in the same phase.

The pulse width expansion sections 133b-1 through 133b-m expand the pulse widths of the wavelength-converted signals. The multiplexer 134b combines the signals the pulse widths of which have been expanded and outputs them as a WDM signal.

Figure 19:
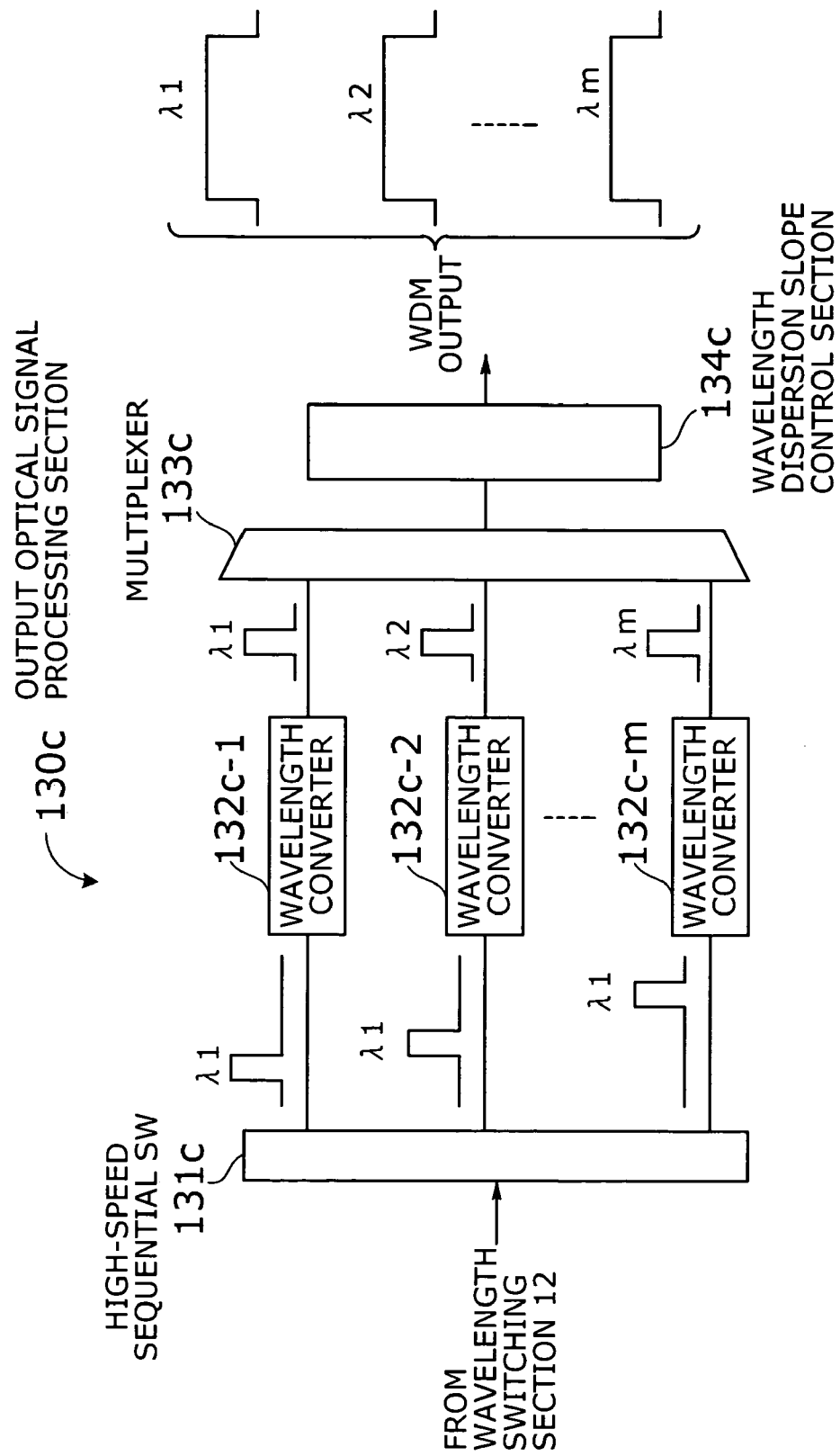
FIG. 19 shows the structure of an output optical signal processing section according to a third embodiment.

FIG. 19 shows the structure of an output optical signal processing section according to a third embodiment. An output optical signal processing section 130c according to a third embodiment includes a high-speed sequential switch 131c, wavelength converters 132c-1 through 132c-m, a multiplexer 133c, and a wavelength dispersion slope control section 134c. If the number of WDM input optical signals is n, then the output section in the λ-XC apparatus 1 will include n output optical signal processing sections 130c each having such structure.

The high-speed sequential switch 131c sequentially switches and outputs compressed pulses switched by the wavelength switching section 12. The wavelength converters 132c-1 through 132c-m convert the wavelengths of the input pulses into predetermined wavelengths and output the wavelength-converted pulses at the same time (at the same phase).

The multiplexer 133c combines the wavelength-converted pulses. The wavelength dispersion slope control section 134c includes the same components as the wavelength dispersion slope control section 133a shown in FIG. 16. The wavelength dispersion slope control section 134c controls a wavelength dispersion slope obtained from the wavelength dispersion value of each wavelength signal contained in the multiplexed signal, expands the pulse width of each wavelength signal, and outputs the multiplexed signal as a WDM signal. The scale of the circuits included in the output optical signal processing section 130c shown in FIG. 19 is smaller than that of the circuits included in the output optical signal processing section 130b shown in FIG. 18.

Figure 20:
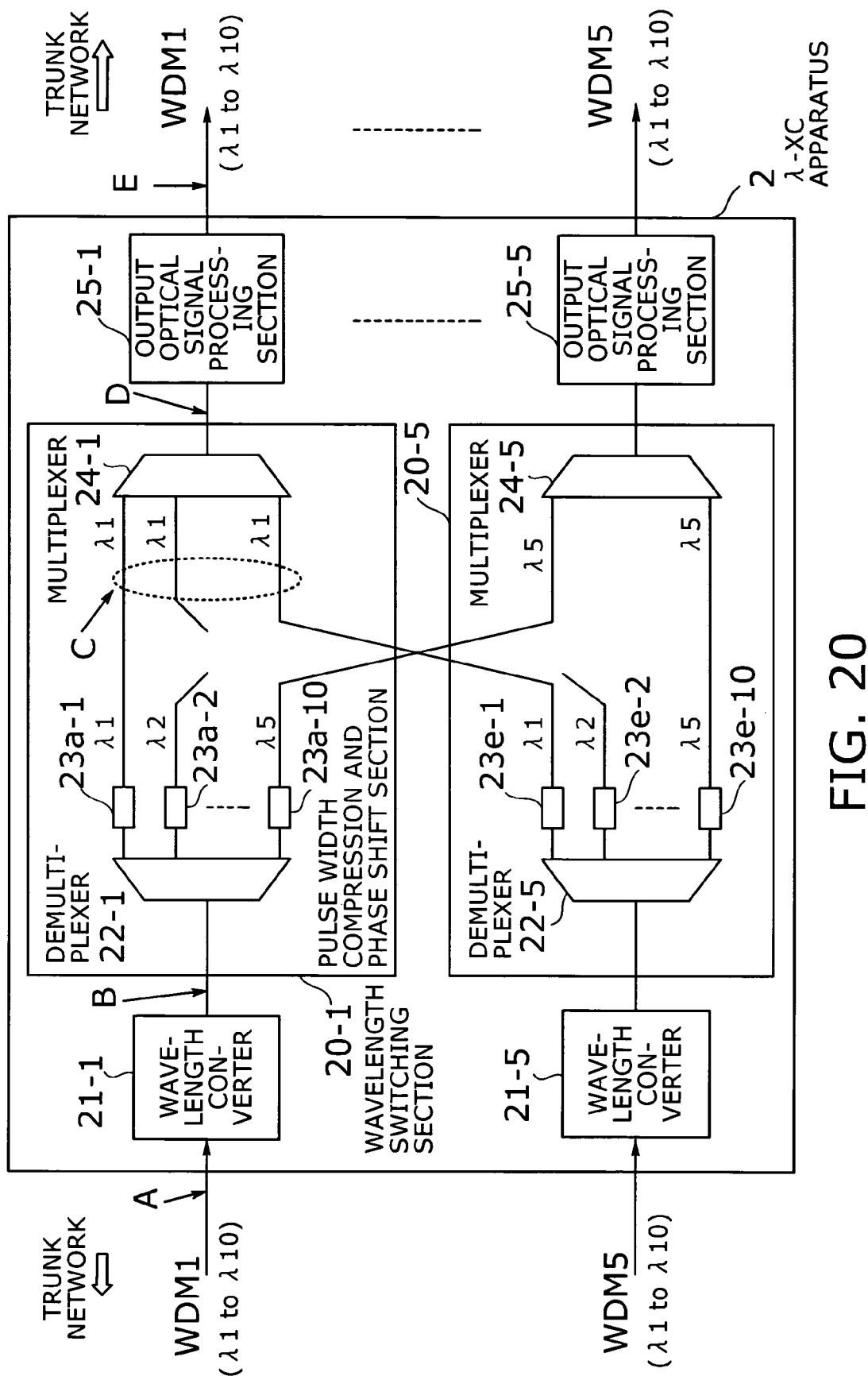
FIG. 20 is a view for describing the principles underlying an optical cross-connect apparatus according to the present invention.

An optical cross-connect apparatus according to the present invention which can realize a throughput higher than or equal to 1 Pbits/s will now be described. FIG. 20 is a view for describing the principles underlying an optical cross-connect apparatus according to the present invention. An optical cross-connect apparatus 2 (λ-XC apparatus 2) realizes a throughput higher than or equal to 1 Pbits/s by performing optical cross-connection and comprises wavelength converters 21-1 through 21-5, wavelength switching sections 20-1 through 20-5, and output optical signal processing sections 25-1 through 25-5.

The wavelength switching sections 20-1 includes a demultiplexer (AWG) 22-1, pulse width compression and phase shift sections 23a-1 through 23a-10, and a multiplexer (optical coupler) 24-1. The same applies to the wavelength switching sections 20-2 through 20-5. The components included in the wavelength switching sections 20-1 through 20-5 are passive optical devices.

The wavelength converters 21-1 through 21-5 convert different wavelengths contained in WDM input optical signals into wavelengths the number of which is equal to that of the WDM input optical signals. The demultiplexers 22-1 through 22-5 separate the wavelength-converted optical signals into individual wavelengths. The pulse width compression and phase shift sections 23a-1 through 23a-10, 23b-1 through 23b-10, 23c-1 through 23c-10, 23d-1 through 23d-10, and 23e-1 through 23e-10 perform pulse width compression by dividing the pulse widths of the demultiplexed optical signals by the number of the wavelengths contained in each WDM input optical signal and perform phase shifts so that the phases of a plurality of compressed signals will not be the same. The multiplexers 24-1 through 24-5 combine the phase-shifted optical signals to generate multiplexed signals.

The output optical signal processing sections 25-1 through 25-5 perform wavelength conversions by recognizing wavelengths into which the wavelengths contained in the optical signals distributed by the wavelength switching sections 20-1 through 20-5 should be converted from their phases, perform pulse width expansion, and output WDM optical signals.

Figure 21:
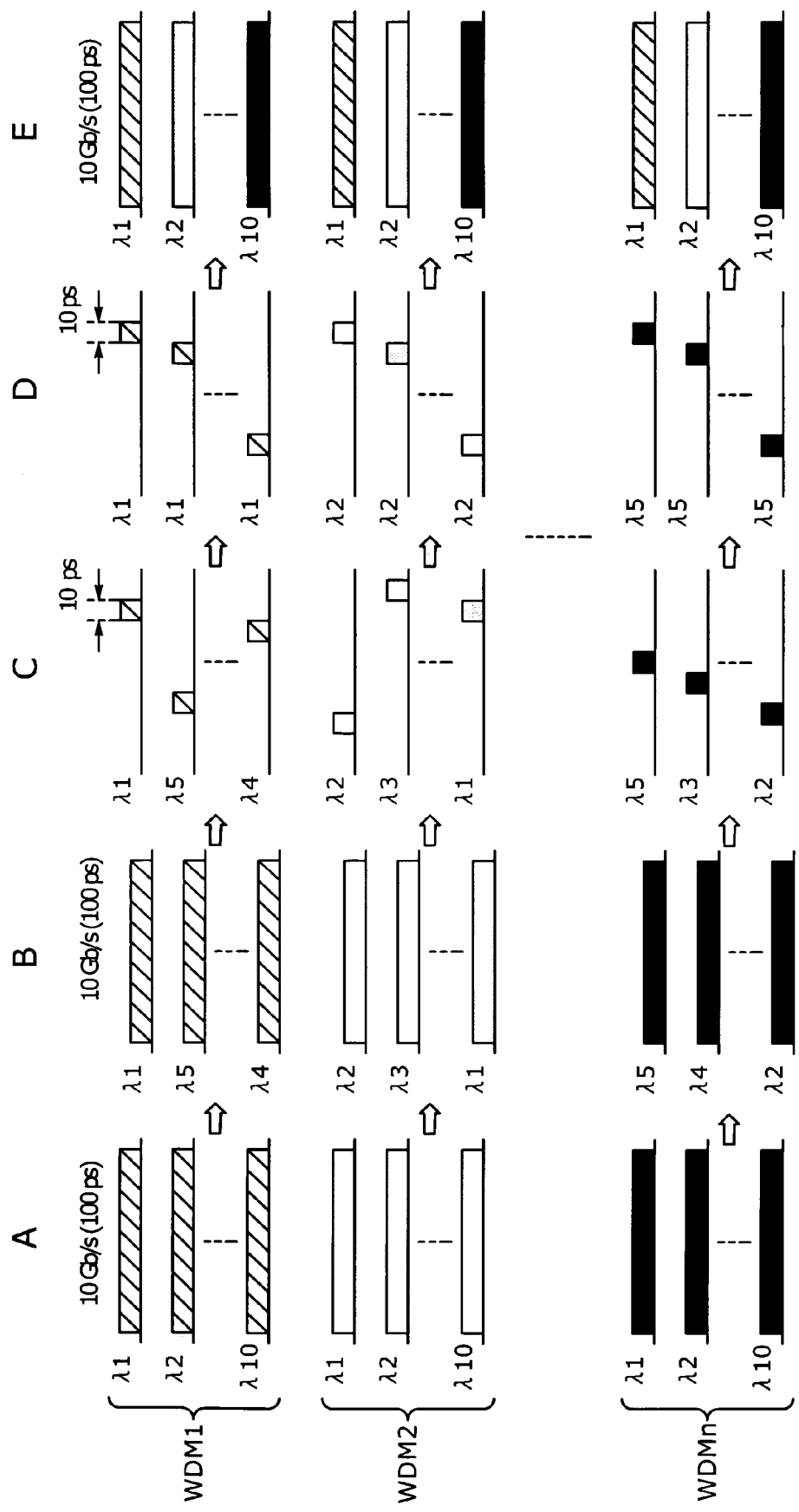
FIG. 21 shows the flow of signals.

The operation will now be described. FIG. 21 shows the flow of signals. A through E in FIG. 21 indicate points A through E, respectively, shown in FIG. 20. At the point A, WDM1 shown in FIG. 20 is transmitted at a bit rate of 10-Gbit/s (has a pulse width of 100 ps) and contains ten different wavelengths λ1 through λ10 (ten channels). Similarly, each of WDM2 through WDM5 is transmitted at a bit rate of 10-Gbit/s (has a pulse width of 100 ps) and contains ten different wavelengths λ1 through λ10 (ten channels).

At the point B, wavelength conversions have been performed on the WDM signals by the wavelength converters 21-1 through 21-5. The number (=n) of wavelengths in the apparatus is equal to the number of WDM input optical signals. In the case of FIG. 20, WDM1 through WDM5 are inputted, so n=5. The number of wavelengths in the apparatus is five. Therefore, in the λ-XC apparatus 2, λ1 through λ5, for example, are assigned and each of the wavelengths λ1 through λ10 contained in each WDM input optical signal is converted into one of the wavelengths λ1 through λ5.

At the point B, each of the wavelengths λ1 through λ10 contained in, for example, the WDM1 signal has been converted into one of the wavelengths λ1 through λ5. That is to say, the wavelength conversions of λ1→λ1 (not wavelength-converted) λ2→λ5, λ10→λ4, and so on have been performed.

At the point C, the wavelength-converted WDM signals have been separated into individual wavelengths by the demultiplexer 22 and pulse width compression and phase shifts have been performed on these wavelengths by the pulse width compression and phase shift section 23. A time division number is 10 (=number of the different wavelengths contained in each WDM input optical signal), so the pulse width (100 ps) of each input signal is divided by 10. As a result, the pulse width of each input signal is compressed into 10 ps. In addition, the phase shifts have been performed so that the phases of a plurality of compressed signals will not be the same. With WDM1, for example, the pulse widths of the ten signals with the wavelengths λ1 through λ5 have been compressed into 10 ps and the phases of these ten compressed signals have been shifted so that two or more of them will not be at the same position on a time axis. The same applies to WDM2 through WDM5.

At the point D, the phase-shifted signals have been combined by the multiplexers 24-1 through 24-5 to generate signals each containing the same wavelengths. For example, the multiplexer 24-1 has combined ten λ1 signals and has launched them into the WDM1 fiber. Similarly, ten λ2 signals, ten λ3 signals, ten λ4 signals, and ten λ5 signals have been combined and launched into the WDM2, WDM3, WDM4, and WDM5 fibers respectively.

At the point E, the output optical signal processing sections 25-1 through 25-5 have performed wavelength conversions and pulse width expansion on the input signals to generate WDM signals. In the wavelength conversion process, the output optical signal processing sections 25-1 through 25-5 recognize in advance wavelengths into which wavelengths contained in each input signal should be converted from their phases. In the pulse width expansion process, the output optical signal processing sections 25-1 through 25-5 return the pulse width of signals contained in each input signal to their original value.

For example, the output optical signal processing section 25-1 recognizes in advance wavelengths into which the ten λ1 signals contained in the WDM1 signal at the point D should be converted from the phases of the ten λ1 signals and converts ten λ1's into λ1 through λ10 on the basis of the phase of each λ1 signal. In addition, the output optical signal processing section 25-1 expands the pulse width of each signal from 10 ps to the original value (100 ps). As a result, a WDM signal after the optical cross-connection will be outputted.

The difference between the λ-XC apparatus 2 shown in FIG. 20 and the λ-XC apparatus 1 shown in FIG. 1 will now be described. In the λ-XC apparatus 1 shown in FIG. 1, cross talk may occur. Therefore, if an optical fiber band is 50 THz and the pulse width of each input optical signal is 100 ps, then conditions under which cross talk will not occur are given by $n \times m \leq 2500$ (which can be generalized as $n \times m \leq BW\text{fiber} \times \Delta T \times 1/2$)

where n is the number of wavelengths in the apparatus being equal to that of the WDM input optical signals, and m is a time division number for the pulse width compression being equal to the number of the different wavelengths contained in each WDM input optical signal. Therefore, n and m should be set so that they will meet the above inequality.

This means that n and m cannot be set to arbitrary values, so there is an upper limit to the throughput. If a bit rate is 10 Gbits/s, a maximum throughput of 25 Tbits/s is obtained when n×m=2500 (Even in this case, very high throughput can be achieved compared with conventional apparatus).

The cause of the occurrence of cross talk will now be described. The cause of the occurrence of cross talk in the λ-XC apparatus 1 lies in the pulse width compression and time division of the WDM signals by the input optical signal processing section 11 before the separation of the optical signals by the demultiplexer (AWG) 12a in the wavelength switching section 12, that is to say, in the separation of the compressed signals by the AWG.

Therefore, in the λ-XC apparatus 2, a pulse width compression process is performed not at the input stage of the AWG but at the output stage of the AWG. That is to say, by performing pulse width compression and time division on the signals demultiplexed by the AWG, cross talk can be prevented.

Figure 22:
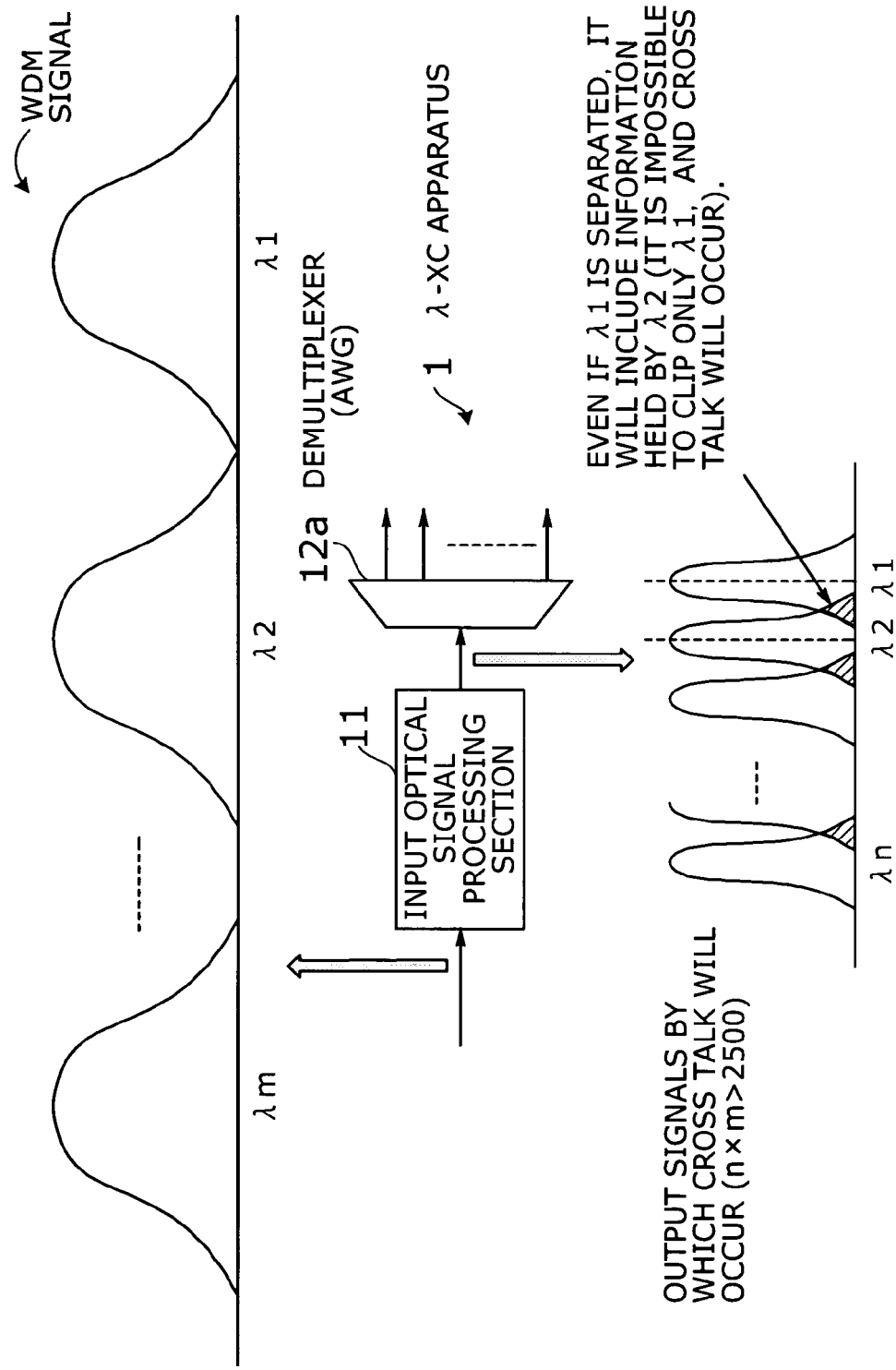
FIG. 22 shows the structure of the λ-XC apparatus in which a factor in the occurrence of cross talk lies.

FIG. 22 shows the structure of the λ-XC apparatus in which a factor in the occurrence of cross talk lies. In the λ-XC apparatus 1, the input optical signal processing section 11 performs a wavelength conversion (λ1 through λm→λ1 through λn), pulse width compression (100 ps→10 ps), and a phase shift on a WDM signal containing different wavelengths λ1 through λm and sends the signal to the demultiplexer 12a.

If n×m≦2500 is not met, then signals outputted from the input optical signal processing section 11 through adjacent channels will overlap. (A phase shift is performed so that the center frequencies of these signals will not be at the same position on a time axis. However, if n×m≦2500 is not met, then adjacent compressed signals will overlap in the side band areas.)

It is assumed that such a signal is inputted to the demultiplexer 12a and is separated into different wavelengths. Even if the λ1 signal, for example, is separated from the input signal, the λ2 signal will also be clipped because they overlap in the side band areas. As a result, cross talk will occur.

Figure 23:
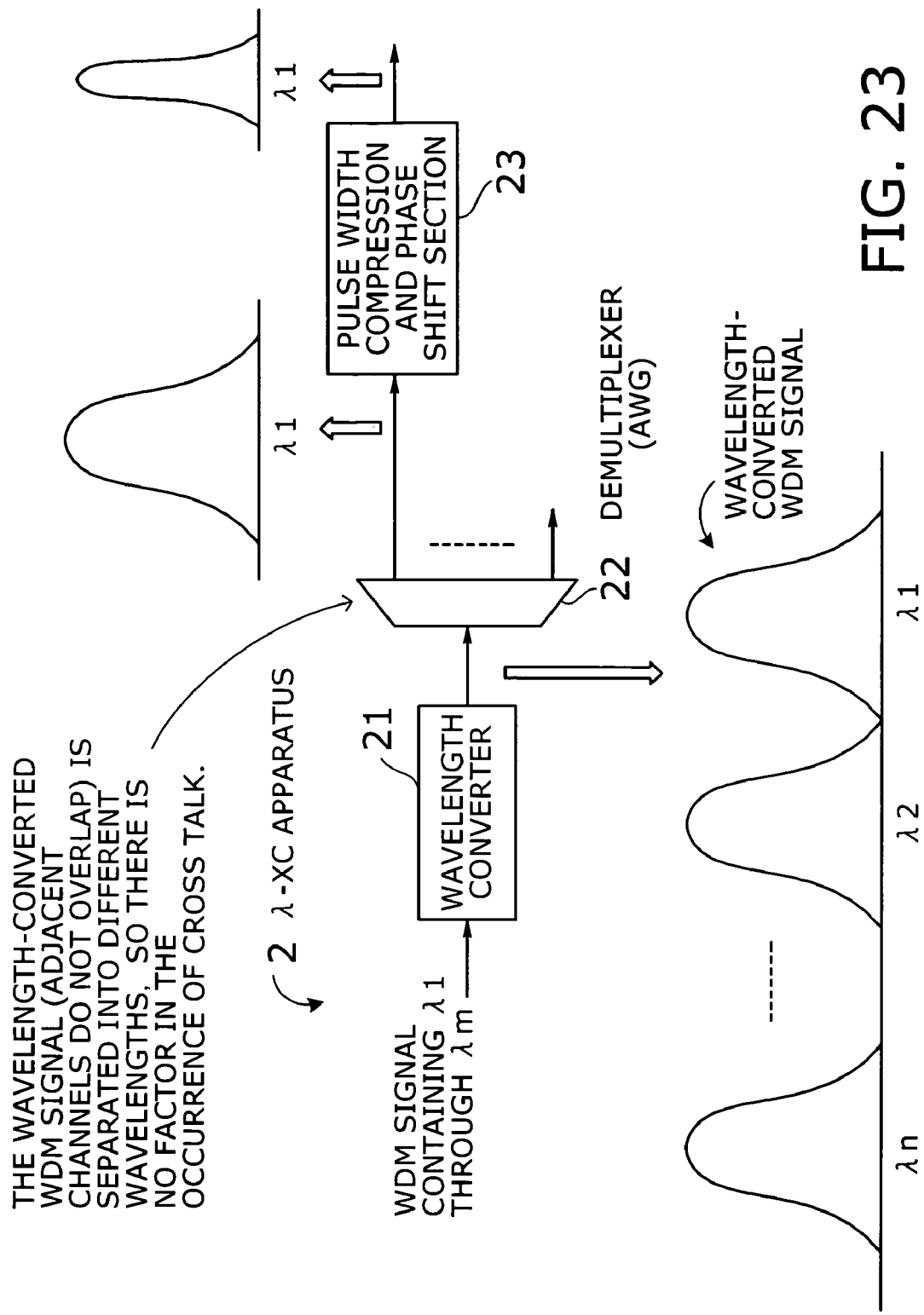
FIG. 23 shows the structure of the λ-XC apparatus in which cross talk will not occur.

FIG. 23 shows the structure of the λ-XC apparatus in which cross talk will not occur. In the λ-XC apparatus 2, the wavelength converter 21 performs a wavelength conversion (λ1 through λm→λ1 through λn) on a WDM signal containing different wavelengths λ1 through λm first. The demultiplexer 22a separates the wavelength-converted signal. Then the pulse width compression and phase shift section 23 performs pulse width compression and a phase shift on the demultiplexed signals.

In this case, the WDM signal in which adjacent channels do not overlap is separated and then time division is performed. As a result, there is no factor in the occurrence of cross talk. Accordingly, the λ-XC apparatus 2 makes it unnecessary to take cross talk into consideration, so n (the number of wavelengths in the apparatus) and m (time division number) can be set independently of each other.

As a result of setting the values of n and m independently of each other, there is no upper limit to the throughput and a throughput higher than or equal to 1 Pbits/s can be achieved (an upper limit to the throughput is determined not by the characteristics but by the techniques or the costs).

For example, if the bit rate of an optical signal is 10 Gbits/s, the number (n) of wavelengths in the apparatus is 1,000 (1,000 channels), and a time division number (m) is 100 (100 ps is divided by 100 to compress the width of pulses into 1 ps), then a throughput of 1 Pbits/s (=1,000×100×10 Gbits/s) is obtained.

As described above, the λ-XC apparatus 2 according to the present invention can perform very large capacity switching which provides a throughput higher than or equal to 1 Pbits/s without causing cross talk. Therefore, the λ-XC apparatus 2 will contribute largely to building next generation multimedia networks ("e-JAPAN Strategy" set forth by the Japanese Government is aimed at creating the environment by 2005 in which people can always connect their computers to an ultra high-speed Internet access network made up of ten million households (100 Mbits/s×10,000,000 household=1 Pbits/s)).

In the λ-XC apparatus 2, the pulse width compression and phase shift section 23 is located for each demultiplexed wavelength, so the scale of the apparatus is larger than that of the λ-XC apparatus 1. Accordingly, it is preferable that the λ-XC apparatus 1 should be applied in environments where a throughput lower than or equal to 25 Tbits/s will do and that the λ-XC apparatus 2 should be applied in environments where a throughput higher than or equal to 1 Pbits/s will be required.

A λ-XC apparatus according to the present invention in which congestion will not occur at optical cross-connection time will now be described. The λ-XC apparatus 2 shown in FIG. 20 can perform very large capacity switching which provides a throughput higher than or equal to 1 Pbits/s. However, if switching is performed by the wavelength switching sections 20-1 through 20-5, it may be impossible to set two or more paths (switching paths) at the same time. That is to say, the wavelength switching sections 20-1 through 20-5 are blocking type switches in which setting a path to a destination port at switching time may cause congestion. Accordingly, the λ-XC apparatus 2 shown in FIG. 20 will be useful if environments in which it is applied can be limited to a certain extent.

A λ-XC apparatus including non-blocking type switches in which congestion will not occur at switching time, according to the present invention, will now be described. First, the difference between blocking type and non-blocking type switches and an example of the structure of a non-blocking type spatial switch will be described.

Figure 24:
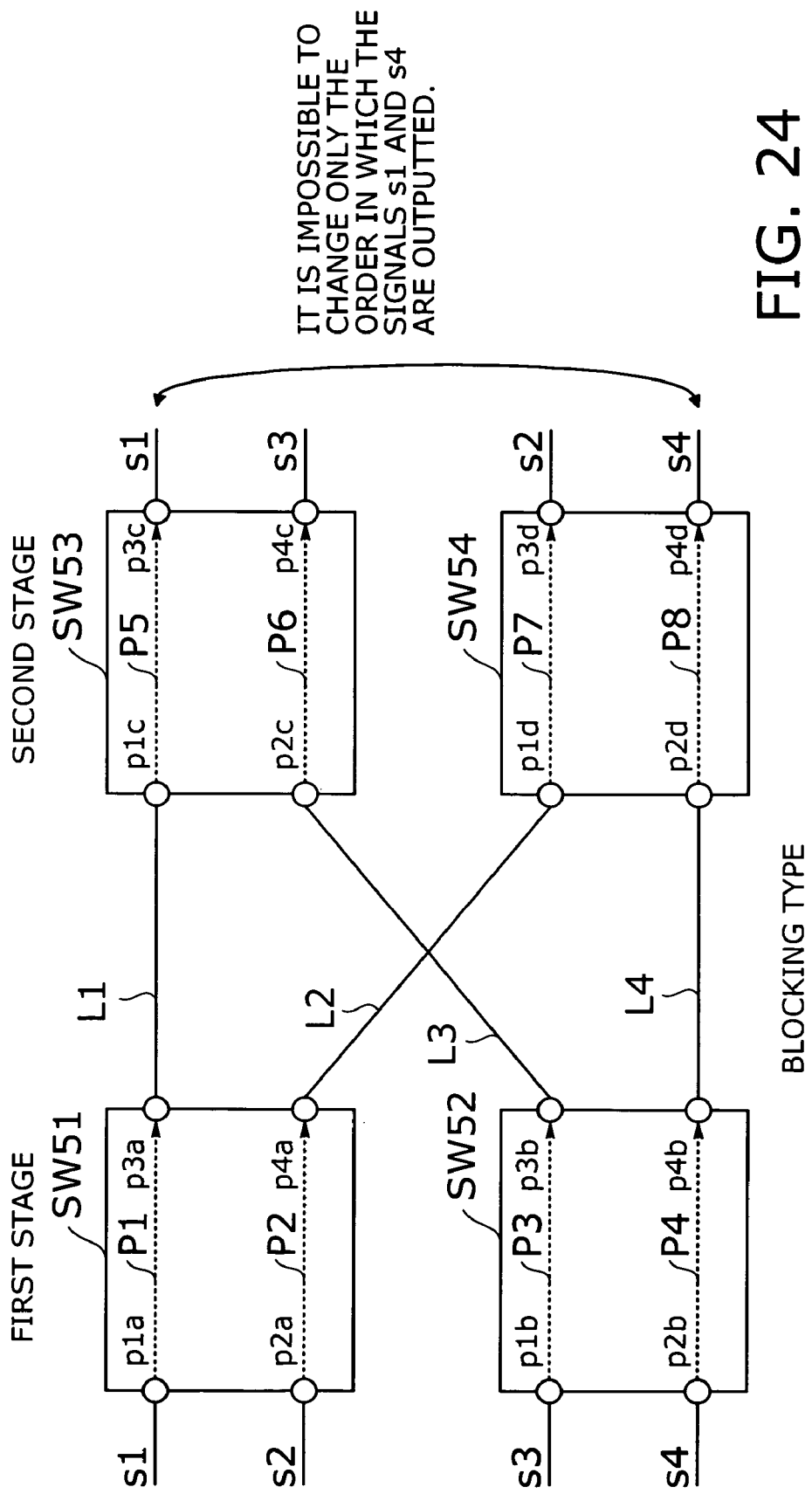
FIG. 24 shows an example of a blocking type switch.

FIG. 24 shows an example of a blocking type switch. A 4.times.4 switch includes four 2.times.2 switches SW51 through SW54 each having two incoming lines and two outgoing lines. The switches SW51 and SW52 are located at the first stage and the switches SW53 and SW54 are located at the second stage.

The switch SW51 has ports p1a and p2a on the incoming line side and ports p3a and p4a on the outgoing line side. The switch SW52 has ports p1b and p2b on the incoming line side and ports p3b and p4b on the outgoing line side. The switch SW53 has ports p1c and p2c on the incoming line side and ports p3c and p4c on the outgoing line side. The switch SW54 has ports p1d and p2d on the incoming line side and ports p3d and p4d on the outgoing line side.

The ports p3a and p1c connect with a line L1. The ports p4a and p1d connect with a line L2. The ports p3b and p2c connect with a line L3. The ports p4b and p2d connect with a line L4.

The directions of paths (switching paths) shown in FIG. 24 are as follows: a path P1 (port p1a→port p3a), a path P2 (port p2a→port p4a), a path P3 (port p1b→port p3b), a path P4 (port p2b→port p4b), a path P5 (port p1c→port p3c), a path P6 (port p2c→port p4c), a path P7 (port p1d→port p3d), and a path P8 (port p2d→port p4d).

Along these paths, incoming signals (s1, s2, s3, and s4) are inputted from the incoming line side of the switches SW51 and SW52 at the first stage, are switched, and are outputted from the outgoing line side of the switches SW53 and SW54 at the second stage as outgoing signals in the order of s1, s3, s2, and s4.

In this case, it is assumed that switching is performed to change the order in which the incoming signals (s1, s2, s3, and s4) are outputted as outgoing signals from s1, s3, s2, and s4 to s4, s3, s2, and s1.

If the direction of the path P1 in the switch SW51 is port p1a→port p4a and the direction of the path P7 in the switch SW54 is port p1d→port p4d, then the signal s1 will be outputted from the port p4d because it will flow along the path P1, the line L2, and the path P7. On the other hand, if the direction of the path P4 in the switch SW52 is port p2b→port p3b and the direction of the path P6 in the switch SW53 is port p2c→port p3c, then the signal s4 will be outputted from the port p3c because it will flow along the path P4, the line L3, and the path P6.

However, if such switching operation is performed, congestion will occur in each switch (in the switch SW51, for example, the paths P1 and P2 will converge at the port p4a). Therefore, in the above case, it is impossible to change only the order in which the signals s1 and s4 are outputted. To change the order in which the signals s1 and s4 are outputted, the order in which the signals s2 and s3 are outputted must also be changed (finally, there is no choice but to output the incoming signals in the order of s4, s2, s3, and s1).

When outgoing lines corresponding to (m−1) incoming lines have been established in an m.times.m blocking type switch, the destination of the remaining path in a switch will be determined. In the switch SW51 in FIG. 24, for example, when the path P2 which connects with the line L2 has been established, the other path P1 inevitably connects with the line L1 (the number of lines in this example is the smallest). As stated above, in blocking type switches having such structure, performing the switching of a signal will have an influence on another signal.

Figure 25:
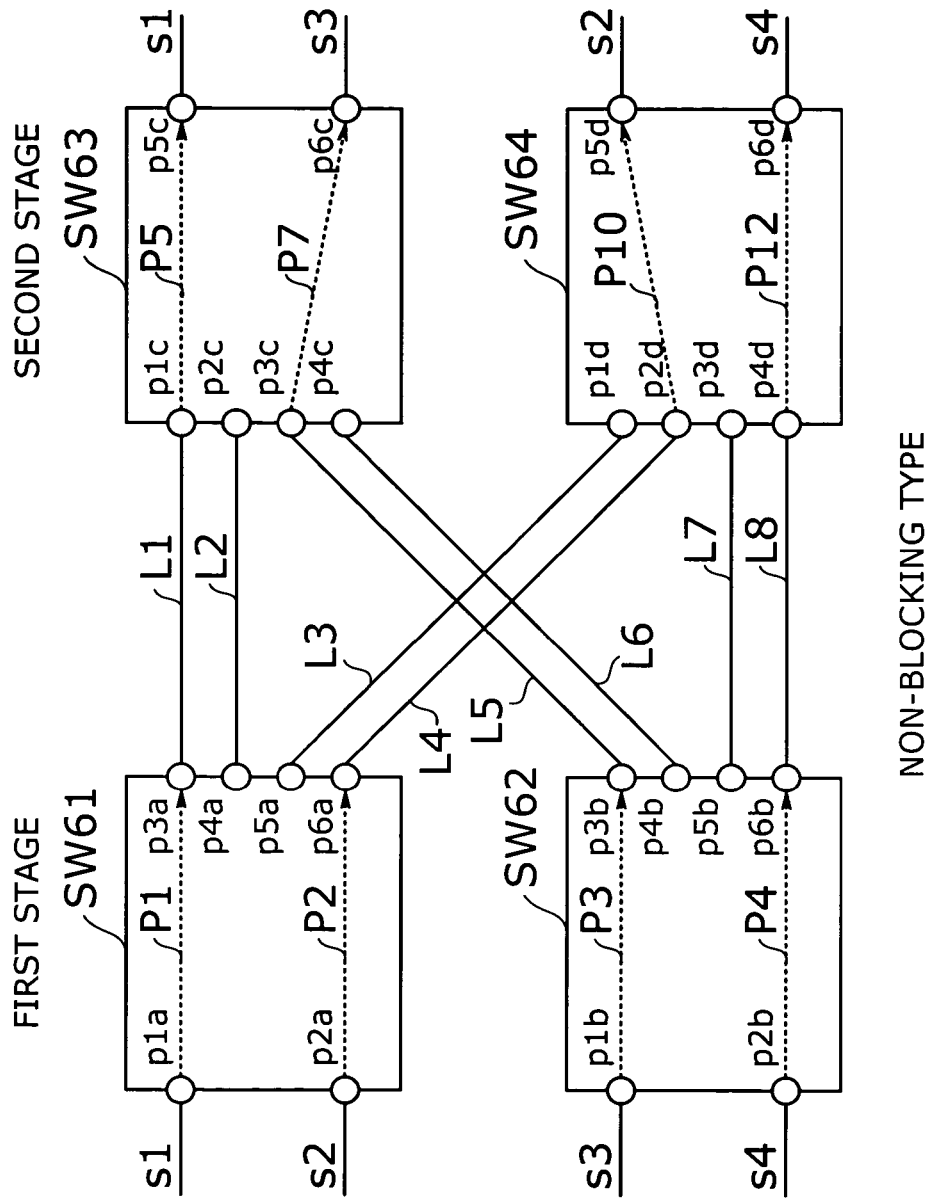
FIG. 25 shows an example of a non-blocking type switch.

FIG. 25 shows an example of a non-blocking type switch. A 4.times.4 switch includes two 2.times.4 switches SW61 and SW62 each having two incoming lines and four outgoing lines, and two 4.times.2 switches SW63 and SW64 each having four incoming lines, and two outgoing lines. The switches SW61 and SW62 are located at the first stage and the switches SW63 and SW64 are located at the second stage.

The switch SW61 has ports p1a and p2a on the incoming line side and ports p3a through p6a on the outgoing line side. The switch SW62 has ports p1b and p2b on the incoming line side and ports p3b through p6b on the outgoing line side. The switch SW63 has ports p1c through p4c on the incoming line side and ports p5c and p6c on the outgoing line side. The switch SW64 has ports p1d through p4d on the incoming line side and ports p5d and p6d on the outgoing line side.

The ports p3*a* and p1*c* connect with a line L1. The ports p4*a* and p2*c* connect with a line L2. The ports p5*a* and p1*d* connect with a line L3. The ports p6*a* and p2*d* connect with a line L4.

Moreover, the ports p3*b* and p3*c* connect with a line L5. The ports p4*b* and p4*c* connect with a line L6. The ports p5*b* and p3*d* connect with a line L7. The ports p6*b* and p4*d* connect with a line L8.

The directions of paths (switching paths) shown in FIG. 25 are as follows: a path P1 (port p1*a*→port p3*a*), a path P2 (port p2*a*→port p6*a*), a path P3 (port p1*b*→port p3*b*), a path P4 (port p2*b*→port p6*b*), a path P5 (port p1*c*→port p5*c*), a path P7 (port p3*c*→port p6*c*), a path P10 (port p2*d*→port p5*d*), and a path P12 (port p4*d*→port p6*d*).

Along these paths, incoming signals (s1, s2, s3, and s4) are inputted from the incoming line side of the switches SW61 and SW62 at the first stage, are switched, and are outputted from the outgoing line side of the switches SW63 and SW64 at the second stage as outgoing signals in the order of s1, s3, s2, and s4.

In this case, it is assumed that switching is performed to change the order in which the incoming signals (s1, s2, s3, and s4) are outputted as outgoing signals from s1, s3, s2, and s4 to s4, s3, s2, and s1.

Figure 26:
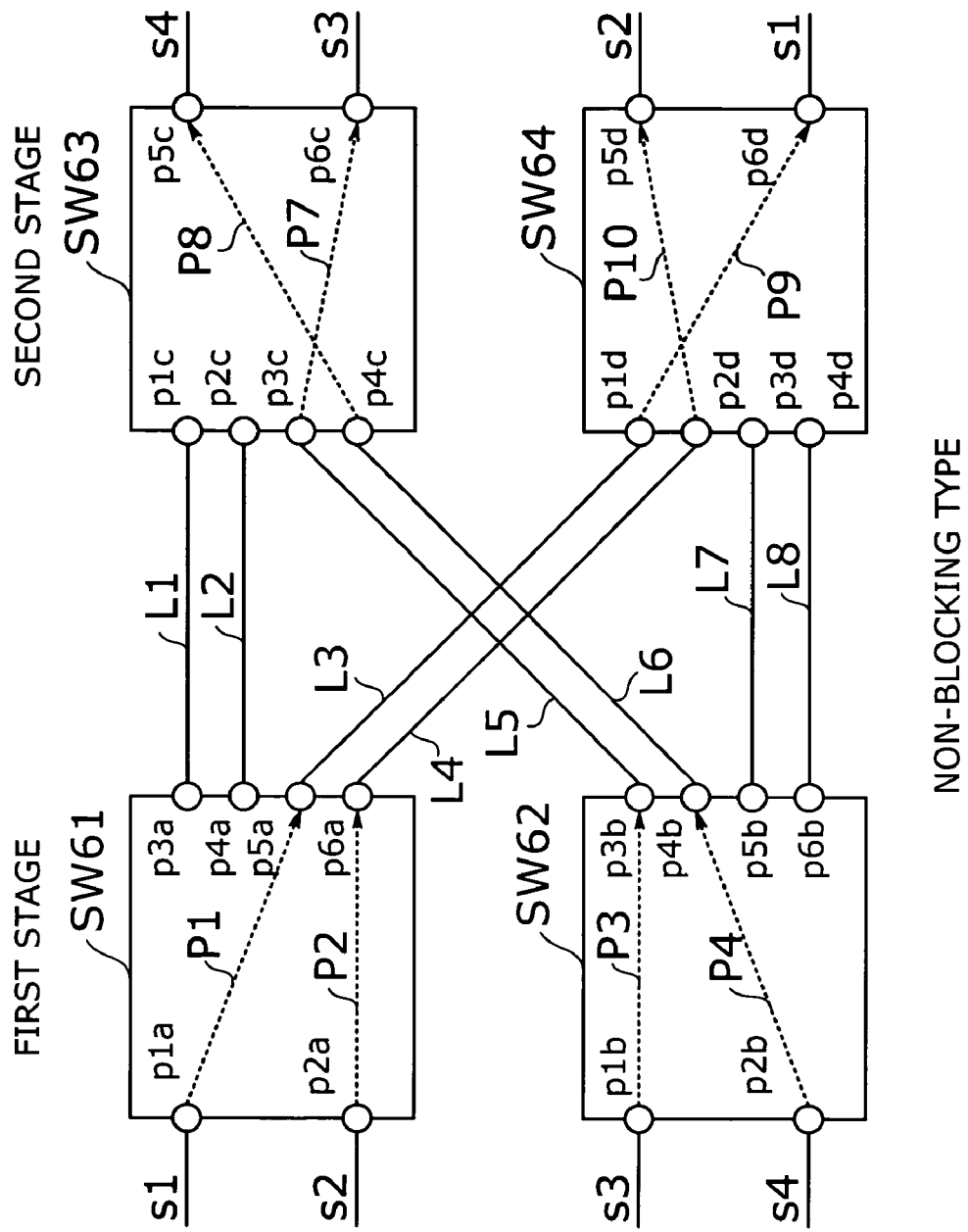
FIG. 26 shows the state of paths after switching.

FIG. 26 shows the state of paths after switching. If the direction of the path P1 in the switch SW61 is port p1*a*→port p5*a* and the direction of the path P9 in the switch SW64 is port p1*d*→port p6*d*, then the signal s1 will be outputted from the port p6*d* because it will flow along the path P1, the line L3, and the path P9. On the other hand, if the direction of the path P4 in the switch SW62 is port p2*b*→port p4*b* and the direction of the path P8 in the switch SW63 is port p4*c*→port p5*c*, then the signal s4 will be outputted from the port p5*c* because it will flow along the path P4, the line L6, and the path P8.

As can be seen from FIG. 26, even if such switching operation is performed, congestion will not occur in each switch (the paths along which the signals s3 and s2 flow are not changed). Therefore, only the order in which the signals s1 and s4 are outputted can be changed and the incoming signals (s1, s2, s3, and s4) can be outputted in the order of s4, s3, s2, and s1.

As stated above, switches each having incoming lines and outgoing lines the number of which is about twice that of the incoming lines and switches each having outgoing lines and incoming lines the number of which is about twice that of the outgoing lines should be combined to form a multi-stage structure. Then even when outgoing lines corresponding to (m−1) incoming lines have been established, the destination of the remaining path in a switch will not be determined inevitably. In the switch SW61 in FIG. 26, for example, even when the path P2 which connects with the line L4 has been established, the destination of the other path P1 can be selected from among the three remaining lines L1 through L3 (ports p3*a* through p5*a*). In non-blocking type switches having such structure, the switching of a signal can be performed freely without exerting an influence on another signal.

Figure 27:
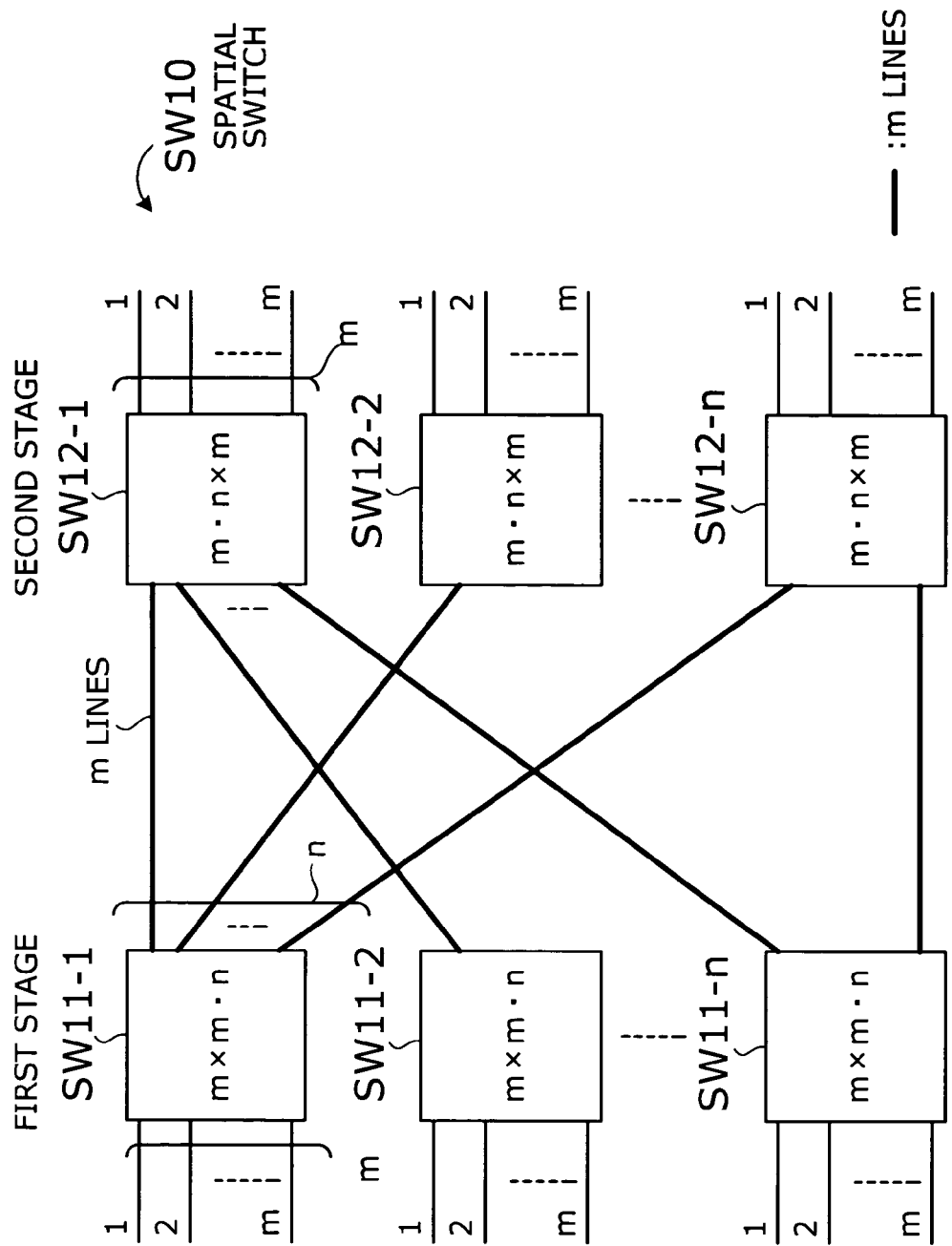
FIG. 27 shows the structure of a non-blocking type spatial switch.

Examples of a non-blocking type spatial switch will now be described with FIGS. 27 through 30. FIG. 27 shows the structure of a non-blocking type spatial switch. A spatial switch SW10 has a two-stage structure. The spatial switch SW10 is an (m.times.n).times. (m.times.n) switch including switches SW11-1 through SW11-*n* at the first stage and switches SW12-1 through SW12-*n* at the second stage. Each of the switches SW11-1 through SW11-*n* is an m.times.(m.times.n) switch and has m incoming lines and mn outgoing lines. Each of the switches SW12-1 through SW12-*n* is an (m.times.n).times.m switch and has mn incoming lines and m outgoing lines. The number of the m.times.(m.times.n) switches at the first stage is n and the number of the (m.times.n).times.m switches at the second stage is n. Therefore, the total number of the m.times.(m.times.n) switches included in the spatial switch SW10 is 2n (the switches located at the first and second stages are the same).

The switch SW11-1 at the first stage has n bundles of m outgoing lines. These line bundles are connected to the switches SW12-1 through SW12-*n*, respectively, at the second stage. Similarly, the outgoing lines from the switches SW11-2 through SW11-*n* are connected to the switches SW12-1 through SW12-*n* at the second stage.

When outgoing lines corresponding to (m−1) incoming lines have been established in a unit switch (one of the switches SW11-1 through SW11-*n*) at the first stage, the number of paths which can be set for the remaining incoming line is calculated by subtracting (m−1) from the number of the outgoing lines:

$$mn-(m-1)=m(n-1)+1$$

One of these paths can be selected freely, so the spatial switch SW10 is of a non-blocking type.

Figure 28:
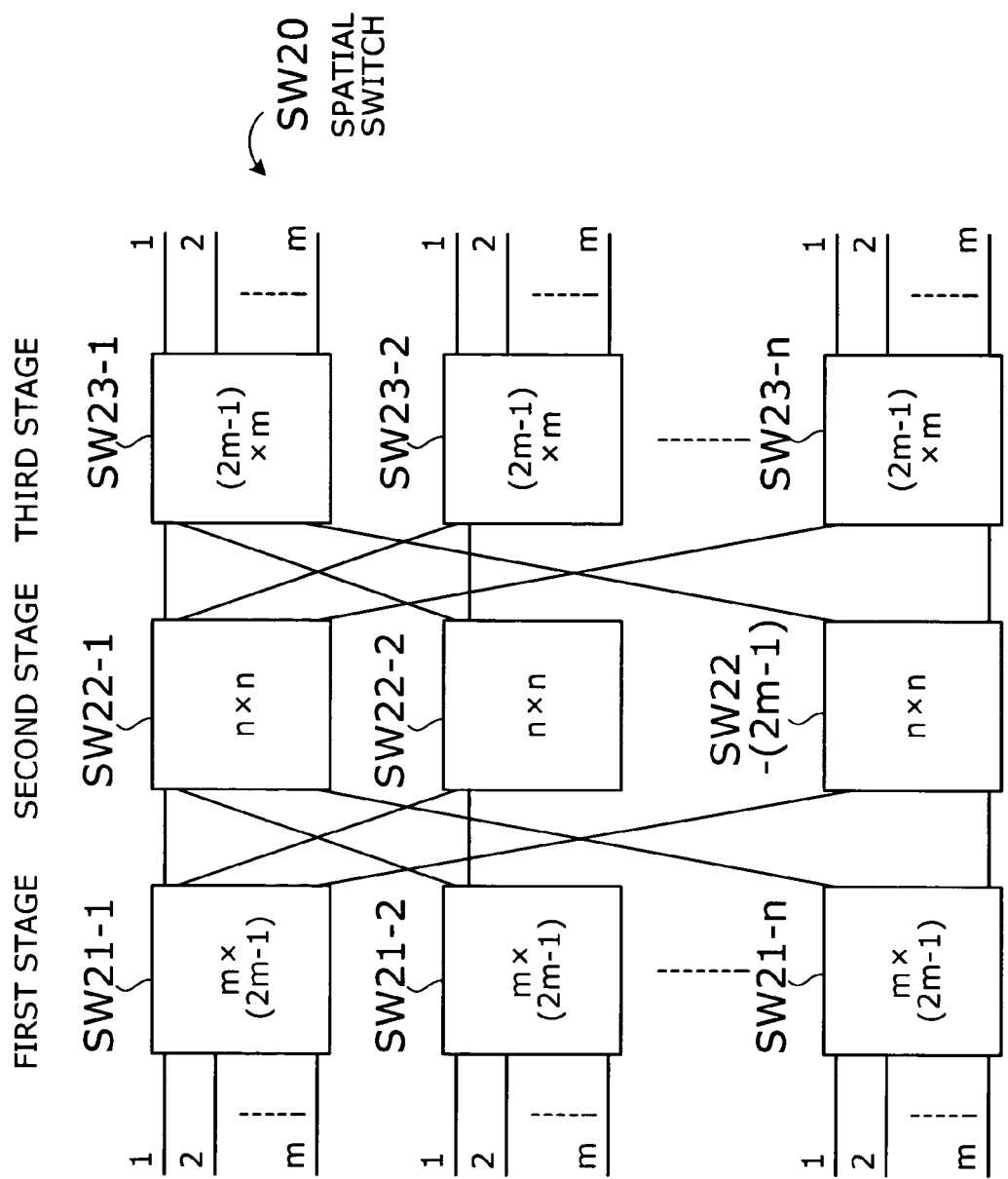
FIG. 28 shows the structure of a non-blocking type spatial switch.

FIG. 28 shows the structure of a non-blocking type spatial switch. A spatial switch SW20 has a three-stage structure. The spatial switch SW20 is an (m.times.n).times.(m.times.n) switch including switches SW21-1 through SW21-*n* at the first stage, switches SW22-1 through SW22-(2m−1) at the second stage, and switches SW23-1 through SW23-*n* at the third stage. Each of the switches SW21-1 through SW21-*n* is an m.times.(2m−1) switch and has m incoming lines and (2m−1) outgoing lines. Each of the switches SW22-1 through SW22-(2m−1) is an n.times.n switch and has n incoming lines and n outgoing lines. Each of the switches SW23-1 through SW23-*n* is a (2m−1).times.m switch and has (2m−1) incoming lines and m outgoing lines.

The number of the m.times.(2m−1) switches at the first stage is n, the number of the n.times.n switches at the second stage is (2m−1), and the number of the (2m−1).times.m switches at the third stage is n. Therefore, the total number of the m.times.(2m−1) switches included in the spatial switch SW20 is 2n (the switches located at the first and third stages are the same) and the total number of the n.times.n switches included in the spatial switch SW20 is (2m−1).

The switch SW21-1 at the first stage has (2m−1) outgoing lines. These outgoing lines are connected to the switches SW22-1 through SW22-(2m−1), respectively, at the second stage. Similarly, the outgoing lines from the switches SW21-2 through SW21-*n* are connected to the switches SW22-1 through SW22-(2m−1) at the second stage.

The switch SW22-1 at the second stage has n outgoing lines. These outgoing lines are connected to the switches SW23-1 through SW23-*n*, respectively, at the third stage. Similarly, the outgoing lines from the switches SW22-2 through SW22-(2m−1) are connected to the switches SW23-1 through SW23-*n* at the third stage.

A unit switch at the first stage has (2m−1) outgoing lines, so the number of paths which go from the unit switch at the first stage to the (2m−1) switches SW22-1 through SW22-(2m−1) at the second stage is (2m−1). In addition, a unit switch at the third stage has (2m−1) incoming lines, so the number of paths which go from each of the (2m−1) switches SW22-1 through SW22-(2m−1) at the second stage to the unit switch at the third stage is (2m−1).

Therefore, even when outgoing lines corresponding to (m−1) incoming lines have been established in the switch at the first stage and outgoing lines corresponding to (m−1) incoming lines have been established in the switch at the third stage, m (obtained by subtracting (m−1) from (2m−1)) paths can be set from the first stage to the third stage. This means that the spatial switch SW20 is of a non-blocking type. A non-blocking type switch having a multi-stage structure is also called a Clos type switch (because it was proposed by Charles Clos).

Figure 29:
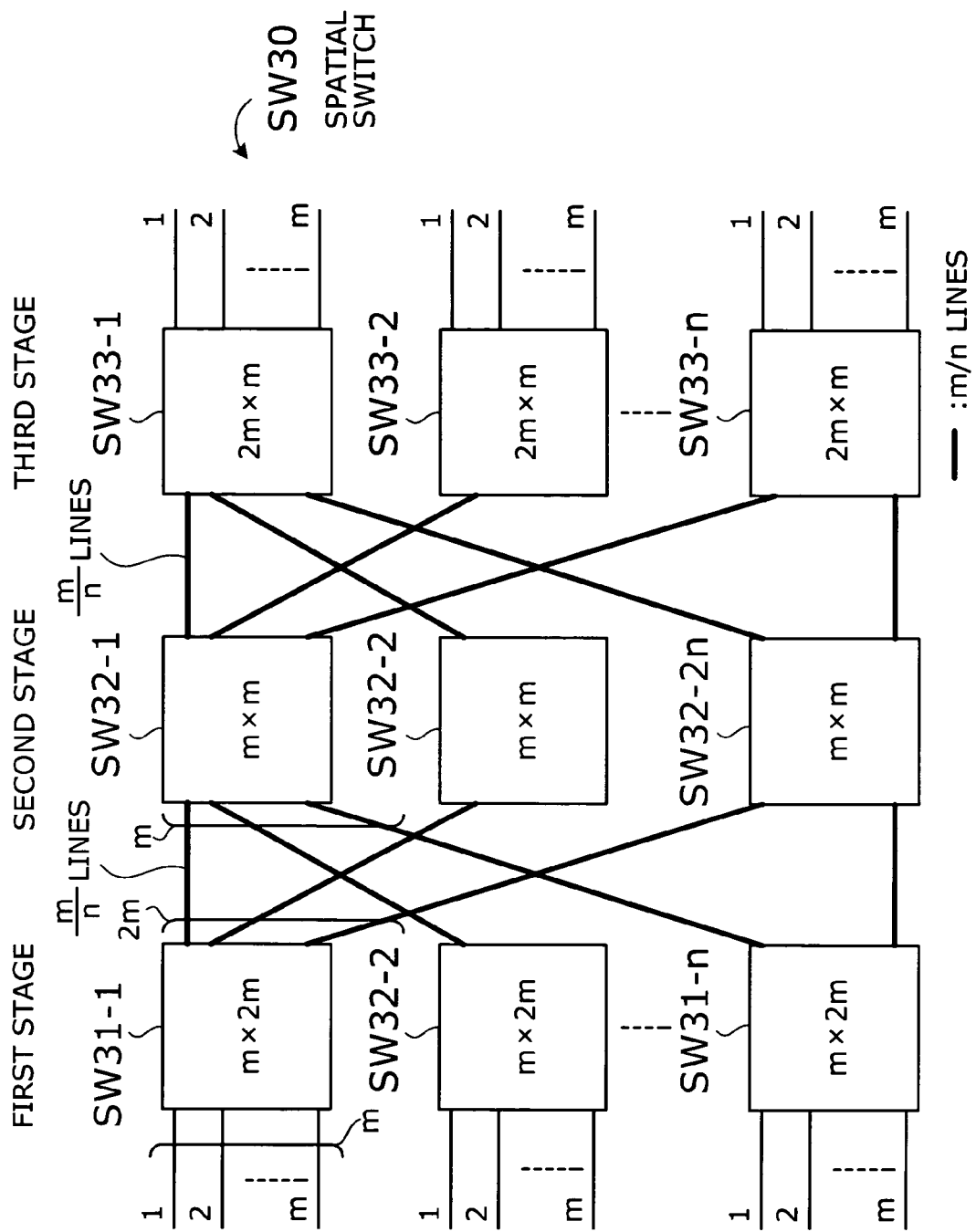
FIG. 29 shows the structure of a non-blocking type spatial switch.

FIG. 29 shows the structure of a non-blocking type spatial switch. A spatial switch SW30, being a modification of the spatial switch SW20 shown in FIG. 28, has a three-stage structure. The spatial switch SW30 is an (m.times.n).times.(m.times.n) switch (m>n and m and n are even numbers) including switches SW31-1 through SW31-$n$ at the first stage, switches SW32-1 through SW32-$n$ at the second stage, and switches SW33-1 through SW33-$n$ at the third stage. Each of the switches SW31-1 through SW31-$n$ is an m.times.2m switch and has m incoming lines and 2m outgoing lines. Each of the switches SW32-1 through SW32-$n$ is an m.times.m switch and has m incoming lines and m outgoing lines. Each of the switches SW33-1 through SW33-$n$ is a 2m.times.m switch and has 2m incoming lines and m outgoing lines.

The number of the m.times.2m switches at the first stage is n, the number of the m.times.m switches at the second stage is 2n, and the number of the 2m.times.m switches at the third stage is n. Therefore, the total number of the m.times.2m switches included in the spatial switch SW30 is 2n (the switches located at the first and third stages are the same) and the total number of the m.times.m switches included in the spatial switch SW30 is 2n.

The switch SW31-1 at the first stage has 2m outgoing lines. These outgoing lines are bundled by (m/n)s (m/n is an integer) and are connected to the switches SW32-1 through SW32-$n$, respectively, at the second stage. Similarly, the outgoing lines from the switches SW31-2 through SW31-$n$ are connected to the switches SW32-1 through SW32-2$n$ at the second stage.

The switch SW32-1 at the second stage has m outgoing lines. These outgoing lines are bundled by (m/n)s and are connected to the switches SW33-1 through SW33-$n$, respectively, at the third stage. Similarly, the outgoing lines from the switches SW32-2 through SW32-$n$ are connected to the switches SW33-1 through SW33-$n$ at the third stage.

A unit switch at the first stage has 2m outgoing lines, so the number of paths which go from the unit switch at the first stage to the 2n switches SW32-1 through SW32-2$n$ at the second stage is 2m. In addition, a unit switch at the third stage has 2m incoming lines, so the number of paths which go from each of the 2n switches SW32-1 through SW32-2$n$ at the second stage to the unit switch at the third stage is 2m.

Therefore, even when outgoing lines corresponding to (m−1) incoming lines have been established in the switch at the first stage and outgoing lines corresponding to (m−1) incoming lines have been established in the switch at the third stage, (m+1) (obtained by subtracting (m−1) from 2m) paths can be set from the first stage to the third stage. This means that the spatial switch SW30 is of a non-blocking type.

Figure 30:
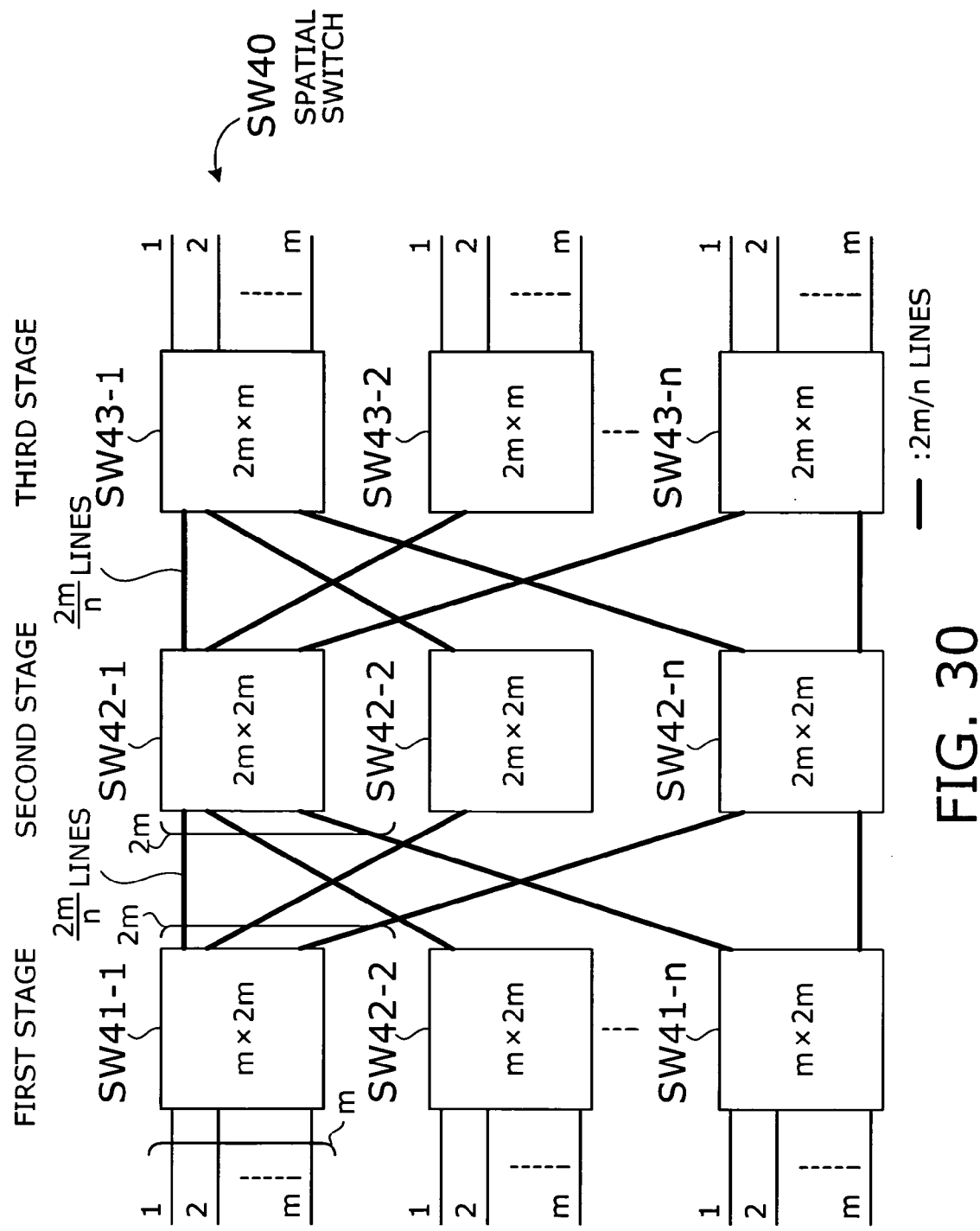
FIG. 30 shows the structure of a non-blocking type spatial switch.

FIG. 30 shows the structure of a non-blocking type spatial switch. A spatial switch SW40, being a modification of the spatial switch SW20 shown in FIG. 28, has a three-stage structure. The spatial switch SW40 is an (m.times.n).times.(m.times.n) switch (m and n are even numbers) including switches SW41-1 through SW41-$n$ at the first stage, switches SW42-1 through SW42-$n$ at the second stage, and switches SW43-1 through SW43-$n$ at the third stage. Each of the switches SW41-1 through SW41-$n$ is an m.times.2m switch and has m incoming lines and 2m outgoing lines. Each of the switches SW42-1 through SW42-$n$ is a 2m.times.2m switch and has 2m incoming lines and 2m outgoing lines. Each of the switches SW43-1 through SW43-$n$ is a 2m.times.m switch and has 2m incoming lines and m outgoing lines.

The number of the m.times.2m switches at the first stage is n, the number of the 2m.times.2m switches at the second stage is n, and the number of the 2m.times.m switches at the third stage is n. Therefore, the total number of the m.times.2m switches included in the spatial switch SW40 is 2n (the switches located at the first and third stages are the same) and the total number of the 2m.times.2m switches included in the spatial switch SW40 is n (the number of the switches included in the spatial switch SW40 is smaller than that of the switches included in the spatial switch SW30 shown in FIG. 29).

The switch SW41-1 at the first stage has 2m outgoing lines. These outgoing lines are bundled by (2m/n)s (2m/n is an integer) and are connected to the switches SW42-1 through SW42-$n$, respectively, at the second stage. Similarly, the outgoing lines from the switches SW41-2 through SW41-$n$ are connected to the switches SW42-1 through SW42-$n$ at the second stage.

The switch SW42-1 at the second stage has 2m outgoing lines. These outgoing lines are bundled by (2m/n)s and are connected to the switches SW43-1 through SW43-$n$, respectively, at the third stage. Similarly, the outgoing lines from the switches SW42-2 through SW42-$n$ are connected to the switches SW43-1 through SW43-$n$ at the third stage.

A unit switch at the first stage has 2m outgoing lines, so the number of paths which go from the unit switch at the first stage to the n switches SW42-1 through SW42-$n$ at the second stage is 2m. In addition, a unit switch at the third stage has 2m incoming lines, so the number of paths which go from each of the n switches SW42-1 through SW42-$n$ at the second stage to the unit switch at the third stage is 2m.

Therefore, even when outgoing lines corresponding to (m−1) incoming lines have been established in the switch at the first stage and outgoing lines corresponding to (m−1) incoming lines have been established in the switch at the third stage, (m+1) (obtained by subtracting (m−1) from 2m) paths can be set from the first stage to the third stage. This means that the spatial switch SW40 is of a non-blocking type.

Figure 31:
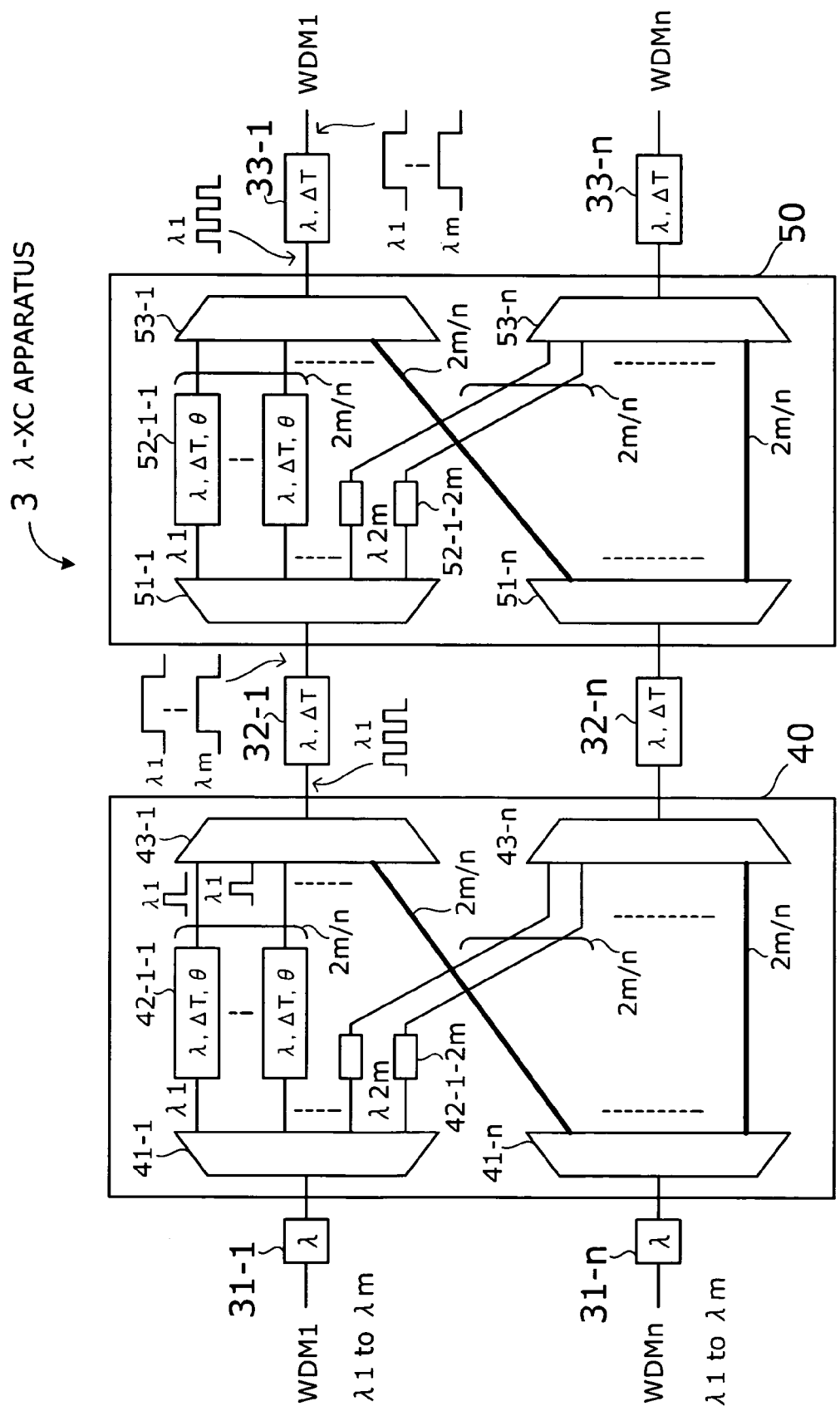
FIG. 31 shows the structure of a non-blocking type λ-XC apparatus.

Next, the structure and operation of a λ-XC apparatus including non-blocking type switches, according to the present invention, will be described. FIG. 31 shows the structure of a non-blocking type λ-XC apparatus. λ-XC apparatus 3 performs completely non-blocking optical cross-connection if m>n, where m is the number of wavelength λ1 through λm contained in each WDM input optical signal and n is the number of WDM input optical signals. The spatial switch 40 of a non-blocking type shown in FIG. 30, that is to say, the switching theory of a non-blocking type spatial switch is applied to the λ-XC apparatus 3.

The λ-XC apparatus 3 comprises wavelength converters 31-1 through 31-$n$, a wavelength switching section 40, wavelength conversion and pulse width expansion sections 32-1 through 32-$n$, a wavelength switching section 50, and wavelength conversion and pulse width expansion sections 33-1 through 33-$n$.

The wavelength switching section 40 includes demultiplexers 41-1 through 41-$n$, optical signal processing sections 42-1-1 through 42-1-2m for processing a WDM1 optical signal, optical signal processing sections 42-2-1 through 42-2-2m (not shown) for processing a WDM2 optical signal, . . . , optical signal processing sections 42-(n−1)-1 through 42-(n−1)-2m (not shown) for processing a WDM (n−1) optical signal, optical signal processing sections 42-*n*-1 through 42-*n*-2m (not shown) for processing a WDMn optical signal, and multiplexers 43-1 through 43-*n*.

The wavelength switching section 50 includes demultiplexers 51-1 through 51-*n*, optical signal processing sections 52-1-1 through 52-1-2m for processing the WDM1 optical signal, optical signal processing sections 52-2-1 through 52-2-2m (not shown) for processing the WDM2 optical signal, . . . , optical signal processing sections 52-(n−1)-1 through 52-(n−1)-2m (not shown) for processing the WDM (n−1) optical signal, optical signal processing sections 52-*n*-1 through 52-*n*-2m (not shown) for processing the WDMn optical signal, and multiplexers 53-1 through 53-*n*.

The number of the components is as follows. The number of the WDM input optical signals is n, so the n wavelength converters 31, the n demultiplexers 41, the n demultiplexers 51, the n wavelength conversion and pulse width expansion sections 32, the n wavelength conversion and pulse width expansion sections 33, the n multiplexers 43, and the n multiplexers 53 are included. The wavelength converters 31 and the wavelength conversion and pulse width expansion sections 32 in the λ-XC apparatus 3 convert the wavelength λ1 through λm contained in the WDM input optical signals into λ1 through λ2m (the number of wavelengths in the apparatus is set to a value twice the number of the wavelengths contained in each input signal.) Accordingly, the 2m optical signal processing sections 42-1 for the WDM1 signal, the 2m optical signal processing sections 42-2 for the WDM2 signal, . . . , and the 2m optical signal processing sections 42-*n* for the WDMn signal are included. As a result, the total number of the optical signal processing sections 42 included is (2m×n).

Similarly, the 2m optical signal processing sections 52-1, the 2m optical signal processing sections 52-2, . . . , and the 2m optical signal processing sections 52-*n* are included. Therefore, the total number of the optical signal processing sections 52 included is (2m×n).

Connection relations between the optical signal processing sections 42 and the multiplexers 43 and between the optical signal processing sections 52 and the multiplexers 53 will now be described. Output fibers from the optical signal processing sections 42 are connected to the multiplexers 43 by (2m/n)s (2m/n is an integer) for each of WDM1 through WDMn. Similarly, output fibers from the optical signal processing sections 52 are connected to the multiplexers 53 by (2m/n)s for each of WDM1 through WDMn. (For the sake of simplicity each thick solid line shown in FIG. 31 indicates that 2m/n fibers and the same number of optical signal processing sections are located.)

For example, output fibers from the optical signal processing sections 42-1-1 through 42-1-(2m/n) for processing the WDM1 signal, output fibers from the optical signal processing sections 42-2-1 through 42-2-(2m/n) (not shown) at the second stage for processing the WDM2 signal, and output fibers from the optical signal processing sections 42-*n*-1 through 42-*n*-(2m/n) (not shown) at the final stage for processing the WDMn signal are connected to the multiplexer 43-1.

Figure 32:
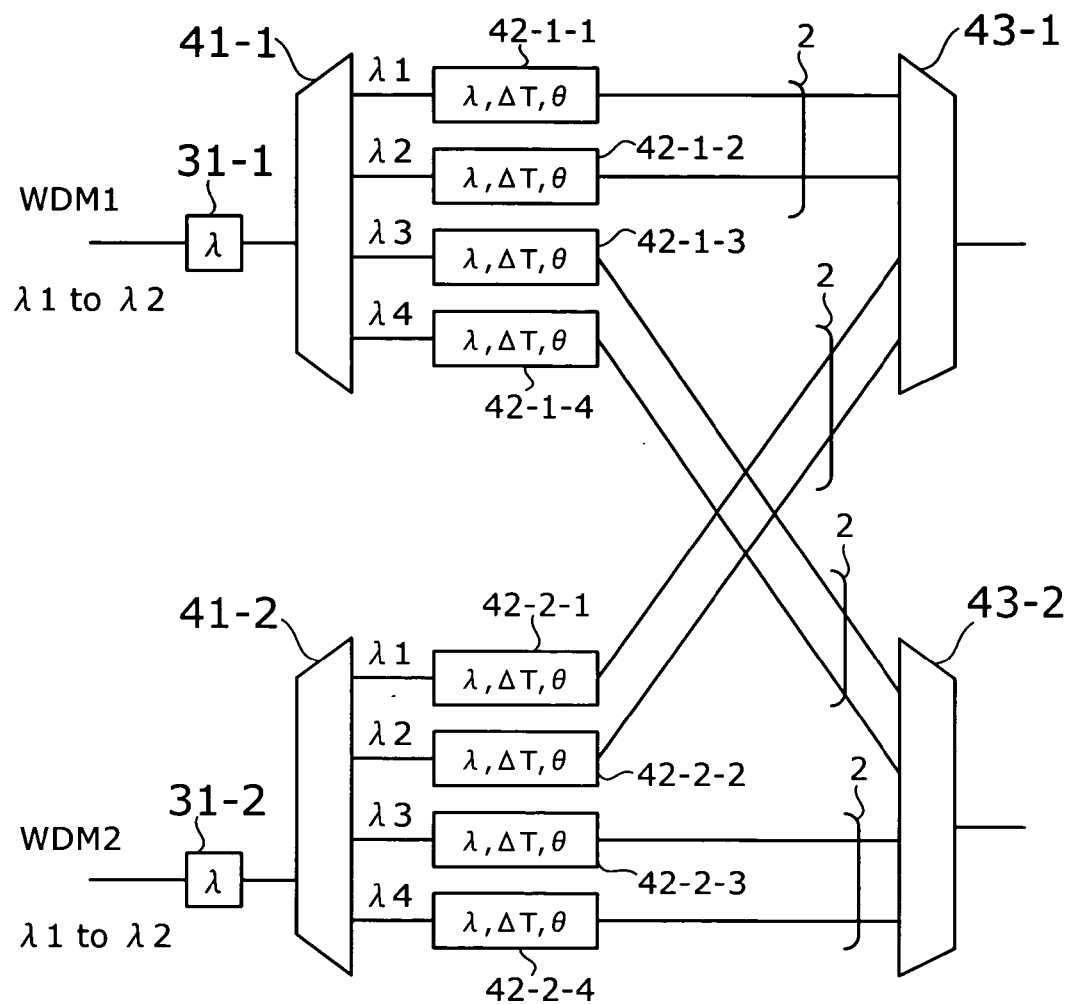
FIG. 32 shows connection relations between optical signal processing sections and multiplexers.

FIG. 32 shows connection relations between optical signal processing sections and multiplexers. FIG. 32 is a view for intelligibly describing connection relations between optical signal processing sections and multiplexers. A simple case where n=2 and m=2 is given.

In this case, 2m/n=2. Accordingly, output fibers from the optical signal processing sections 42-1-1 through 42-1-4 and 42-2-1 through 42-2-4 are connected to the multiplexers 43-1 and 43-2 by twos (=2m/n) for each of WDM1 and WDM2.

That is to say, the two output fibers from the optical signal processing sections 42-1-1 and 42-1-2 are connected to the multiplexer 43-1 and the two output fibers from the optical signal processing sections 42-1-3 and 42-1-4 are connected to the multiplexer 43-2. Similarly, the two output fibers from the optical signal processing sections 42-2-1 and 42-2-2 are connected to the multiplexer 43-1 and the two output fibers from the optical signal processing sections 42-2-3 and 42-2-4 are connected to the multiplexer 43-2. The same applies to connection relations between the optical signal processing sections 52 and the multiplexers 53.

The operation will now be described. The wavelength converters 31-1 through 31-*n* convert the wavelengths contained in the WDM input optical signals into wavelengths λ1 through λ2m. The demultiplexers 41-1 through 41-*n* separate the wavelength-converted optical signals into different wavelengths. The optical signal processing sections 42 perform wavelength conversion, pulse width compression, and phase shift processes on the input optical signals with the different wavelengths. In this example, the optical signal processing sections 42 convert the wavelength of each of the demultiplexed optical signals into one of wavelengths λ1 through λn. Then the optical signal processing sections 42 perform the pulse width compression processes by the use of the time division number 2m (a time division number in the λ-XC apparatus 1 and 2 is m, but a time division number in the λ-XC apparatus 3 and a λ-XC apparatus 4 described later is 2m), and perform phase shift processes so that the phases of a plurality of compressed signals will not be the same.

The multiplexers 43-1 through 43-*n* combine the phase-shifted optical signals. For example, the multiplexer 43-1 collects and combines only pulses with the wavelength λ1 and the multiplexer 43-*n* collects and combines only pulses with the wavelength λn. The wavelength conversion and pulse width expansion sections 32-1 through 32-*n* convert the wavelengths contained in the signals outputted from the wavelength switching section 40 into λ1 through λm and expand the pulse width of these signals.

The demultiplexers 51-1 through 51-*n* separate the signals outputted from the wavelength conversion and pulse width expansion sections 32-1 through 32-*n* into different wavelengths. The optical signal processing sections 52 perform wavelength conversion, pulse width compression, and phase shift processes on the input optical signals with the different wavelengths. The optical signal processing sections 52 convert the wavelength of each of the demultiplexed optical signals into one of wavelengths λ1 through λn. Then the optical signal processing sections 52 perform the pulse width compression processes by the use of the time division number 2m, and perform phase shift processes so that the phases of a plurality of compressed signals will not be the same. This is the same with the optical signal processing sections 42.

The multiplexers 53-1 through 53-*n* combine the phase-shifted optical signals. For example, the multiplexer 53-1 collects and combines only pulses with the wavelength λ1 and the multiplexer 53-*n* collects and combines only pulses with the wavelength λn. The wavelength conversion and pulse width expansion sections 33-1 through 33-*n* convert the wavelengths contained in the signals outputted from the wavelength switching section 50 into λ1 through λm, expand the pulse width of these signals, and send the WDM signals after the optical cross-connection process.

As stated above, the λ-XC apparatus 3 according to the present invention includes the two wavelength switching sections 40 and 50. In the first wavelength switching section 40, the input optical signals are separated into the 2m different wavelengths by the demultiplexers, the pulse width compression processes are performed on these signals by the use of the time division number 2m, and the compressed signals are assigned to λ1 through λn by (2m/n)s. These compressed signals are sent to the demultiplexers in the second wavelength switching section 50 via the wavelength conversion and pulse width expansion sections 32-1 through **32-*n***.

As a result, the λ-XC apparatus 3 is equal in structure to the spatial switch SW40 shown in FIG. 30 and therefore can perform non-blocking type switching (optical cross-connection).

Figure 33:
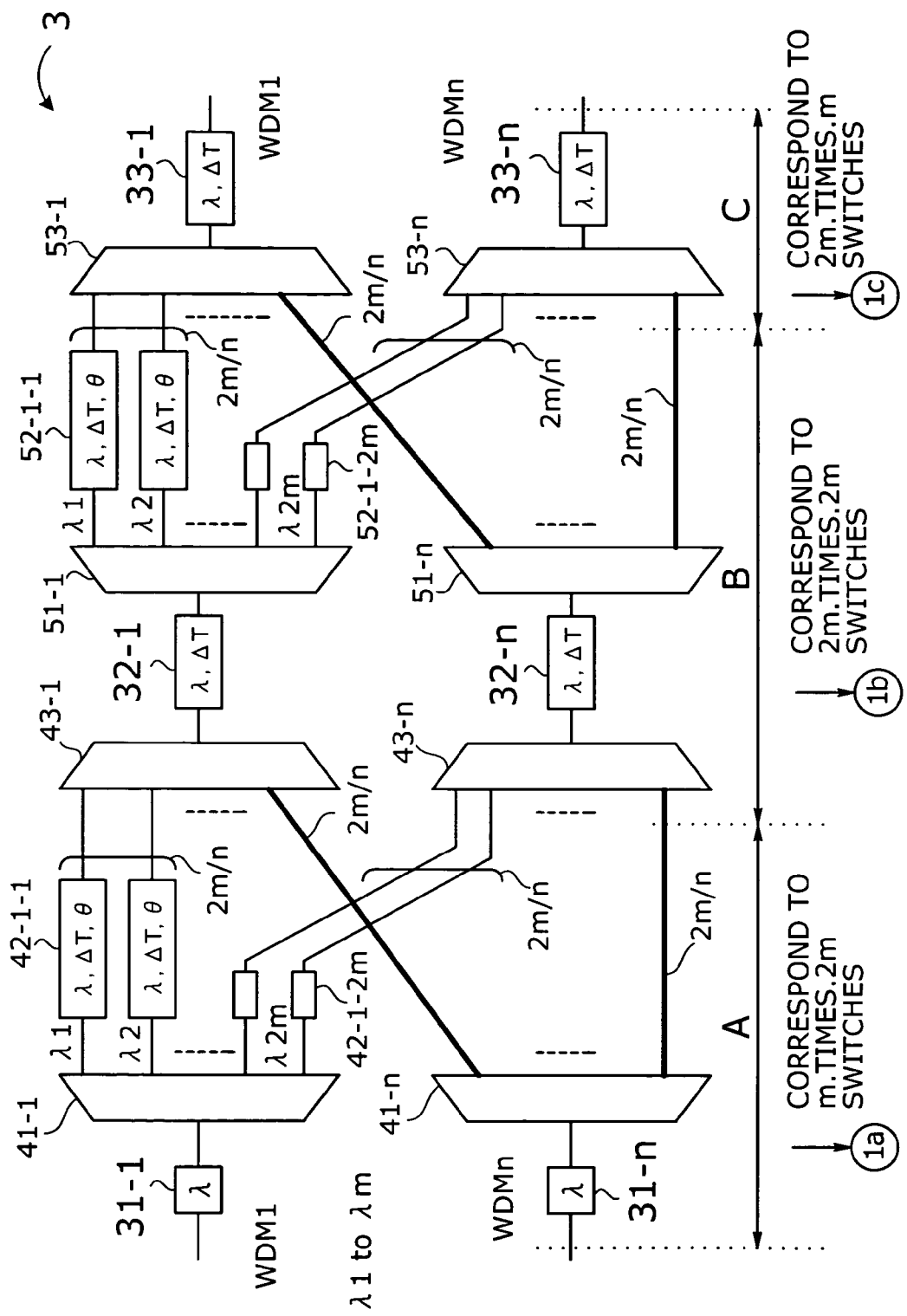
FIG. 33 shows the correspondence between a λ-XC apparatus and a spatial switch.
Figure 34:
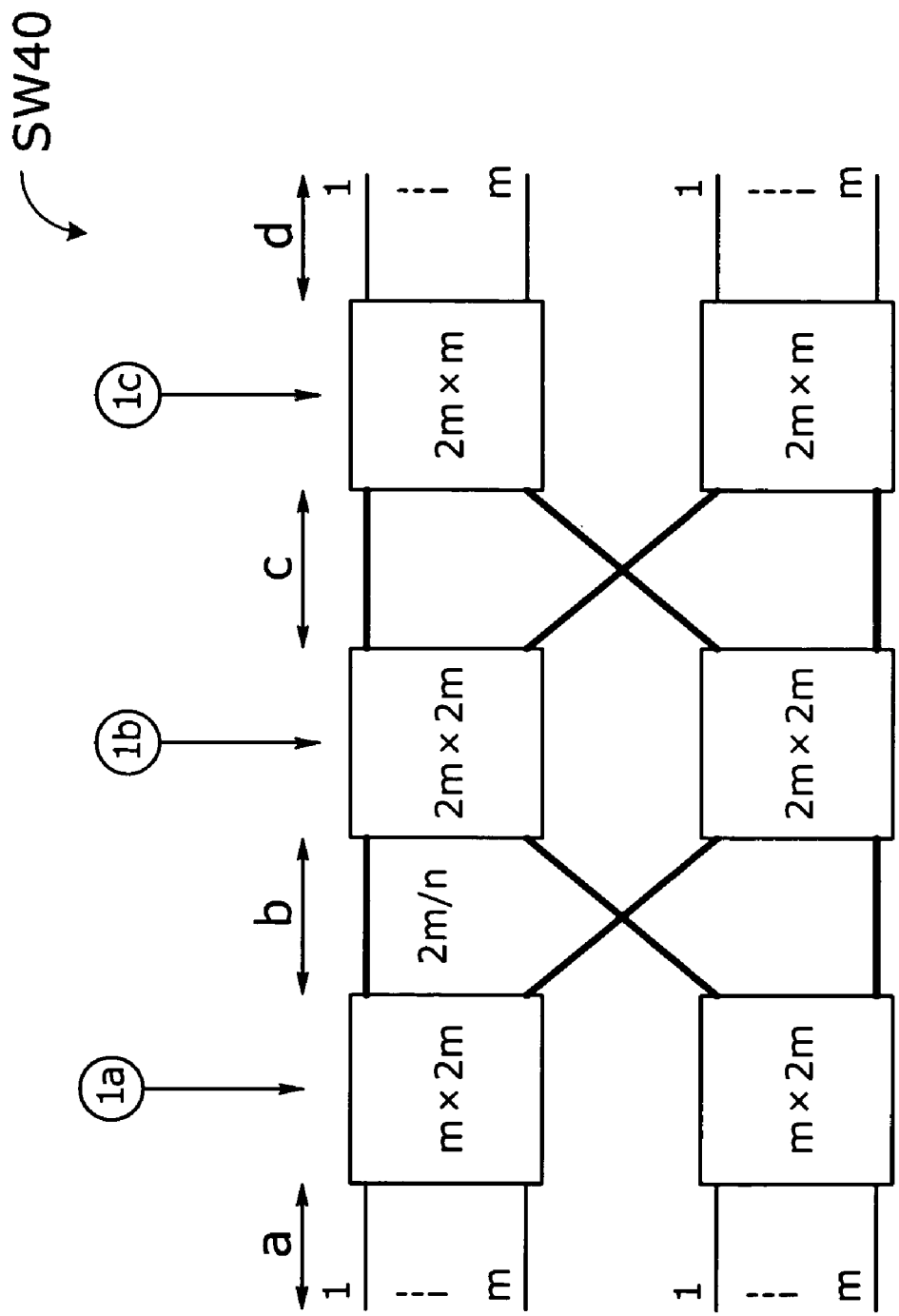
FIG. 34 shows the correspondence between a λ-XC apparatus and a spatial switch.

FIGS. 33 and 34 show the correspondence between the λ-XC apparatus 3 and the spatial switch SW40. An area A in the λ-XC apparatus 3 from the input side of the wavelength converters 31 to the output side of the optical signal processing sections 42 corresponds to the m.times.2m switches at the first stage in the spatial switch SW40. An area B from the input side of the multiplexers 43 to the output side of the optical signal processing sections 52 corresponds to the 2m.times.2m switches at the second stage in the spatial switch SW40. An area C from the input side of the optical signal processing sections 52 to the output side of the wavelength conversion and pulse width expansion sections 33 corresponds to the 2m.times.m switches at the third stage in the spatial switch SW40.

One physical input line WDM is connected to each demultiplexer 41 in the λ-XC apparatus 3, but the m wavelengths λ1 through λm are multiplexed. Therefore, by taking the number of the wavelengths multiplexed into consideration, one physical input line can be considered m signal input lines. This number is equal to that of the incoming lines of each m.times.2m switch in an area a in the spatial switch SW40.

Output fibers from each of the optical signal processing sections 42 are bundled by (2m/n)s and are connected to the n multiplexers 43, respectively. This is the same as the correspondence in an area b in the spatial switch SW40 between the outgoing lines of the m.times.2m switches and the incoming lines of the 2m.times.2m switches.

Output fibers from each of the optical signal processing sections 52 are bundled by (2m/n)s and are connected to the n multiplexers 53, respectively. This is the same as the correspondence in an area c in the spatial switch SW40 between the outgoing lines of the 2m.times.2m switches and the incoming lines of the 2m.times.m switches.

One physical output line WDM is connected to each wavelength conversion and pulse width expansion section 33 in the λ-XC apparatus 3, but the m wavelengths λ1 through λm are multiplexed. Accordingly, by taking the number of wavelengths multiplexed into consideration, one physical output line can be considered m signal output lines. This number is equal to that of the outgoing lines of each 2m.times.m switch in an area d in the spatial switch SW40. That is to say, the λ-XC apparatus 3 is equal to the spatial switch SW40 in structure and therefore is a non-blocking type switch.

Figure 35:
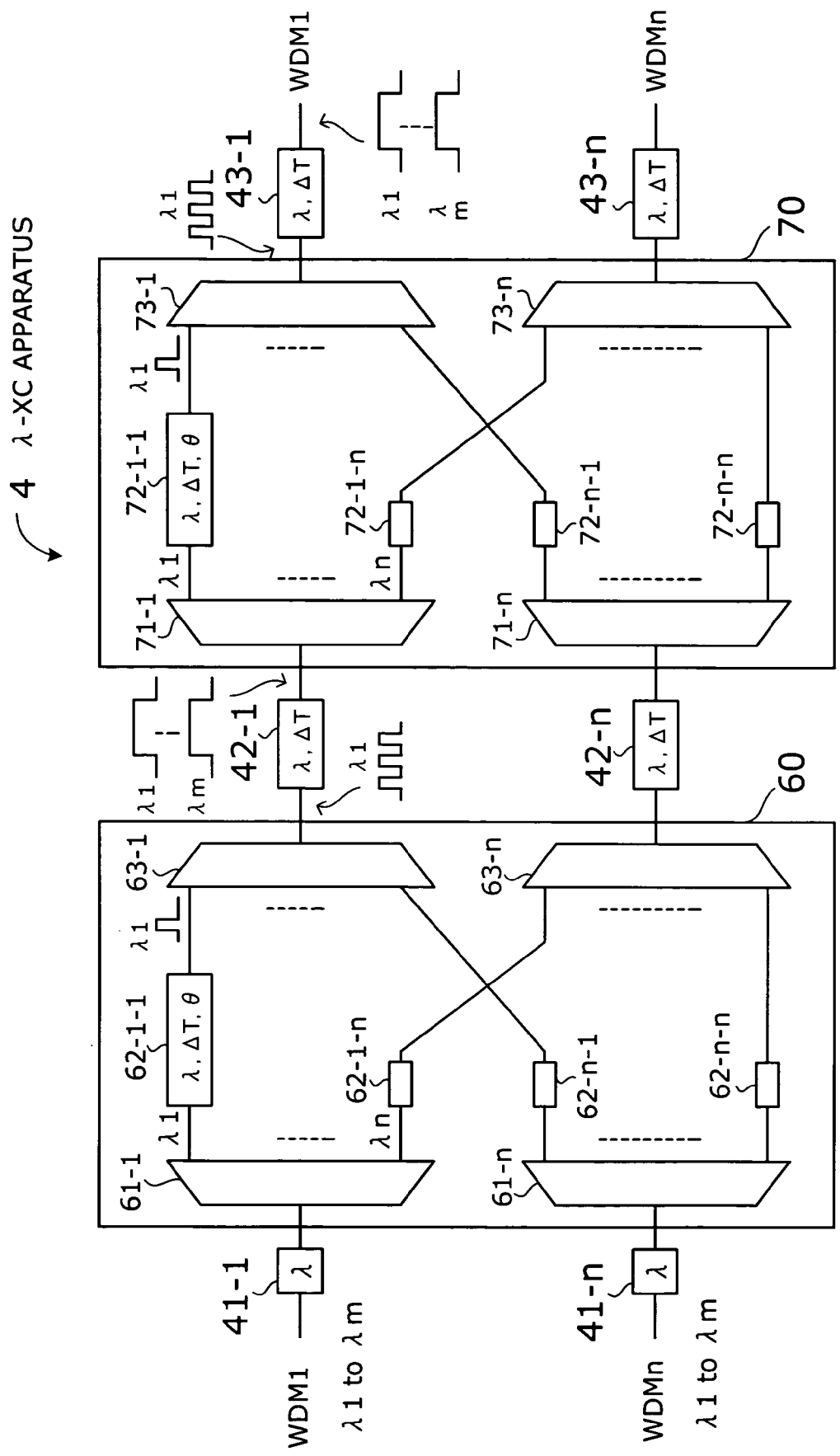
FIG. 35 shows the structure of a non-blocking type λ-XC apparatus.

A λ-XC apparatus which performs non-blocking type switching under the condition of m≦n will now be described. FIG. 35 shows the structure of a non-blocking type λ-XC apparatus. A λ-XC apparatus 4 performs completely non-blocking optical cross-connection if m≦n, where m is the number of wavelengths λ1 through λm contained in each WDM input optical signal and n is the number of WDM input optical signals. The spatial switch 40 of a non-blocking type shown in FIG. 30 is applied to the λ-XC apparatus 4.

The λ-XC apparatus 4 comprises wavelength converters 41-1 through **41-*n*, a wavelength switching section 60, wavelength conversion and pulse width expansion sections 42-1 through 42-*n*, a wavelength switching section 70, and wavelength conversion and pulse width expansion sections 43-1 through 43-*n***.

The wavelength switching section 60 includes demultiplexers 61-1 through **61-*n*, optical signal processing sections 62-1-1 through 62-1-*n* for processing a WDM1 optical signal, optical signal processing sections 62-2-1 through 62-2-*n* (not shown) for processing a WDM2 optical signal, . . . , optical signal processing sections 62-(n–1)-1 through 62-(n–1)-*n* (not shown) for processing a WDM (n–1) optical signal, optical signal processing sections 62-*n*-1 through 62-*n*-*n* for processing a WDMn optical signal, and multiplexers 63-1 through 63-*n***.

The wavelength switching section 70 includes demultiplexers 71-1 through **71-*n*, optical signal processing sections 72-1-1 through 72-1-*n* for processing the WDM1 optical signal, optical signal processing sections 72-2-1 through 72-2-*n* (not shown) for processing the WDM2 optical signal, . . . , optical signal processing sections 72-(n–1)-1 through 72-(n–1)-*n* (not shown) for processing the WDM (n–1) optical signal, optical signal processing sections 72-*n*-1 through 72-*n*-*n* for processing the WDMn optical signal, and multiplexers 73-1 through 73-*n***.

The number of the components is as follows. The number of the WDM input optical signals is n, so the n wavelength converters 41, the n demultiplexers 61, the n demultiplexers 71, the n wavelength conversion and pulse width expansion sections 42, the n wavelength conversion and pulse width expansion sections 43, the n multiplexers 63, and the n multiplexers 73 are included.

The wavelength converters 41 and the wavelength conversion and pulse width expansion sections 42 in the λ-XC apparatus 4 convert the wavelength λ1 through λm contained in the WDM input optical signals into the wavelength λ1 through λn(m≦n). Accordingly, the n optical signal processing sections 62-1 for the WDM1 signal, the n optical signal processing sections 62-2 for the WDM2 signal, . . . , and the n optical signal processing sections **62-*n* for the WDMn signal are included. As a result, the total number of the optical signal processing sections 62 included is (n×n). Similarly, the n optical signal processing sections 72-1, the n optical signal processing sections 72-2, . . . , and the n optical signal processing sections 72-*n* are included. Therefore, the total number of the optical signal processing sections 72** included is (n×n).

Connection relations between the optical signal processing sections 62 and the multiplexers 63 and between the optical signal processing sections 72 and the multiplexers 73 will now be described. Output fibers from the optical signal processing sections 62 are connected to the multiplexers 63 on a one-to-one basis. Similarly, output fibers from the optical signal processing sections 72 are connected to the multiplexers 73 on a one-to-one basis.

For example, an output fiber from the optical signal processing section 62-1-1 for processing the WDM1 signal, an output fiber from the optical signal processing section 62-2-1 (not shown) at the second stage for processing the WDM2 signal, and an output fiber from the optical signal processing section 62-*n*-1 (not shown) at the final stage for processing the WDMn signal are connected to the multiplexer 63-1.

The operation will now be described. The wavelength converters 41-1 through 41-*n* convert the wavelengths contained in the WDM input optical signals into wavelengths λ1 through λn. The demultiplexers 61-1 through 61-*n* separate the wavelength-converted optical signals into different wavelengths.

The optical signal processing sections 62 convert the wavelength of each of the demultiplexed optical signals into one of wavelengths λ1 through λn. Then the optical signal processing sections 62 perform pulse width compression by the use of the time division number 2m, and perform phase shifts so that the phases of a plurality of compressed signals will not be the same. The multiplexers 63-1 through 63-*n* combine the phase-shifted optical signals.

The wavelength conversion and pulse width expansion sections 42-1 through 42-*n* convert the wavelengths contained in the signals outputted from the wavelength switching section 60 into λ1 through λm and expand the pulse width of these signals. The demultiplexers 71-1 through 71-*n* separate the signals outputted from the wavelength conversion and pulse width expansion sections 42-1 through 42-*n* into different wavelengths. The optical signal processing sections 72 convert the wavelength of each of the demultiplexed optical signals into one of wavelengths λ1 through λn. Then the optical signal processing sections 72 perform pulse width compression by the use of the time division number 2m, and perform phase shifts so that the phases of a plurality of compressed signals will not be the same.

The multiplexers 73-1 through 73-*n* combine the phase-shifted optical signals. The wavelength conversion and pulse width expansion sections 43-1 through 43-*n* convert the wavelengths contained in the signals outputted from the wavelength switching section 70 into λ1 through λm and expand the pulse width of these signals.

As stated above, the λ-XC apparatus 4 according to the present invention includes the two wavelength switching sections 60 and 70. In the first wavelength switching section 60, the input optical signals are separated into the n different wavelengths by the demultiplexers, the pulse width compression processes are performed on these signals by the use of the time division number 2m, and the compressed signals are assigned to λ1 through λn. These compressed signals are sent to the demultiplexers in the second wavelength switching section 70 via the wavelength conversion and pulse width expansion sections 42-1 through 42-*n*.

As a result, the λ-XC apparatus 4 is equal in structure to the spatial switch SW40 shown in FIG. 30 and therefore can perform non-blocking type switching (optical cross-connection).

Figure 36:
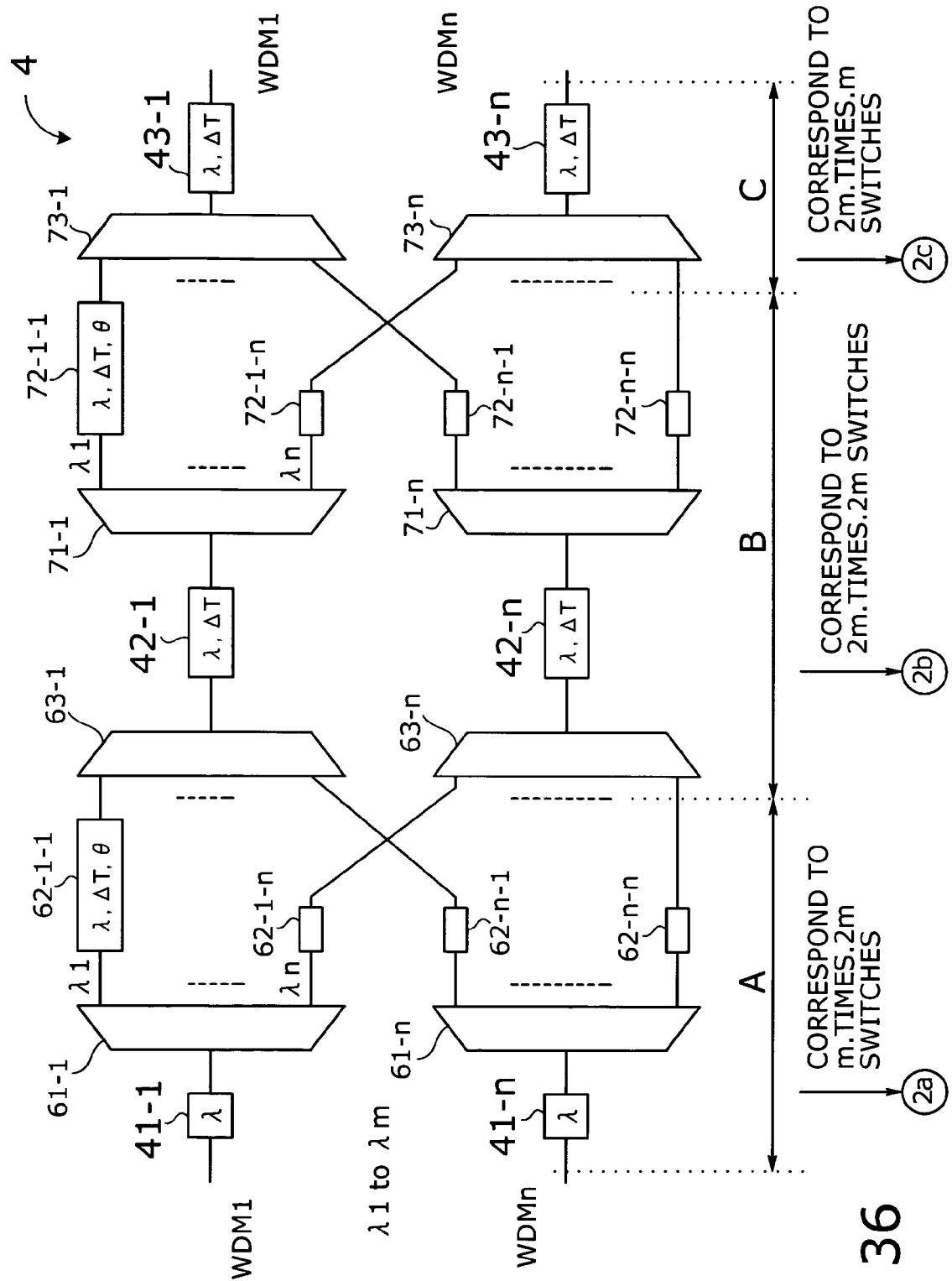
FIG. 36 shows the correspondence between a λ-XC apparatus and a spatial switch.
Figure 37:
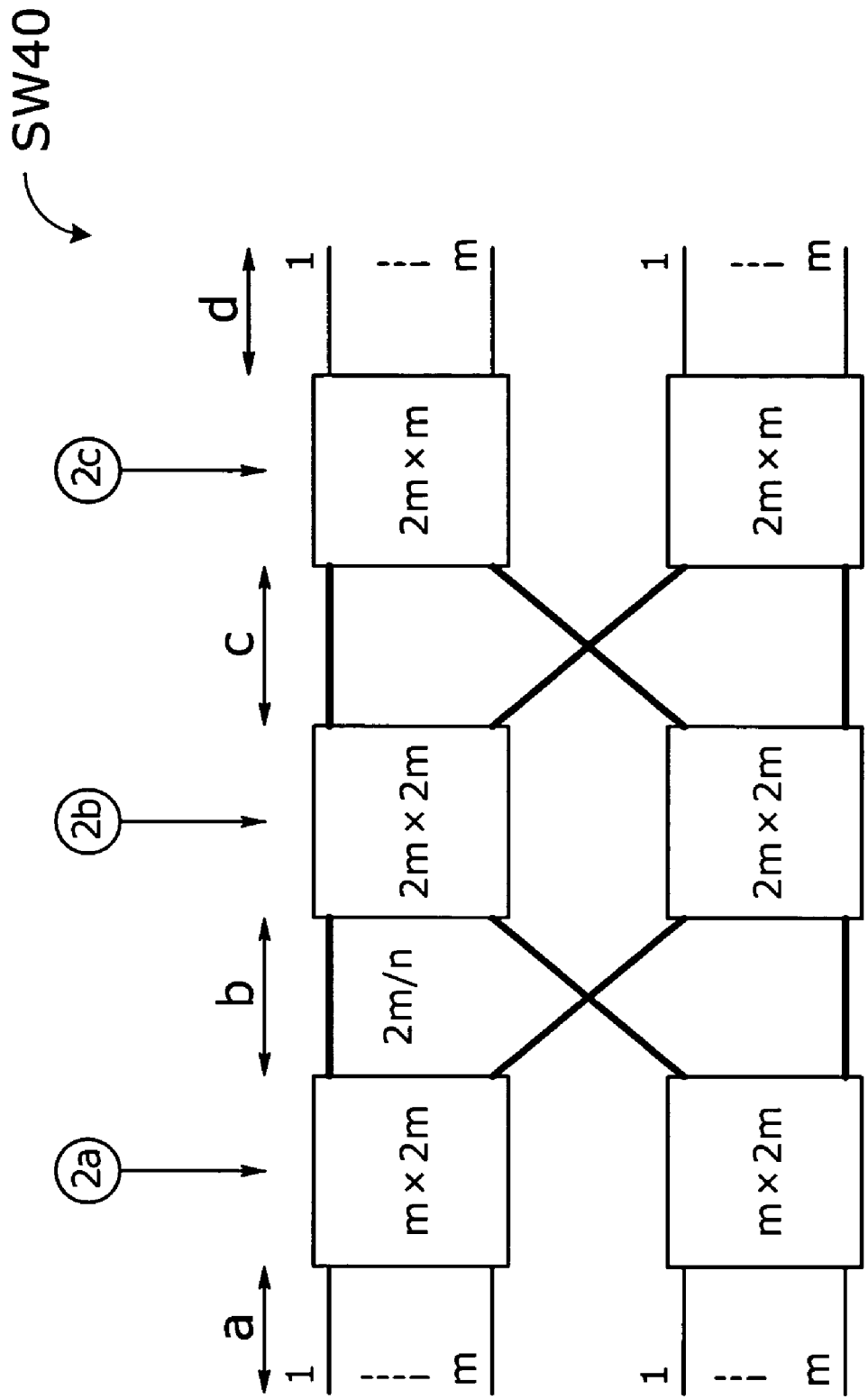
FIG. 37 shows the correspondence between a λ-XC apparatus and a spatial switch.

FIGS. 36 and 37 show the correspondence between the λ-XC apparatus 4 and the spatial switch SW40. An area A in the λ-XC apparatus 4 from the input side of the wavelength converters 41 to the output side of the optical signal processing sections 62 corresponds to the m.times.2m switches at the first stage in the spatial switch SW40. An area B from the input side of the multiplexers 63 to the output side of the optical signal processing sections 72 corresponds to the 2m.times.2m switches at the second stage in the spatial switch SW40. An area C from the input side of the optical signal processing sections 72 to the output side of the wavelength conversion and pulse width expansion sections 43 corresponds to the 2m.times.m switches at the third stage in the spatial switch SW40.

One physical input line WDM is connected to each wavelength converter 41 in the λ-XC apparatus 4, but the m wavelengths λ1 through λm are multiplexed. Therefore, by taking the number of the wavelengths multiplexed into consideration, one physical input line can be considered m signal input lines. This number is equal to that of the incoming lines of each m.times.2m switch in an area a in the spatial switch SW40.

Output fibers from each of the optical signal processing sections 62 are connected to the n multiplexers 63 respectively. The number of the physical output lines from the optical signal processing sections 62-1-1 through 62-1-*n* is n and the number of the physical input lines to the multiplexer 63-1 is n (the same applies to the other optical signal processing sections and multiplexers). However, the time division number 2m is used, so this is the same as the correspondence in an area b in the spatial switch SW40 between the outgoing lines of the m.times.2m switches and the incoming lines of the 2m.times.2m switches.

In this example, the condition of m≦n is given. It is assumed that m=10 and n=10 and that the pulse width of an input signal is 100 ps. The wavelength converter 41-1 converts λ1 through λm (λ1 through λ10) contained in the input signal into λ1 through λn (λ1 through λ10). The demultiplexer 61-1 separates the wavelength-converted signal into the ten wavelengths.

The optical signal processing sections 62-1-1 through 62-1-10 perform wavelength conversions, pulse width compression, and phase shifts on the ten demultiplexed signals. In this case, the time division number 2m (=20) is used, so the width of one compressed pulse is 5 ps. Therefore, in the phase shift process, there are twenty methods of locating the phase of a 5-picosecond compressed pulse in a period of 100 ps. This number is equal to the number 2m (=20) of the outgoing lines of each m.times.2m switch.

That is to say, if the phases of 10-picosecond pulses (the time division number 10 is used) are shifted in a period of 100 ps and are outputted from the ten output lines of the optical signal processing sections 62-1-1 through 62-1-10, then the number of the output lines remains the same. However, if the phases of 5-picosecond pulses (the time division number 20 is used) are shifted in a period of 100 ps and are outputted, then the number of the output lines may be considered twenty.

In addition, a period of 10 ps can be allotted for output from each of the optical signal processing sections 62-1-1 through 62-1-10, so there are two methods of locating a 5-picosecond pulse. Therefore, each of the optical signal processing sections 62-1-1 through 62-1-10 may be regarded as having two (=2m/n=2×10/10) output lines. Descriptions of areas c and d in the spatial switch SW40 will be omitted because the descriptions of the area b and a apply to the areas c and d respectively.

The forecast of the performance of a λ-XC apparatus of a completely non-blocking type will now be described. It is assumed that each of signals wavelength-converted by the wavelength converters 31 in the λ-XC apparatus 3 contains 2,000 wavelengths and that the time division number 2,000 is used. As a result of the wavelength conversions by the wavelength converters 31; the number of wavelengths contained in each input optical signal doubles. Accordingly, in this case, the number of wavelengths contained in each optical signal inputted to the λ-XC apparatus 3 is 1,000. The width of each compressed pulse is 50 fs (=100 ps/2000).

Figure 38:
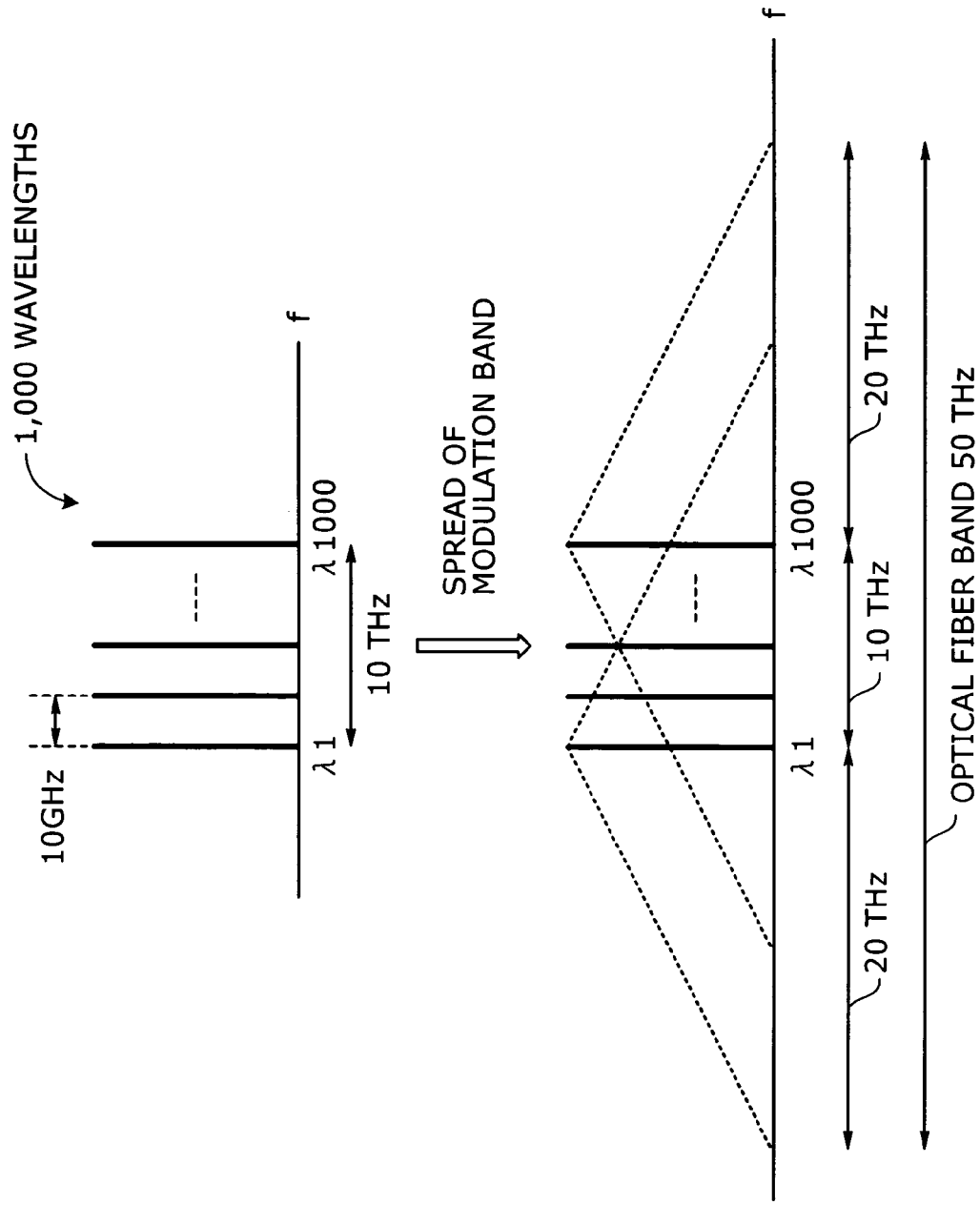
FIG. 38 shows the spread of a modulation band for a compressed pulse.

No less than 1,000 compressed pulses with different wavelengths will be multiplexed into some optical fibers in the λ-XC apparatus 3. FIG. 38 shows the spread of a modulation band for a compressed pulse. It is assumed that a thousand wavelengths separated by 10 GHz are multiplexed. Then a thousand compressed pulses with different wavelengths λ1 through λ1000 will occupy a band of 10 THz (=10 GHz×1000).

However, if the pulse width of one wavelength signal is compressed into 50 fs, an actual modulation band for the compressed pulse is 20 THz (the modulation band 10 GHz for the wavelength signal with a pulse width of 100 ps at input time expands to 20 THz if the pulse width of the wavelength signal is compressed into 50 fs).

To find out a modulation band occupied by all of the thousand compressed pulses with the different wavelengths separated by 10 GHz, the spread of modulation bands for the shortest wavelength λ1 and the longest wavelength λ1000 should be observed. The spread of modulation bands for the shortest wavelength λ1 and the longest wavelength λ1000 is shown in FIG. 38. Therefore, a modulation band occupied by all of the thousand compressed pulses is 50 THz.

An optical fiber band is 50 THz, so the modulation band occupied by all of the thousand compressed pulses falls in the optical fiber band. That is to say, even with the λ-XC apparatus 3 of a completely non-blocking type in which the number of wavelengths is the most, optical cross-connection of input optical signals each containing a thousand different wavelengths can be performed by the use of the time division number 2,000 in the optical fiber band.

On the other hand, the λ-XC apparatus 4 performs completely non-blocking optical cross-connection if m≦n, where m is the number of wavelength n contained in each WDM input optical signal and n is the number of WDM input optical signals. If m=1,000 and n=1,000, then the λ-XC apparatus 4 provides a throughput of 10 Pbits/s (=1,000×1,000×10 Gbits/s). That is to say, the λ-XC apparatus 4 can achieve a throughput higher than or equal to 1 Pbits/s and realize completely non-blocking optical cross-connection.

As has been described in the foregoing, with the optical cross-connect apparatus according to the present invention, wavelength conversions, pulse width compression, and phase shifts are performed on WDM input signals, the signals are distributed according to wavelengths by the wavelength switching sections each including passive optical devices, wavelength conversions and pulse width expansion are performed on the distributed optical signals, and WDM signals are outputted. As a result, high throughput can be realized in optical cross-connection by performing large-scale switching.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical cross-connect apparatus for performing optical cross-connection of optical signals, the apparatus comprising:
   an input optical signal processing section for converting wavelengths contained in each input WDM signal into wavelengths the number of which is equal to the number of WDM signals, for compressing the pulse widths of the WDM signals by dividing the pulse widths by the number of the wavelengths contained in each input WDM signal, and for performing a phase shift so that the phases of a plurality of compressed signal will not be the same;
   a wavelength switching section including passive optical devices for distributing the optical signals processed by the input optical signal processing section according to wavelengths; and
   an output optical signal processing section for converting wavelengths contained in the optical signals distributed by the wavelength switching section into wavelengths recognized from the phases of the optical signals, for expanding the pulse widths of the optical signals, and for outputting WDM signals.

2. The optical cross-connect apparatus according to claim 1, wherein switch size n×m≦(optical fiber band)×(pulse width of input optical signal)×0.5, where n is the number of the WDM input optical signals and is equal to the number of wavelengths in the apparatus, and m is the number of the wavelengths contained in each WDM input optical signal and is equal to a time division number used for pulse width compression.

3. The optical cross-connect apparatus according to claim 1, wherein the wavelength switching section includes a demultiplexer for separating the optical signals according to wavelengths and a multiplexer for combining demultiplexed optical signals with the same wavelength.

4. The optical cross-connect apparatus according to claim 1, wherein the wavelength switching section includes a WDM coupler for collecting n optical signals, in the case of the number of the WDM input optical signals being n, and a demultiplexer for separating the collected optical signals according to wavelengths.

5. The optical cross-connect apparatus according to claim 1, wherein the input optical signal processing section includes:
   a demultiplexer for separating the input WDM signals according to wavelengths;
   a wavelength converter for converting wavelengths of the demultiplexed signals on the basis of a wavelength specification signal;
   a pulse width compression section for compressing pulse widths of the wavelength-converted signals;
   a variable delay for shifting phases of the compressed signals on the basis of a phase specification signal;
   a multiplexer for combining the phase-shifted compressed signals; and
   an input light conversion control section for setting the wavelength specification signal and for setting the phase specification signal on the basis of a signal outputted from the multiplexer.

6. The optical cross-connect apparatus according to claim 1, wherein the input optical signal processing section includes:
   a demultiplexer for separating the input WDM signals according to wavelengths;
   a control pulse generation section for generating control pulses with a variable wavelength on the basis of a wavelength specification signal and for outputting the control pulses in phases based on a phase specification signal;
   a nonlinear loop mirror for accepting the demultiplexed optical signals and the control pulses and for outputting overlap portions of the demultiplexed optical signals with the control pulses;
   a WDM coupler for combining the output from the nonlinear loop mirror; and
   an input light conversion control section for setting the wavelength specification signal and for setting the phase specification signal on the basis of a signal outputted from the WDM coupler.

7. The optical cross-connect apparatus according to claim 1, wherein the output optical signal processing section includes:
   a chirp pulse light source for emitting chirp pulses with a wavelength which changes continuously with time;
   a nonlinear loop mirror for accepting the optical signals outputted from the wavelength switching section and the chirp pulses and for outputting overlap portions of the chirp pulses with the optical signals outputted from the wavelength switching section; and
   a wavelength dispersion slope control section for detecting wavelength dispersion values of a pulse with a shortest wavelength and a pulse with a longest wavelength selected from the output from the nonlinear loop mirror and for flattening a wavelength dispersion slope obtained from the detected wavelength dispersion values.

8. The optical cross-connect apparatus according to claim 1, wherein the output optical signal processing section includes:
   a sequential switch for sequentially switching and outputting the optical signals outputted from the wavelength switching section;
   a wavelength converter for converting wavelengths contained in the switched signals;
   a pulse width expansion section for expanding pulse widths of the wavelength-converted signals; and
   a multiplexer for combining the pulse-width-expanded signals.

9. The optical cross-connect apparatus according to claim 1, wherein the output optical signal processing section includes:
   a sequential switch for sequentially switching and outputting the optical signals outputted from the wavelength switching section;
   a wavelength converter for converting wavelengths contained in the switched signals;
   a multiplexer for combining the wavelength-converted signals; and
   a wavelength dispersion slope control section for detecting wavelength dispersion values of a pulse with a shortest wavelength and a pulse with a longest wavelength selected from the multiplexed signal and for flattening a wavelength dispersion slope obtained from the detected wavelength dispersion values.

10. An optical cross-connect apparatus for performing optical cross-connection of optical signals, the apparatus comprising:
    a wavelength converter for converting wavelengths contained in each input WDM signal into wavelengths the number of which is equal to the number of WDM signals;
    a wavelength switching section including:
       a demultiplexer for separating the wavelength-converted optical signals according to wavelengths;
       a pulse width compression and phase shift section for compressing pulse widths of the demultiplexed optical signals by dividing the pulse widths by the number of the wavelengths contained in each input WDM signal and for performing a phase shift so that phases of a plurality of compressed signal will not be the same; and
       a multiplexer for combining the phase-shifted optical signals, and
    an output optical signal processing section for converting wavelengths contained in the optical signals distributed by the wavelength switching section into wavelengths recognized from phases of the optical signals, for expanding pulse widths of the optical signals, and for outputting WDM signals.

11. The optical cross-connect apparatus according to claim 10, wherein n which is the number of the WDM input optical signals and which is equal to the number of wavelengths in the apparatus and m which is the number of the wavelengths contained in each WDM input optical signal and which is equal to a time division number used for pulse width compression are set independently of each other.

12. An optical cross-connect apparatus for performing non-blocking optical cross-connection of WDM input optical signals, the number of which is n and each of which contains m wavelengths $\lambda 1$ through $\lambda m$, in the case of m>n, the apparatus comprising:
    n wavelength converters for converting the wavelengths contained in the WDM input optical signals into wavelengths $\lambda 1$ through $\lambda 2m$;
    a first wavelength switching section including:
       n demultiplexers for separating the wavelength-converted optical signals according to wavelengths;
       (2m×n) first optical signal processing sections for converting a wavelength contained in each of the demultiplexed optical signals into one of wavelengths $\lambda 1$ through $\lambda n$, for compressing the pulse widths of the demultiplexed optical signals by the use of the time division number 2m, and for performing a phase shift so that the phases of a plurality of compressed signals will not be the same; and
       n multiplexers, to which output fibers of the first optical signal processing sections are connected by (2m/n)s, for combining the phase-shifted optical signals,
    n first wavelength conversion and pulse width expansion sections for converting wavelengths contained in output from the first wavelength switching section into the wavelengths $\lambda 1$ through $\lambda m$ and for performing pulse width expansion;
    a second wavelength switching section including:
       n demultiplexers for separating output from the first wavelength conversion and pulse width expansion sections according to wavelengths;
       (2m×n) second optical signal processing sections for converting a wavelength contained in each of the demultiplexed optical signals into one of wavelengths $\lambda 1$ through $\lambda n$, for compressing the pulse widths of the demultiplexed optical signals by the use of the time division number 2m, and for performing a phase shift so that the phases of a plurality of compressed signals will not be the same; and
       n multiplexers, to which output fibers of the second optical signal processing sections are connected by (2m/n)s, for combining the phase-shifted optical signals, and
    n second wavelength conversion and pulse width expansion sections for converting wavelengths contained in output from the second wavelength switching section into the wavelengths $\lambda 1$ through $\lambda m$ and for performing pulse width expansion.

13. An optical cross-connect apparatus for performing non-blocking optical cross-connection of WDM input optical signals, the number of which is n and each of which contains m wavelengths $\lambda 1$ through $\lambda m$, in the case of m≦n, the apparatus comprising:

n wavelength converters for converting the wavelengths contained in the WDM input optical signals into wavelengths $\lambda 1$ through $\lambda n$;

a first wavelength switching section including:
- n demultiplexers for separating the wavelength-converted optical signals according to wavelengths;
- (n×n) first optical signal processing sections for converting a wavelength contained in each of the demultiplexed optical signals into one of wavelengths $\lambda 1$ through $\lambda n$, for compressing the pulse widths of the demultiplexed optical signals by the use of the time division number 2m, and for performing a phase shift so that the phases of a plurality of compressed signals will not be the same; and
- n multiplexers, to which output fibers of the first optical signal processing sections are connected on a one-to-one basis, for combining the phase-shifted optical signals, n first wavelength conversion and pulse width expansion sections for converting wavelengths contained in output from the first wavelength switching section into the wavelengths $\lambda 1$ through $\lambda m$ and for performing pulse width expansion;

a second wavelength switching section including:
- n demultiplexers for separating output from the first wavelength conversion and pulse width expansion sections according to wavelengths;
- (n×n) second optical signal processing sections for converting a wavelength contained in each of the demultiplexed optical signals into one of wavelengths $\lambda 1$ through $\lambda n$, for compressing the pulse widths of the demultiplexed optical signals by the use of the time division number 2m, and for performing a phase shift so that the phases of a plurality of compressed signals will not be the same; and
- n multiplexers, to which output fibers of the second optical signal processing sections are connected on a one-to-one basis, for combining the phase-shifted optical signals, and n second wavelength conversion and pulse width expansion sections for converting wavelengths contained in output from the second wavelength switching section into the wavelengths $\lambda 1$ through $\lambda m$ and for performing pulse width expansion.

\* \* \* \* \*